United States Patent
Gottula

(10) Patent No.: US 12,099,932 B1
(45) Date of Patent: Sep. 24, 2024

(54) METHODS AND SYSTEMS FOR ENHANCED SENSOR ASSESSMENTS FOR PREDICTING SECONDARY ENDPOINTS

(71) Applicant: SAS INSTITUTE INC., Cary, NC (US)

(72) Inventor: John Wesley Gottula, Fuquay-Varina, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 18/637,783

(22) Filed: Apr. 17, 2024

Related U.S. Application Data

(60) Provisional application No. 63/541,549, filed on Sep. 29, 2023, provisional application No. 63/459,998, filed on Apr. 17, 2023.

(51) Int. Cl.
*G06N 3/09* (2023.01)
*G06F 18/20* (2023.01)
*G06F 18/2135* (2023.01)

(52) U.S. Cl.
CPC ........... *G06N 3/09* (2023.01); *G06F 18/2135* (2023.01); *G06F 18/295* (2023.01)

(58) Field of Classification Search
USPC ....................................................... 708/322
See application file for complete search history.

(56) References Cited

U.S. PATENT DOCUMENTS

| | | | |
|---|---|---|---|
| 10,841,563 B1* | 11/2020 | Dutta | G01S 17/86 |
| 11,416,738 B1* | 8/2022 | Khanna | G06N 3/084 |
| 2020/0327371 A1* | 10/2020 | Sharma | H04L 67/562 |
| 2022/0051118 A1 | 2/2022 | Rooney et al. | |

* cited by examiner

*Primary Examiner* — Tan V Mai
(74) *Attorney, Agent, or Firm* — Padowithz Alce; Quintin Scheitlin; Alce PLLC

(57) ABSTRACT

A method, system, and computer-program product includes identifying a set of heterogeneous sensors, configuring a plurality of model training compositions for each of the set of heterogeneous sensors, computing, for each of the plurality of model training compositions, a first efficacy metric value based on predictive outputs of the at least two machine learning models, identifying, for each sensor of the set of heterogeneous sensors, a champion model training composition of the subject sensor, the champion model training composition having a highest efficacy metric value, and electing, from a plurality of champion model training compositions corresponding to the champion model training compositions identified for each sensor of the set of heterogeneous sensors, an overall champion model training composition corresponding to a champion sensor of the set of heterogeneous sensors based on an assessment of second efficacy metric values of the plurality of champion model training compositions.

30 Claims, 23 Drawing Sheets

METHODS AND SYSTEMS FOR ENHANCED SENSOR ASSESSMENTS FOR PREDICTING SECONDARY ENDPOINTS

CROSS-REFERENCE TO RELATED APPLICATIONS

This application claims the benefit of U.S. Provisional Application No. 63/459,998, filed on 17 Apr. 2023, and U.S. Provisional Application No. 63/541,549, filed on 29 Sep. 2023, which are incorporated in their entireties by this reference.

TECHNICAL FIELD

This invention relates generally to the machine learning field, and more specifically, to new and useful systems and methods for enhanced sensor assessments for predicting secondary endpoints.

BACKGROUND

In traditional sensor technology, numerous types of sensors are employed across various industries to gather data related to numerous parameters. These sensors may range from spectral and weather sensors to sophisticated IoT devices and the like with each typically being designed to measure specific primary outputs accurately. However, a technological gap exists in assessing these sensors' effectiveness when dealing with secondary endpoints—outcomes that are not directly related to the primary purpose of the sensors but may be of interest, such as crop yields, health outcomes and/or the like.

Modern econometric and value models for sensor data analysis consider sensors in isolation, evaluating their performance solely based on their primary function. Moreover, there is no established framework for comparing diverse sensors in a true peer-to-peer (e.g., apples to apples) fashion when considering the predictive accuracy of such diverse sensors for secondary endpoints.

Therefore, there is a need in the art for enhanced sensor assessments using machine learning to identify predictively accurate sensors for predicting values for secondary endpoints as opposed to simply assessing the predictive accuracy of sensors for primary outputs. The embodiments of the present application provide technical solutions that address, at least, the needs described above, as well as the deficiencies of the state of the art.

BRIEF SUMMARY OF THE INVENTION(S)

In one embodiment, a computer-program product includes in a non-transitory machine-readable storage medium storing computer instructions that, when executed by one or more processors, perform operations including identifying a set of heterogeneous sensors, wherein each sensor of the set of heterogeneous sensors generated sensor data based on a respective observation of a target environment; configuring a plurality of model training compositions for each sensor of the set of heterogeneous sensors, wherein each model training composition of the plurality of model training compositions for each sensor includes a unique combination of: (a) the sensor data of a subject sensor of the set of heterogeneous sensors, (b) a model input specification of one or more distinct model input specifications, the model input specification identifying at least a subset of distinct measurements of the sensor data, (c) a sensor data aggregation of one or more distinct sensor data aggregations, the sensor data aggregation, when applied to the model input specification, generates one or more distinct aggregations of the subset of distinct measurements of the sensor data, and (d) at least two machine learning models selected from a set of heterogeneous machine learning models, wherein a given machine learning model of the at least two machine learning models is trained using a corpus of training data samples; computing, for each of the plurality of model training compositions associated with each sensor of the set of heterogeneous sensors, a first efficacy metric value based on predictive outputs of the at least two machine learning models of a subject model training composition of the plurality of model training compositions; identifying, for each sensor of the set of heterogeneous sensors, a champion model training composition of the plurality of model training compositions of the subject sensor, the champion model training composition having a highest efficacy metric value among the first efficacy metric values computed for the plurality of model training compositions of the subject sensor; and electing, from a plurality of champion model training compositions corresponding to the champion model training compositions identified for each sensor of the set of heterogeneous sensors, an overall champion model training composition corresponding to a champion sensor of the set of heterogeneous sensors based on an assessment of second efficacy metric values of the plurality of champion model training compositions.

In one embodiment, the sensor data aggregation comprises a temporal aggregation that, when applied to the sensor data, aggregates the sensor data according to a target temporal domain of a plurality of temporal domains.

In one embodiment, the at least two machine learning models comprise a feature extraction model that transforms the one or more distinct aggregations of the distinct measurements of the sensor data to a set of features.

In one embodiment, the at least two machine learning models comprise dimensionality reduction models including a principal component analysis model, a gradient boost model, and an autoencoder model.

In one embodiment, the given machine learning model of the at least two machine learning models, once trained, perform a regression task for predicting based on the sensor data of the subject sensor, a likelihood of a target outcome that is a secondary endpoint that is not directly measurable by the sensor data of the subject sensor.

In one embodiment, the set of heterogeneous machine learning models include a generalized linear model, a random forest model, and an artificial neural network.

In one embodiment, computing the first efficacy metric value for each of the plurality of model training compositions for each sensor of the set of heterogeneous sensors includes calculating, using one or more error functions, an error metric value based on a difference between the predictive outputs of the at least two machine learning models of the subject model training composition and actual values of a validation set of data samples, and the first efficacy metric value comprises the error metric value.

In one embodiment, the computer-program product further uses the elected overall champion model training composition and the corresponding champion sensor to configure a computer-implemented predictive system that implements the at least two machine learning models of the elected overall champion model training composition to predict values of a target outcome spatially or temporally remote from a timing or location of the sensor data used in computing the first efficacy metric values or the second efficacy metric values.

In one embodiment, the computer-program product further uses the elected overall champion model training composition to select at least the champion sensor of a sensor suite comprising a subset of the set of heterogenous sensors to produces sensor data for a computer-implemented predictive system configured to predict agricultural-based on outcomes.

In one embodiment, the set of heterogeneous sensors include one or more terrestrial-based sensors, one or more aerial-based sensors, and one or more celestial-based sensors.

In one embodiment, the target environment comprises an area including agriculture arable land.

In one embodiment, the at least two machine learning models comprise: a feature extraction model selected from a set of heterogeneous feature extraction models, wherein the feature extraction model extracts a set of features from the one or more distinct aggregations of the subset of distinct measurements of the sensor data.

In one embodiment, a computer-implemented method includes identifying a set of heterogeneous sensors, wherein each sensor of the set of heterogeneous sensors generated sensor data based on a respective observation of a target environment; configuring a plurality of model training compositions for each sensor of the set of heterogeneous sensors, wherein each model training composition of the plurality of model training compositions for each sensor includes a unique combination of: (a) the sensor data of a subject sensor of the set of heterogeneous sensors, (b) a model input specification of one or more distinct model input specifications, the model input specification identifying at least a subset of distinct measurements of the sensor data, (c) a sensor data aggregation of one or more distinct sensor data aggregations, the sensor data aggregation, when applied to the model input specification, generates one or more distinct aggregations of the subset of distinct measurements of the sensor data, and (d) at least two machine learning models selected from a set of heterogeneous machine learning models, wherein a given machine learning model of the at least two machine learning models is trained using a corpus of training data samples; computing, by one or more processors, for each of the plurality of model training compositions associated with each sensor of the set of heterogeneous sensors, a first efficacy metric value based on predictive outputs of the at least two machine learning models of a subject model training composition of the plurality of model training compositions; identifying, for each sensor of the set of heterogeneous sensors, a champion model training composition of the plurality of model training compositions of the subject sensor, the champion model training composition having a highest efficacy metric value among the first efficacy metric values computed for the plurality of model training compositions of the subject sensor; and electing, from a plurality of champion model training compositions corresponding to the champion model training compositions identified for each sensor of the set of heterogeneous sensors, an overall champion model training composition corresponding to a champion sensor of the set of heterogeneous sensors based on an assessment of second efficacy metric values of the plurality of champion model training compositions.

In one embodiment, the sensor data aggregation comprises a temporal aggregation that, when applied to the sensor data, aggregates the sensor data according to a target temporal domain of a plurality of temporal domains.

In one embodiment, the at least two machine learning models comprise a feature extraction model that transforms the one or more distinct aggregations of the distinct measurements of the sensor data to a set of features.

In one embodiment, the at least two machine learning models comprise dimensionality reduction models including a principal component analysis model, a gradient boost model, and an autoencoder model.

In one embodiment, the given machine learning model of the at least two machine learning models, once trained, perform a regression task for predicting based on the sensor data of the subject sensor, a likelihood of a target outcome that is a secondary endpoint that is not directly measurable by the sensor data of the subject sensor.

In one embodiment, the set of heterogeneous machine learning models include a generalized linear model, a random forest model, and an artificial neural network.

In one embodiment, computing, by the one or more processors, the first efficacy metric value for each of the plurality of model training compositions for each sensor of the set of heterogeneous sensors includes calculating, using one or more error functions, an error metric value based on a difference between the predictive outputs of the at least two machine learning models of the subject model training composition and actual values of a validation set of data samples, and the first efficacy metric value comprises the error metric value.

In one embodiment, the computer-implemented method further uses the elected overall champion model training composition and the corresponding champion sensor to configure a computer-implemented predictive system that implements the at least two machine learning models of the elected overall champion model training composition to predict values of a target outcome spatially or temporally remote from a timing or location of the sensor data used in computing the first efficacy metric values or the second efficacy metric values.

In one embodiment, the computer-implemented method further uses the elected overall champion model training composition to select at least the champion sensor of a sensor suite comprising a subset of the set of heterogenous sensors to produces sensor data for a computer-implemented predictive system configured to predict agricultural-based on outcomes.

In one embodiment, a computer-implemented system includes one or more processors; a memory; and a computer-readable medium operably coupled to the one or more processors, the computer-readable medium having computer-readable instructions stored thereon that, when executed by the one or more processors, cause a computing device to perform operations comprising: identifying a set of heterogeneous sensors, wherein each sensor of the set of heterogeneous sensors generated sensor data based on a respective observation of a target environment; configuring a plurality of model training compositions for each sensor of the set of heterogeneous sensors, wherein each model training composition of the plurality of model training compositions for each sensor includes a unique combination of: (a) the sensor data of a subject sensor of the set of heterogeneous sensors, (b) a model input specification of one or more distinct model input specifications, the model input specification identifying at least a subset of distinct measurements of the sensor data, (c) a sensor data aggregation of one or more distinct sensor data aggregations, the sensor data aggregation, when applied to the model input specification, generates one or more distinct aggregations of the subset of distinct measurements of the sensor data, and (d) at least two machine learning models selected from a set of heterogeneous machine learning models, wherein a given machine learning model of the at least two machine learning models is trained using a corpus of training data samples; computing, by one or more processors, for each of the plurality of model training compositions associated with each sensor of the set of heterogeneous sensors, a first efficacy metric value based on predictive outputs of the at least two machine learning models of a subject model training composition of the plurality of model training compositions; identifying, for each sensor of the set of heterogeneous sensors, a champion model training composition of the plurality of model training compositions of the subject sensor, the champion model training composition having a highest efficacy metric value among the first efficacy metric values computed for the plurality of model training compositions of the subject sensor; and electing, from a plurality of champion model training compositions corresponding to the champion model training compositions identified for each sensor of the set of heterogeneous sensors, an overall champion model training composition corresponding to a champion sensor of the set of heterogeneous sensors based on an assessment of second efficacy metric values of the plurality of champion model training compositions.

In one embodiment, the sensor data aggregation comprises a temporal aggregation that, when applied to the sensor data, aggregates the sensor data according to a target temporal domain of a plurality of temporal domains.

In one embodiment, the at least two machine learning models comprise a feature extraction model that transforms the one or more distinct aggregations of the distinct measurements of the sensor data to a set of features.

In one embodiment, the at least two machine learning models comprise dimensionality reduction models including a principal component analysis model, a gradient boost model, and an autoencoder model.

In one embodiment, the given machine learning model of the at least two machine learning models, once trained, perform a regression task for predicting based on the sensor data of the subject sensor, a likelihood of a target outcome that is a secondary endpoint that is not directly measurable by the sensor data of the subject sensor.

In one embodiment, the set of heterogeneous machine learning models include a generalized linear model, a random forest model, and an artificial neural network.

In one embodiment, computing, by the one or more processors, the first efficacy metric value for each of the plurality of model training compositions for each sensor of the set of heterogeneous sensors includes calculating, using one or more error functions, an error metric value based on a difference between the predictive outputs of the at least two machine learning models of the subject model training composition and actual values of a validation set of data samples, and the first efficacy metric value comprises the error metric value.

In one embodiment, the system further uses the elected overall champion model training composition and the corresponding champion sensor to configure a computer-implemented predictive system that implements the at least two machine learning models of the elected overall champion model training composition to predict values of a target outcome spatially or temporally remote from a timing or location of the sensor data used in computing the first efficacy metric values or the second efficacy metric values.

In one embodiment, the system further uses the elected overall champion model training composition to select at least the champion sensor of a sensor suite comprising a subset of the set of heterogenous sensors to produces sensor data for a computer-implemented predictive system configured to predict agricultural-based on outcomes.

In one embodiment, a computer-program product includes a non-transitory machine-readable storage medium storing computer instructions that, when executed by one or more processors, perform operations including obtaining a corpus of raw sensor data based on observations captured by one or more sensors; generating an aggregated sensor data set based on applying a selected data aggregation technique to the corpus of raw sensor data; selecting a set of features from the aggregated sensor data set based on applying a feature selection algorithm to the aggregated sensor data set; and predicting, by a machine learning model, a value of a secondary endpoint based on an input of the selected set of features to the machine learning model, wherein outputs of the one or more sensors including the corpus of raw sensor data are indirectly related to an ultimate value of the secondary endpoint; and determining whether the value of the secondary endpoint predicted by the machine learning model does not satisfy a desired value of the secondary endpoint, wherein if the value of the secondary endpoint predicted by the machine learning model does not satisfy the desired value of the secondary endpoint, outputting via a graphical user interface one or more proposed adjustments that, when executed, likely facilitates the ultimate value of the secondary endpoint towards the desired value of the secondary endpoint.

In one embodiment, the outputs of the one or more sensors and the ultimate value of the secondary endpoint are indirectly connected via one or more intermediary factors.

In one embodiment, the one or more proposed adjustments include: adjusting one or more attributes of a subject associated with the secondary endpoint, and applying a physical manipulation that alters a state of the subject that encourages the secondary endpoint towards a desired value.

In one embodiment, a combination of the one or more sensors and the machine learning model was selected from a plurality of diverse combinations of one or more given sensors of a set of heterogeneous sensors and a given machine learning model of a set of heterogeneous machine learning models, and selecting the combination of the one or more sensors and the machine learning model was based on the combination of the one or more sensors and the machine learning model having a highest predictive accuracy for a holdout validation data set among the plurality of diverse combinations of the one or more given sensors of the set of heterogeneous sensors and the given machine learning model of the set of heterogeneous machine learning models.

In one embodiment, the feature selection algorithm includes a second machine learning model selected from a plurality of heterogenous machine learning models based on having a highest feature selection accuracy for a holdout validation data set among the plurality of heterogeneous machine learning models.

In one embodiment, the one or more proposed adjustments include adjusting the one or more attributes of a subject associated with the secondary endpoint causing a likely shift from the predicted value of the secondary endpoint to a desired value of the secondary endpoint.

In one embodiment, the computer-program product further calculates a difference between a desired value of the secondary endpoint and the predicted value of the secondary endpoint; and identifying one or more prescriptive adjustments to one or more attributes of a subject based on the calculated difference, wherein adjusting the one or more attributes of the subject includes applying the one or more prescriptive adjustments to the subject.

In one embodiment, the corpus of raw sensor data relates to a factor that is variably remote from the ultimate value of the secondary endpoint, wherein the corpus of raw sensor data does not directly impact the ultimate value of the secondary endpoint.

In one embodiment, the secondary endpoint includes a target variable that is unrelated to inputs to the one or more sensors.

In one embodiment, the secondary endpoint includes a target variable that is unrelated to the outputs of the one or more sensors.

In one embodiment, the secondary endpoint includes a target variable that is not directly measurable due to remoteness in time between factors that affect a value of the secondary endpoint and the ultimate value of the secondary endpoint.

In one embodiment, a computer-program product further includes detecting that the value of the secondary endpoint predicted by the machine learning model satisfy the desired value of the secondary endpoint; and outputting via the graphical user interface the one or more proposed adjustments.

In one embodiment, a computer-implemented method includes obtaining a corpus of raw sensor data based on observations captured by one or more sensors; generating an aggregated sensor data set based on applying a selected data aggregation technique to the corpus of raw sensor data; selecting a set of features from the aggregated sensor data set based on applying a feature selection algorithm to the aggregated sensor data set; and predicting, by one or more computer processors executing a machine learning model, a value of a secondary endpoint based on an input of the selected set of features to the machine learning model, wherein outputs of the one or more sensors including the corpus of raw sensor data are indirectly related to an ultimate value of the secondary endpoint; and determining, by the one or more computer processors, whether the value of the secondary endpoint predicted by the machine learning model does not satisfy a desired value of the secondary endpoint, wherein if the value of the secondary endpoint predicted by the machine learning model does not satisfy the desired value of the secondary endpoint, outputting via a graphical user interface one or more proposed adjustments that, when executed, likely facilitates the ultimate value of the secondary endpoint towards the desired value of the secondary endpoint.

In one embodiment, the outputs of the one or more sensors and the ultimate value of the secondary endpoint are indirectly connected via one or more intermediary factors.

In one embodiment, the one or more proposed adjustments include: adjusting one or more attributes of a subject associated with the secondary endpoint, and applying a physical manipulation that alters a state of the subject that encourages the secondary endpoint towards a desired value.

In one embodiment, a combination of the one or more sensors and the machine learning model was selected from a plurality of diverse combinations of one or more given sensors of a set of heterogeneous sensors and a given machine learning model of a set of heterogeneous machine learning models, and selecting the combination of the one or more sensors and the machine learning model was based on the combination of the one or more sensors and the machine learning model having a highest predictive accuracy for a holdout validation data set among the plurality of diverse combinations of the one or more given sensors of the set of heterogeneous sensors and the given machine learning model of the set of heterogeneous machine learning models.

In one embodiment, the feature selection algorithm includes a second machine learning model selected from a plurality of heterogenous machine learning models based on having a highest feature selection accuracy for a holdout validation data set among the plurality of heterogeneous machine learning models.

In one embodiment, the one or more proposed adjustments include adjusting the one or more attributes of a subject associated with the secondary endpoint causing a likely shift from the predicted value of the secondary endpoint to a desired value of the secondary endpoint.

In one embodiment, the computer-implemented method further includes calculating a difference between a desired value of the secondary endpoint and the predicted value of the secondary endpoint; and identifying one or more prescriptive adjustments to one or more attributes of a subject based on the calculated difference, wherein adjusting the one or more attributes of the subject includes applying the one or more prescriptive adjustments to the subject.

In one embodiment, the corpus of raw sensor data relates to a factor that is variably remote from the ultimate value of the secondary endpoint, wherein the corpus of raw sensor data does not directly impact the ultimate value of the secondary endpoint.

In one embodiment, the computer-implemented method further includes detecting that the value of the secondary endpoint predicted by the machine learning model satisfy the desired value of the secondary endpoint; and outputting via the graphical user interface the one or more proposed adjustments.

In one embodiment, the computer-implemented system includes one or more processors; a memory; and a computer-readable medium operably coupled to the one or more processors, the computer-readable medium having computer-readable instructions stored thereon that, when executed by the one or more processors, cause a computing device to perform operations includes obtaining a corpus of raw sensor data based on observations captured by one or more sensors; generating an aggregated sensor data set based on applying a selected data aggregation technique to the corpus of raw sensor data; selecting a set of features from the aggregated sensor data set based on applying a feature selection algorithm to the aggregated sensor data set; and predicting, by a machine learning model, a value of a secondary endpoint based on an input of the selected set of features to the machine learning model, wherein outputs of the one or more sensors including the corpus of raw sensor data are indirectly related to an ultimate value of the secondary endpoint; and determining whether the value of the secondary endpoint predicted by the machine learning model does not satisfy a desired value of the secondary endpoint, wherein if the value of the secondary endpoint predicted by the machine learning model does not satisfy the desired value of the secondary endpoint, outputting via a graphical user interface one or more proposed adjustments that, when executed, likely facilitates the ultimate value of the secondary endpoint towards the desired value of the secondary endpoint.

In one embodiment, the outputs of the one or more sensors and the ultimate value of the secondary endpoint are indirectly connected via one or more intermediary factors.

In one embodiment, the one or more proposed adjustments include: adjusting one or more attributes of a subject associated with the secondary endpoint, and applying a physical manipulation that alters a state of the subject that encourages the secondary endpoint towards a desired value.

In one embodiment, a combination of the one or more sensors and the machine learning model was selected from a plurality of diverse combinations of one or more given sensors of a set of heterogeneous sensors and a given machine learning model of a set of heterogeneous machine learning models, and selecting the combination of the one or more sensors and the machine learning model was based on the combination of the one or more sensors and the machine learning model having a highest predictive accuracy for a holdout validation data set among the plurality of diverse combinations of the one or more given sensors of the set of heterogeneous sensors and the given machine learning model of the set of heterogeneous machine learning models.

In one embodiment, the feature selection algorithm includes a second machine learning model selected from a plurality of heterogenous machine learning models based on having a highest feature selection accuracy for a holdout validation data set among the plurality of heterogeneous machine learning models.

In one embodiment, the one or more proposed adjustments include adjusting the one or more attributes of a subject associated with the secondary endpoint causing a likely shift from the predicted value of the secondary endpoint to a desired value of the secondary endpoint.

In one embodiment, the computer-implemented system calculates a difference between a desired value of the secondary endpoint and the predicted value of the secondary endpoint; and identifying one or more prescriptive adjustments to one or more attributes of a subject based on the calculated difference, wherein adjusting the one or more attributes of the subject includes applying the one or more prescriptive adjustments to the subject.

In one embodiment, the corpus of raw sensor data relates to a factor that is variably remote from the ultimate value of the secondary endpoint, wherein the corpus of raw sensor data does not directly impact the ultimate value of the secondary endpoint.

In one embodiment, the computer-implemented system further detects that the value of the secondary endpoint predicted by the machine learning model satisfy the desired value of the secondary endpoint; and outputting via the graphical user interface the one or more proposed adjustments.

DESCRIPTION OF THE PREFERRED EMBODIMENTS

Figure 1:
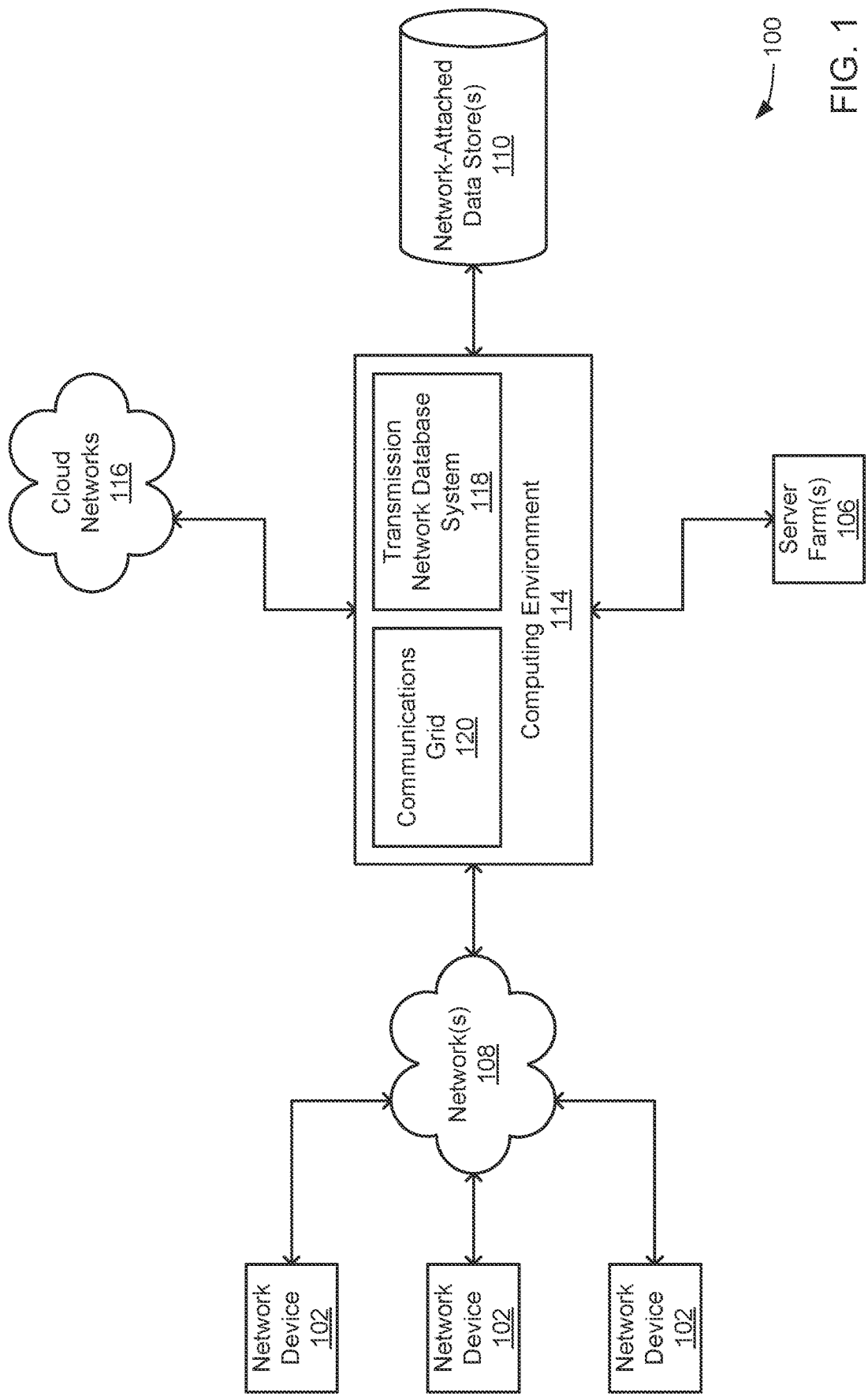
FIG. 1 illustrates a block diagram that provides an illustration of the hardware components of a computing system, according to some embodiments of the present technology.

The following description of the preferred embodiments of the inventions are not intended to limit the inventions to these preferred embodiments, but rather to enable any person skilled in the art to make and use these inventions.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Example Systems

Systems depicted in some of the figures may be provided in various configurations. In some embodiments, the systems may be configured as a distributed system where one or more components of the system are distributed across one or more networks in a cloud computing system.

The systems, methods, computer program products and embodiments described herein represent a significant advancement in the field of sensor data analysis, particularly in comparing sensor efficacy for predicting secondary endpoints across diverse applications. The embodiments provide a data-agnostic framework that standardizes sensor comparison regardless of their measurement specifics, creating a path for objective sensor evaluation and selection based on predictive accuracy for secondary outcomes, rather than the primary outputs that the sensors are designed to measure. That is, in various embodiments of the present application, the methods, systems, and computer program products compare sensors that measure different parameters (e.g., audio and visible wavelengths) with an objective of using machine learning techniques to predict secondary endpoints, which are outcomes or target variables not directly related to the sensors' primary inputs and outputs. The techniques described herein are particularly applicable for endpoints that are not immediately measurable due to their remoteness in time (i.e., secondary endpoints), such as crop yields or mortality (e.g., biology and living systems).

As further described in the embodiments of the present application, the methods, systems, and computer program products include unique capabilities that enable the comparison of heterogeneous sensors for any target outcome or target variable, employing a data-agnostic approach, a significant departure from current econometric models and precision metrics that consider sensors in isolation and only for their primary function. Rather, various embodiments of the present application evaluate sensors based on their relationship to a secondary endpoint, which is important for practical applications like crop management where a variety of sensors (e.g., spectral, soil moisture, drones, and the like) are used to predict outcomes such as yield. Thus, methods and systems employ a technical shift towards the predictive accuracy of sensors for secondary endpoints, which are often the ultimate measure of interest, such as predicting bridge failures, health diagnoses, crop yields, or livestock mortality.

As a non-limiting real-world application, the methods and systems of the present application may be executed for an accelerated and dynamic evaluation of sensors for peanut harvest deficit prediction using multiple types of sensors and associated sensor data and a variety of unique data science techniques. In such non-limiting example, a sensor assessment framework may include evaluating one or more sensors and sensor data in combination with various feature extraction techniques, predictive machine learning algorithms, and data aggregation techniques. The evaluation may yield hundreds, thousands, and sometimes tens of thousands or more of potential combinations, which are evaluated in the framework in an efficient and systematic manner for accelerating an identification of the best sensor within the best combination for predicting a target secondary endpoint.

At least one technical advantage of the embodiments of the present application includes providing a data-independent and model-agnostic framework for sensor evaluation, a pioneering approach that removes subjectivity, faulty guess work, and reliance on specific data models, thereby allowing for more flexible and adaptable sensor assessment.

At least another technical advantage of the embodiments of the present application includes promoting efficient resource allocation in industries and government, where it can be crucial to quantify the utility of adding or removing a sensor, not just in terms of measurement accuracy but also in terms of the sensor's impact on predicting crucial secondary outcomes.

Moreover, the embodiments of the present application also have the technical capability to function within diverse technological spheres. The framework of the embodiments of the present application is not limited to a single industry or application but is versatile enough to be integrated into agriculture, manufacturing, healthcare, and governmental operations, wherever a diversity of sensors is employed to achieve complex objectives.

In comparison to existing technologies, the presented invention offers a paradigm shift from traditional sensor evaluation metrics, which often tie the value of a sensor to its primary measurement accuracy, to a more outcome-centric approach that evaluates the sensor's value based on its contribution to predicting outcomes of interest. This shift is not merely an incremental improvement but a fundamental redefinition of the criteria for sensor utility in a wide range of settings.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 18 and/or a communications grid 120.

Figure 8:
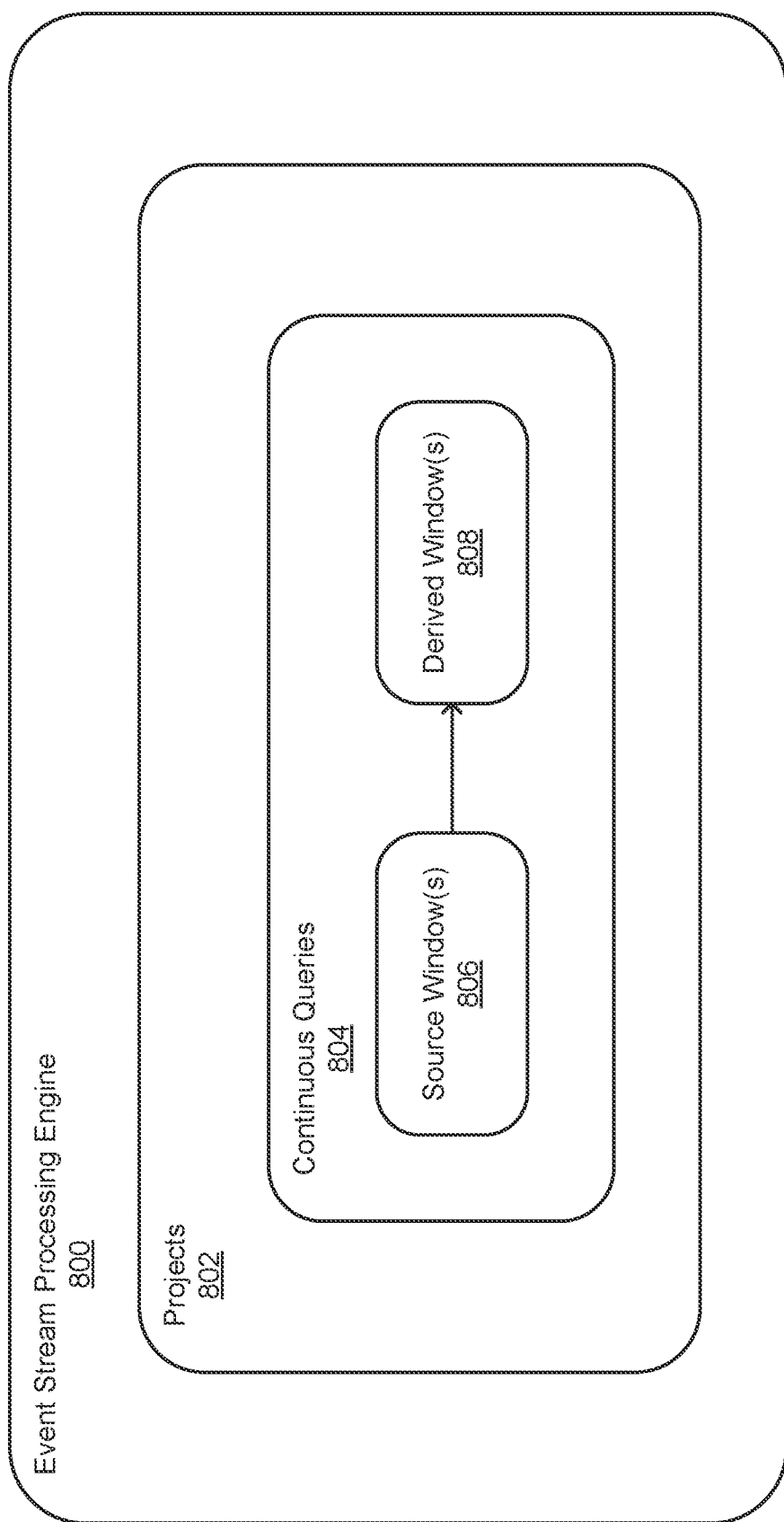
FIG. 8 illustrates a block diagram including components of an Event Stream Processing Engine (ESPE), according to embodiments of the present technology.
Figure 9:
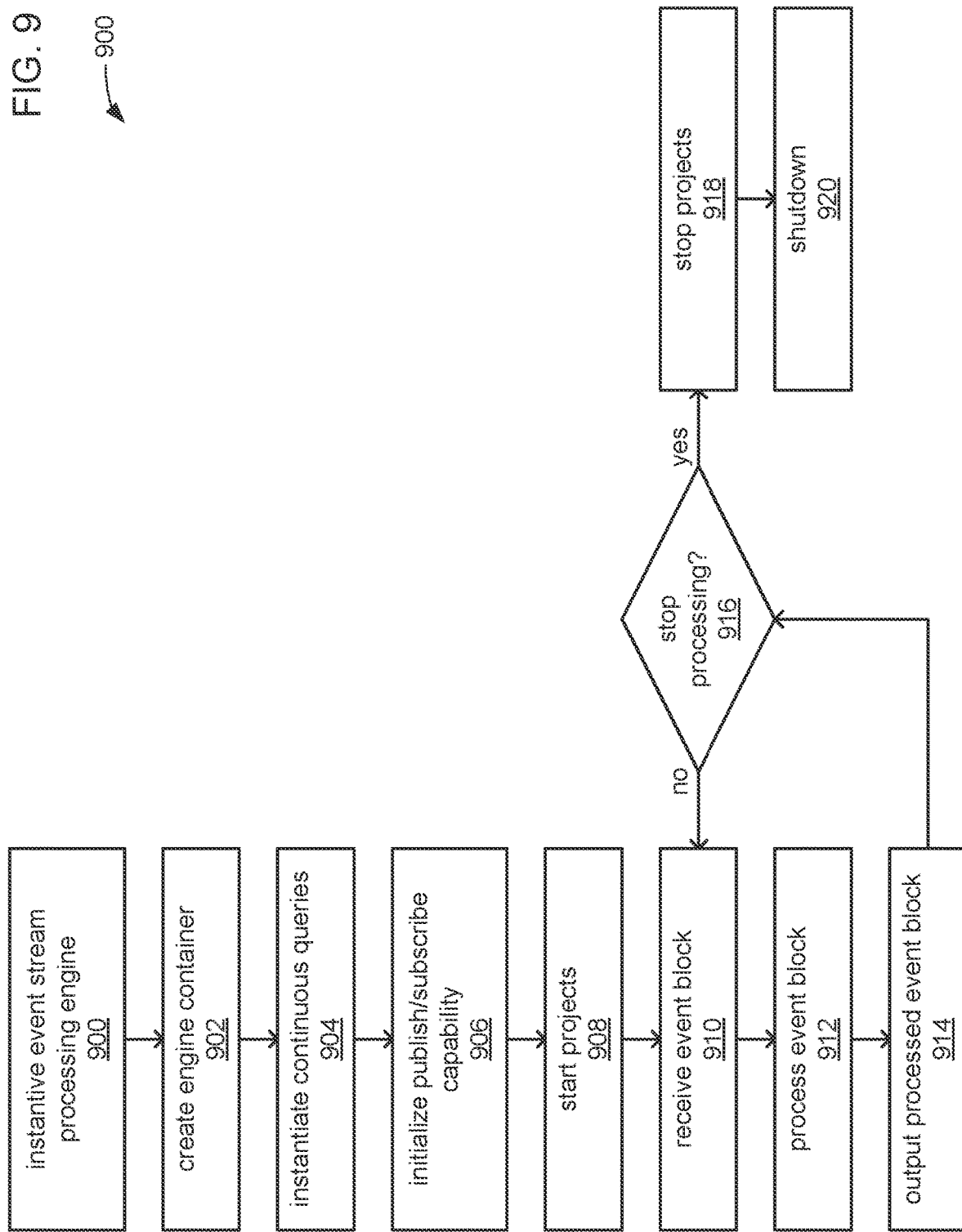
FIG. 9 illustrates a flow chart showing an example process including operations performed by an event stream processing engine, according to some embodiments of the present technology.
Figure 10:
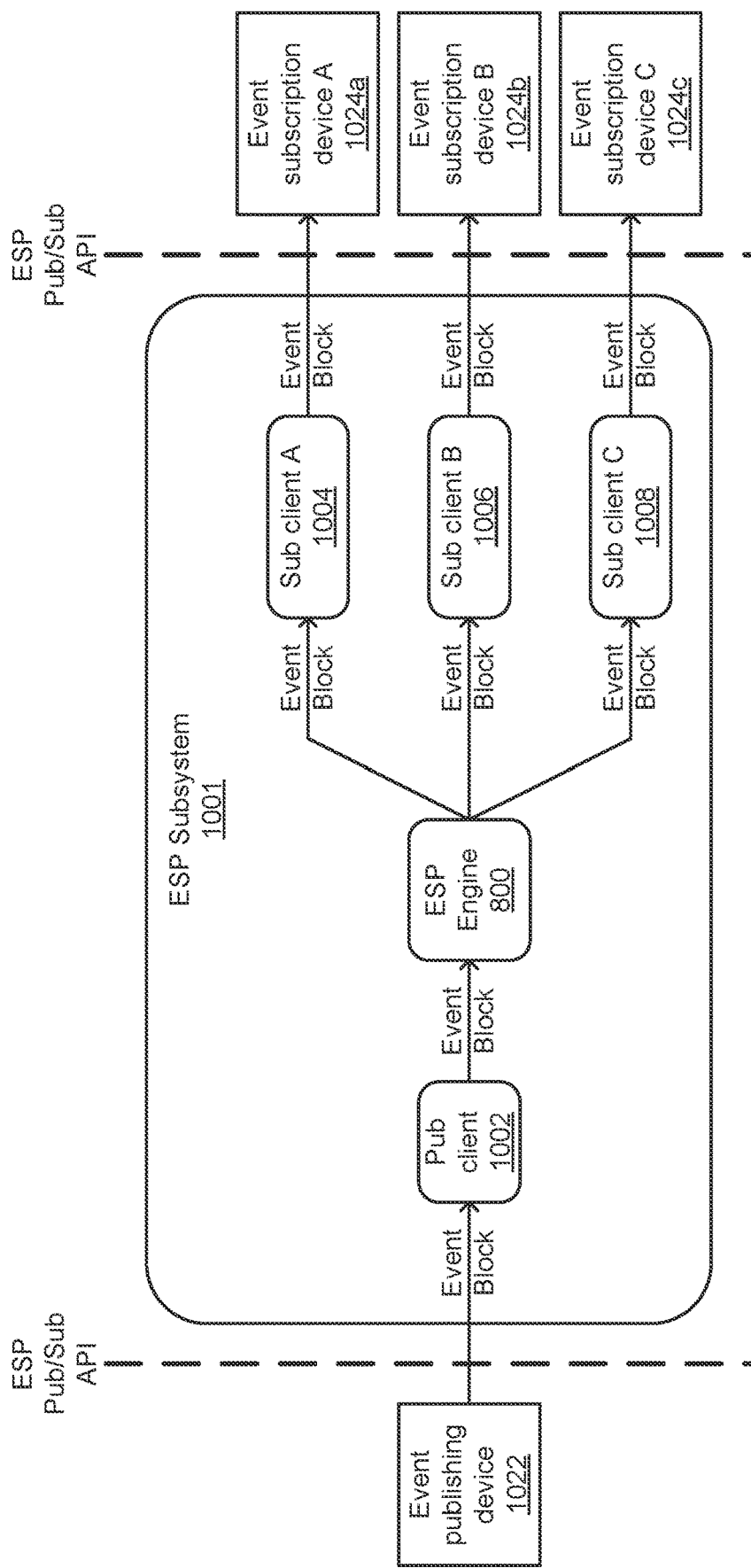
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TIS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 14.

Figure 2:
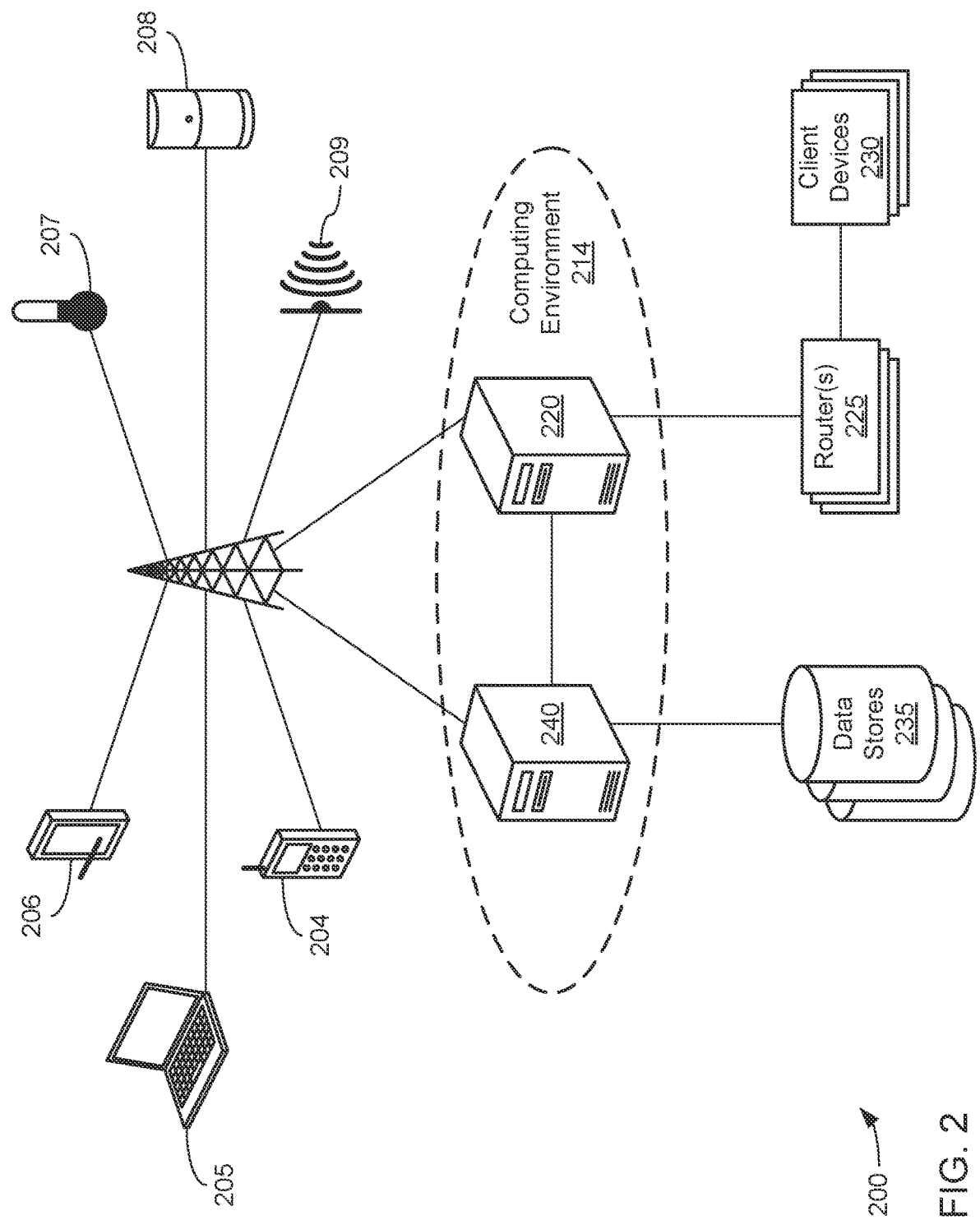
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
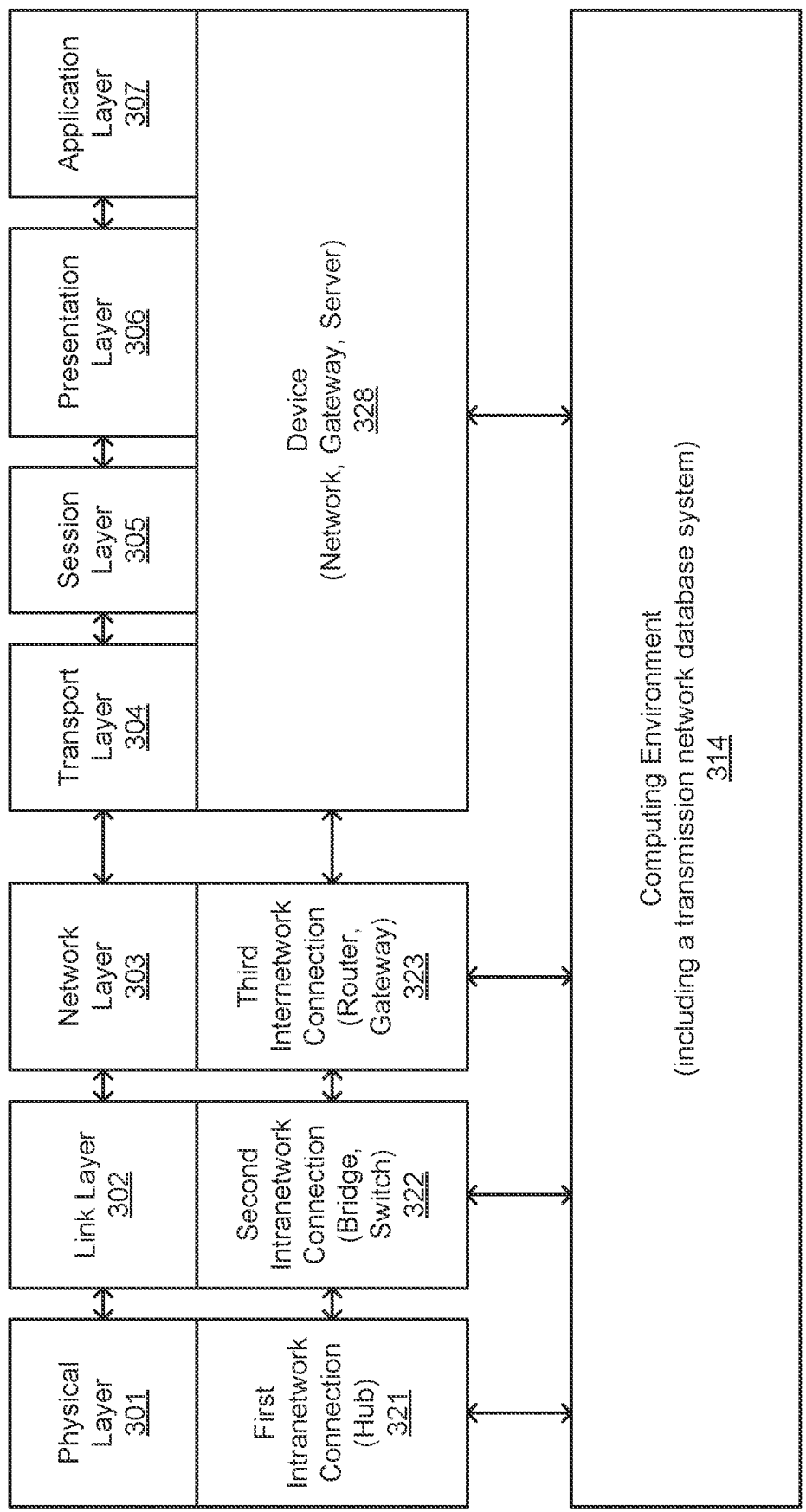
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
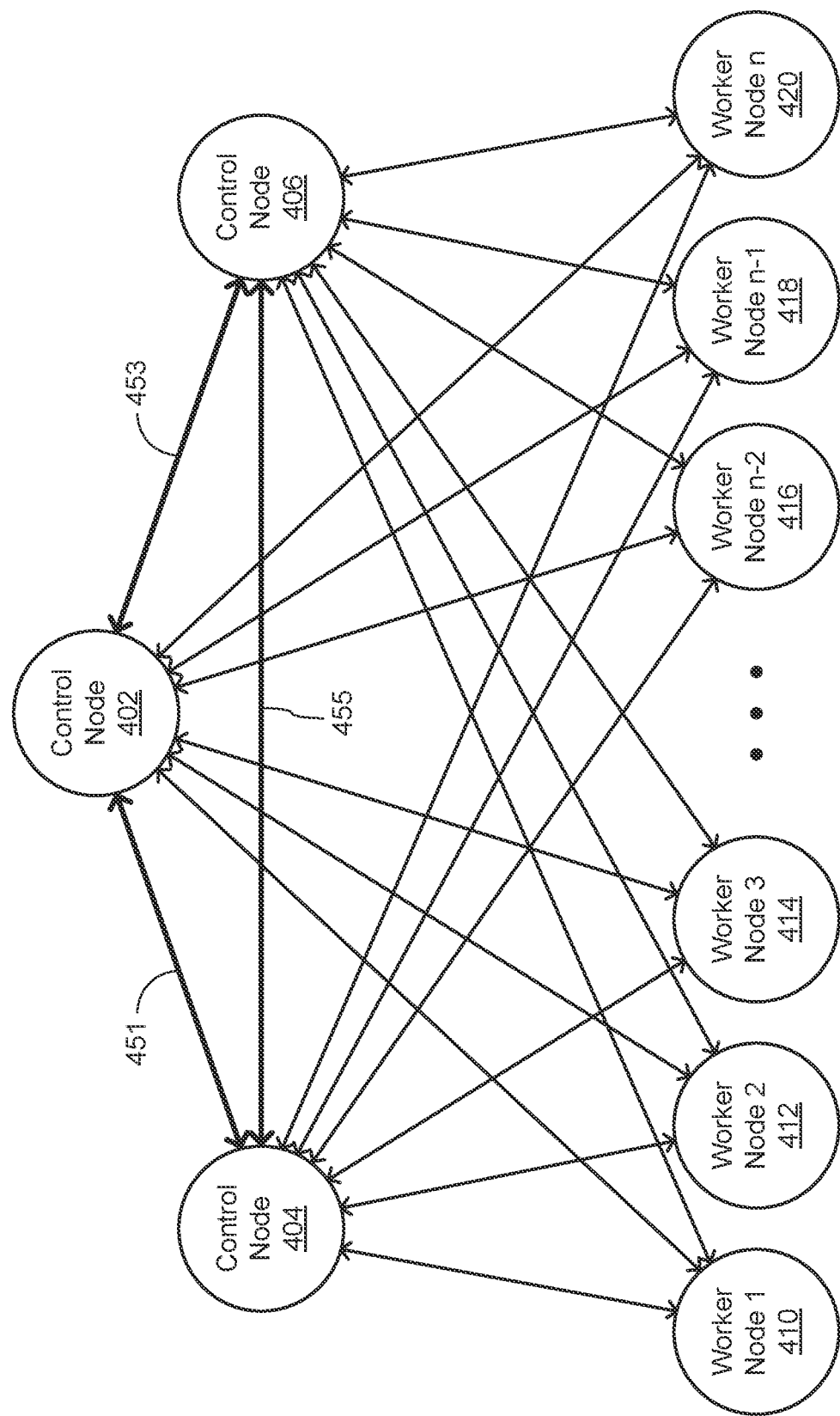
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
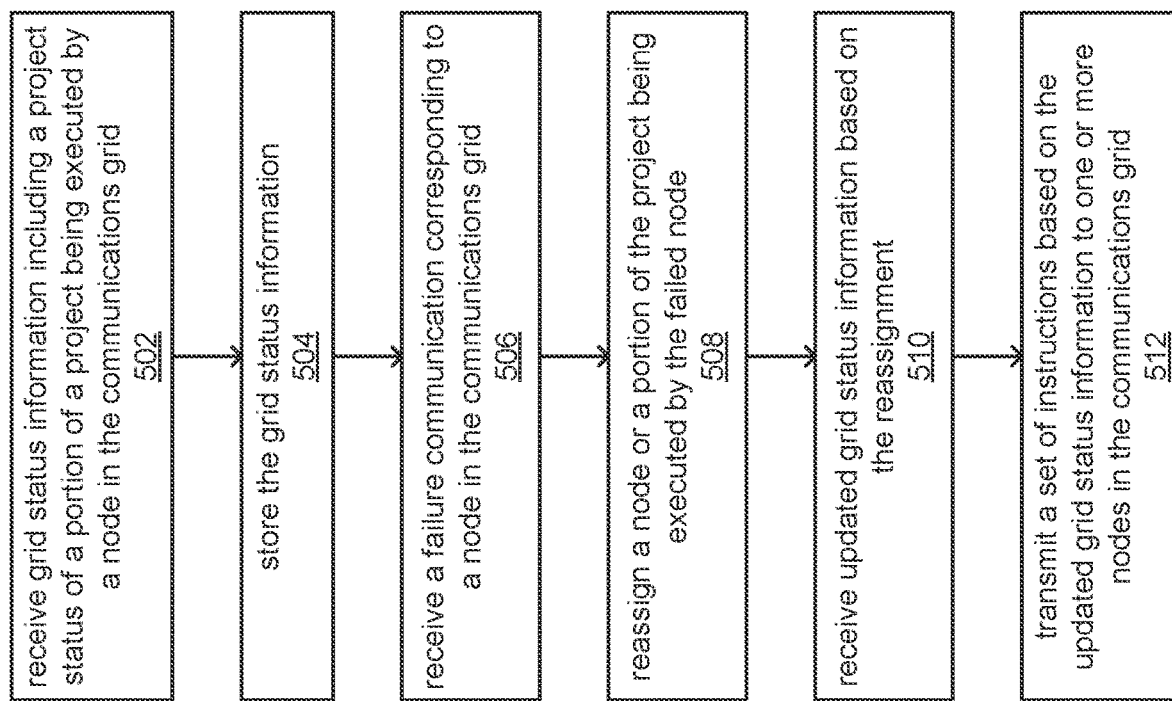
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
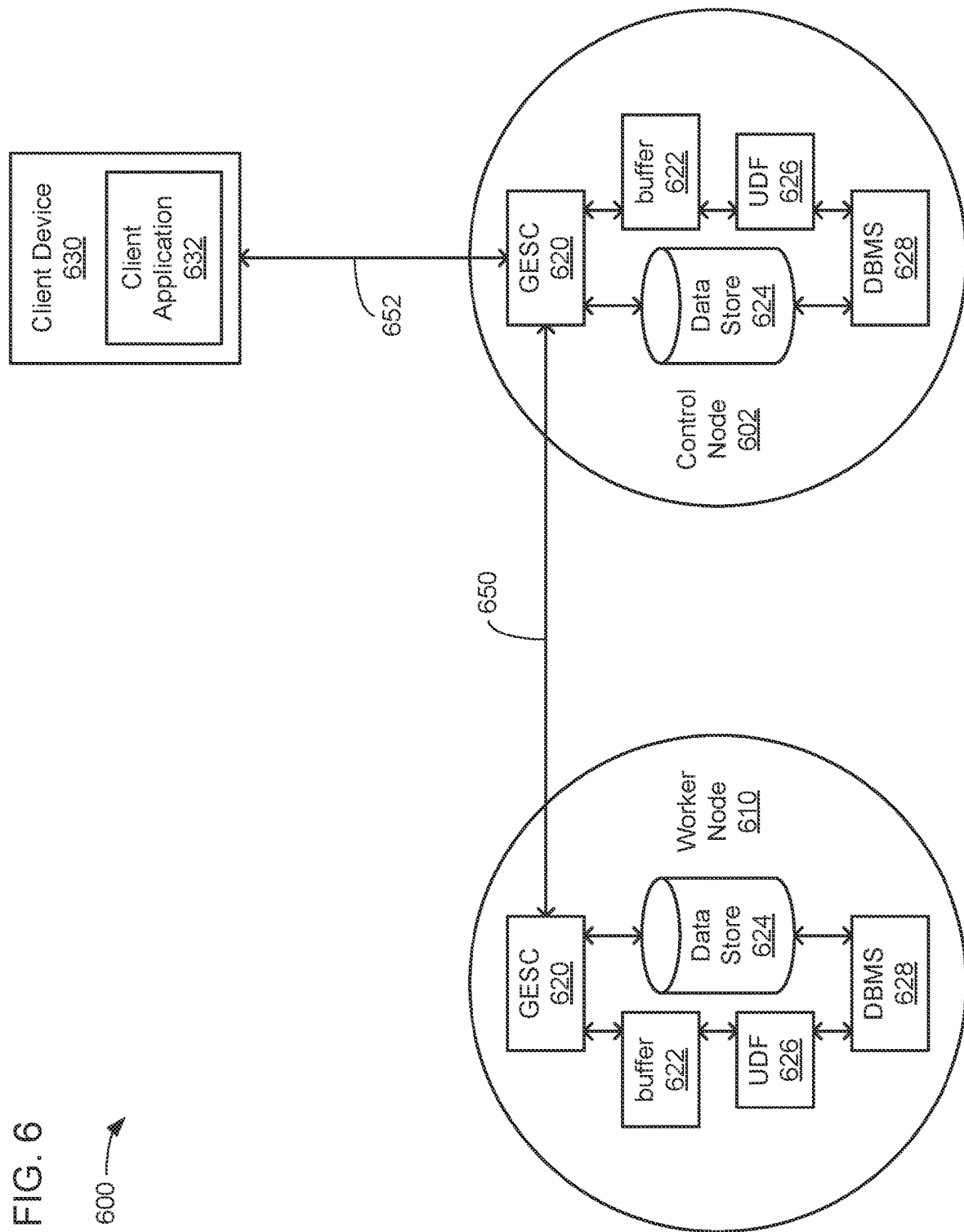
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
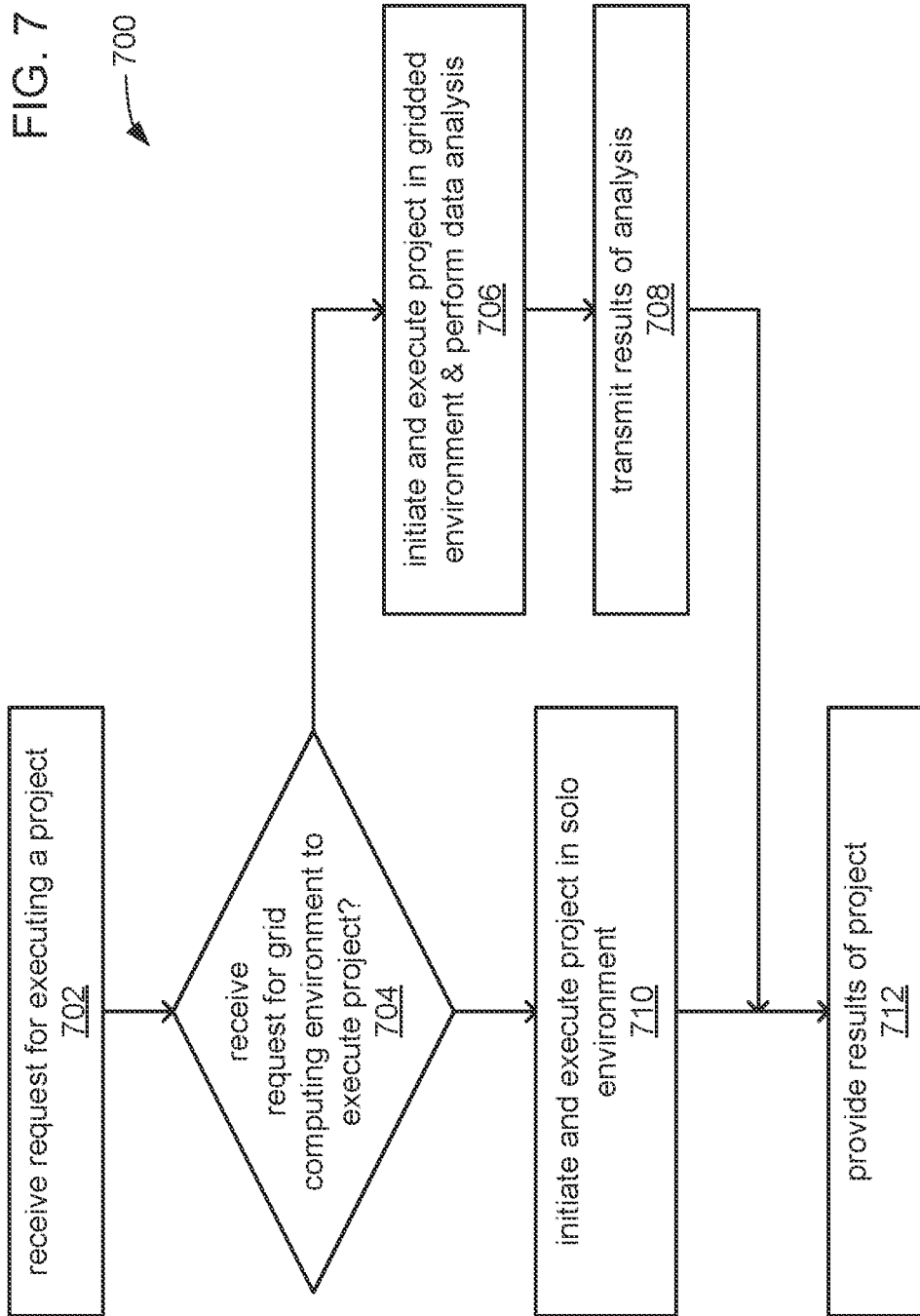
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024a, an event subscribing device B 1024b, and an event subscribing device C 1024c. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
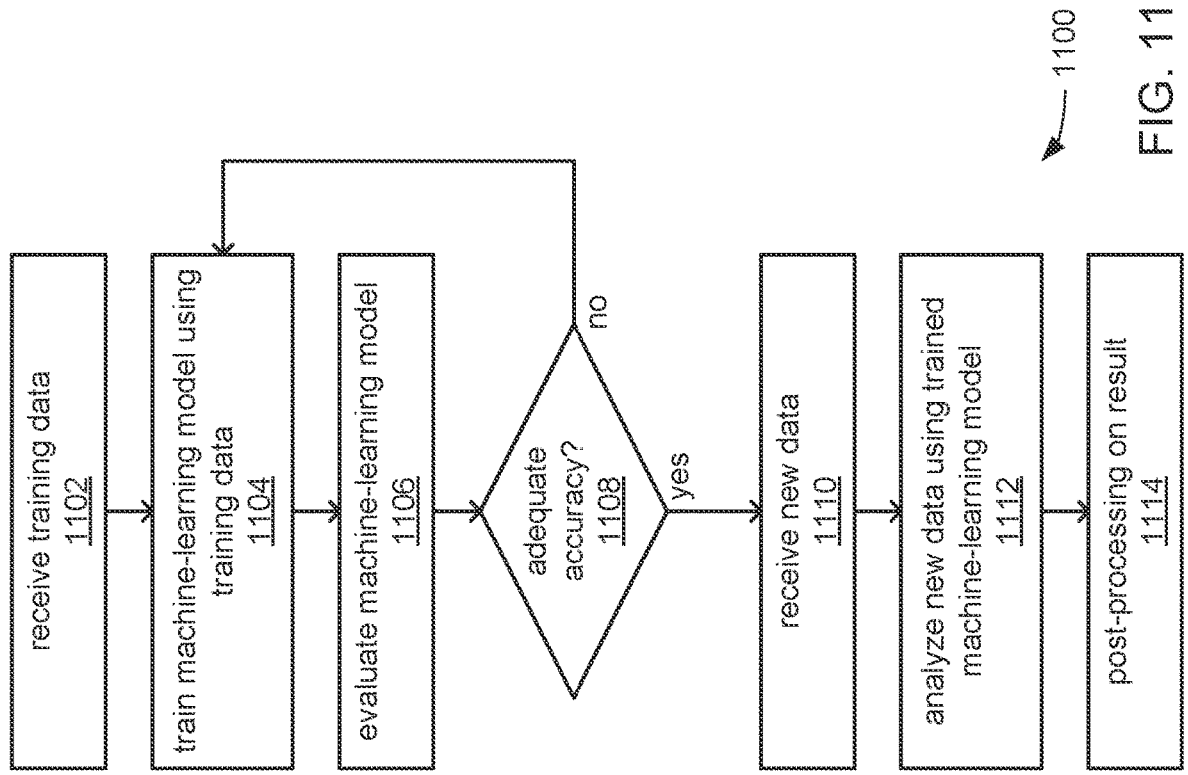
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
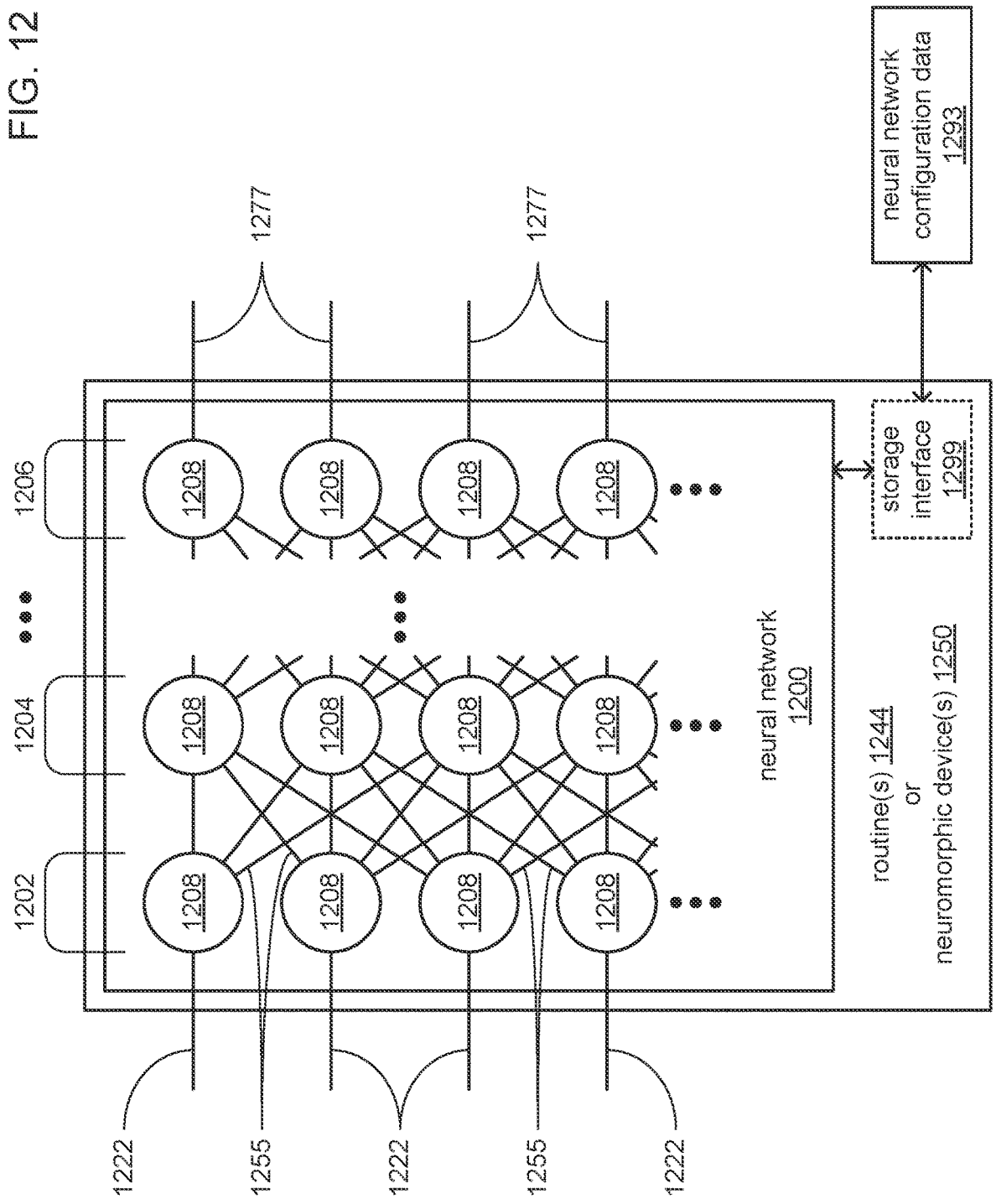
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively, or additionally, the neural network configuration data 1293 may include such hyperparameters as the manner in which the neurons 1208 are to be interconnected (e.g., feedforward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
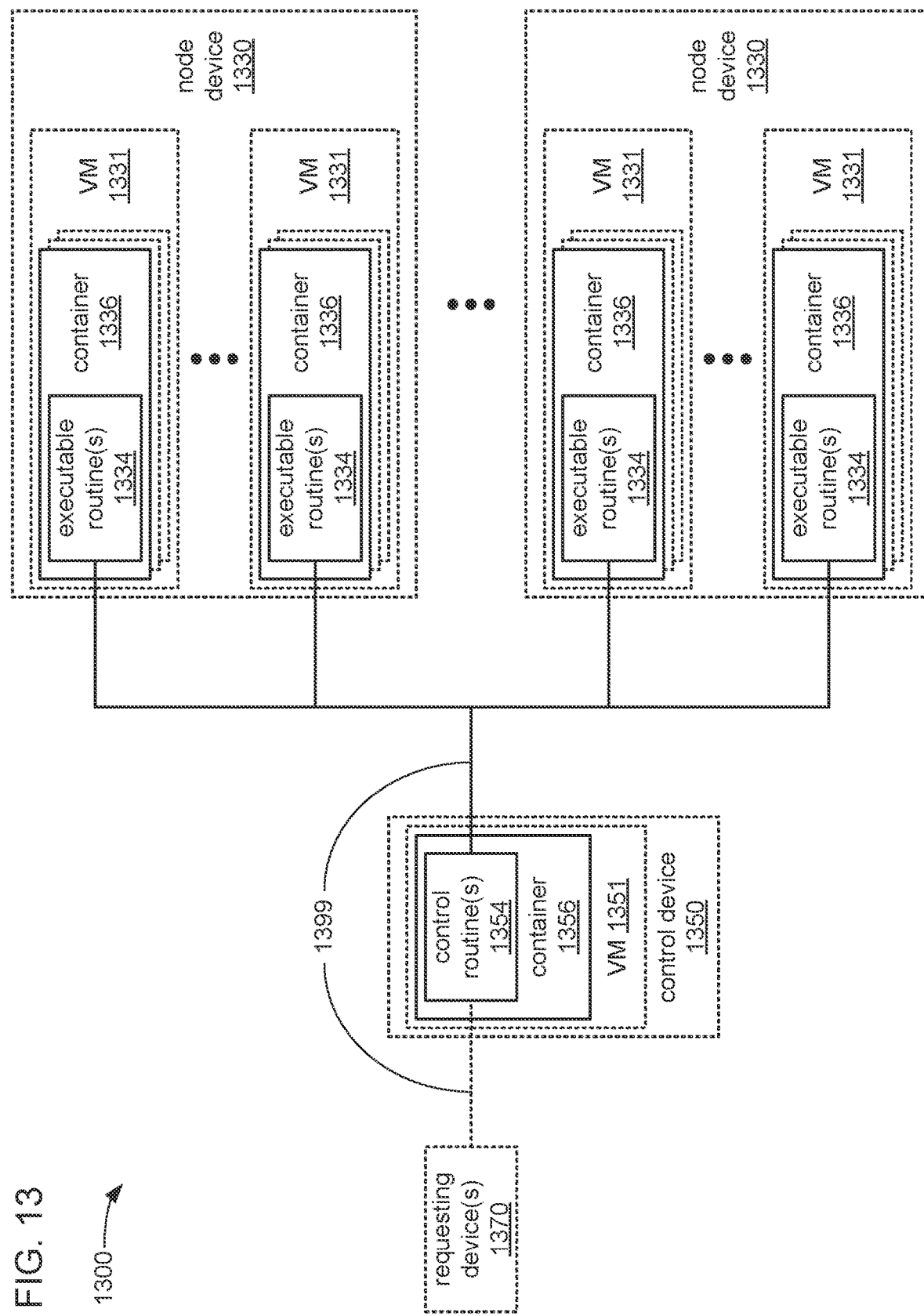
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively, or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively, or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/ or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively, or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively, or additionally, such supporting routines may serve to provide access to one or more storage repositories (not specifically shown) in which at least data objects may be stored for use in performing the requested analyses.

Figure 14:
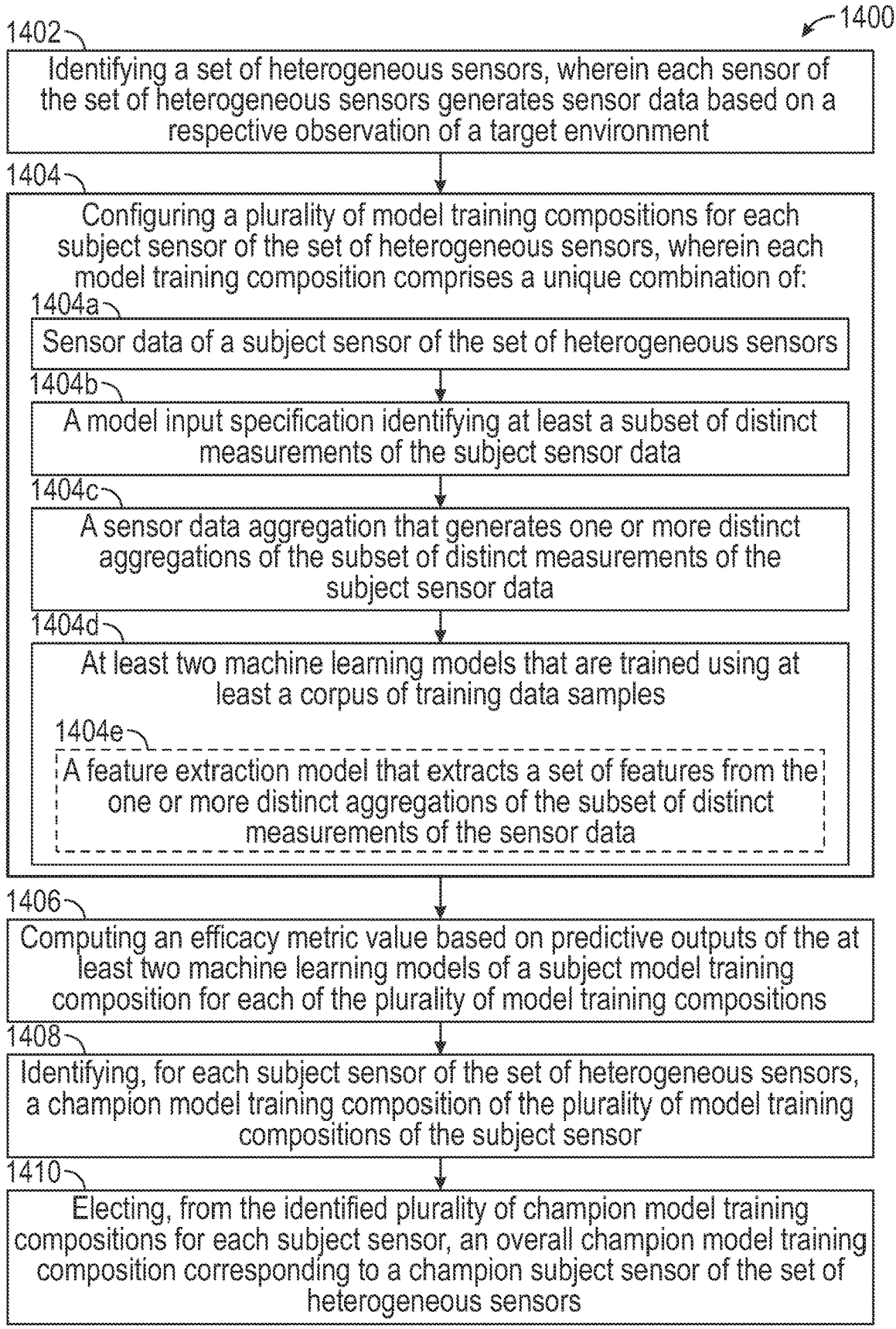
FIG. 14 illustrates a flow chart showing an example process of enhanced sensor assessments for predicting secondary endpoints, according to some embodiments of the present technology.

Associated Processes
Method for Enhanced Sensor Assessments for Predicting Secondary Endpoints FIG. 14 illustrates one embodiment of method 1400 for electing an overall champion sensor from a set of heterogeneous sensors. It shall be appreciated that other examples contemplated within the scope of the present disclosure may involve more operations, fewer operations, different operations, or a different order of operations than as shown in FIG. 14.

In some embodiments, method 1400 may include process 1402 that functions to identify a set of heterogenous sensors, where the set of heterogeneous sensors comprises sensors that have each generated respective sensor data. Sensor data, in the context of a given sensor of the set of heterogeneous sensors, may refer to the quantitative or qualitative measurements produced by the given sensor. When a cumulative set of sensor data includes different kinds of measured quantities or qualities of a particular environment, corresponding to the recorded outputs from different kinds (or genera) of sensors, the set of sensors that produce the cumulative sensor data is considered heterogeneous. Moreover, there are often outcomes of interest to a user of sensors that are not directly measurable by said sensors (sometimes referred to as "indirect" or "secondary" outcomes). As an example, sensors used in an agricultural field may measure various quantitative and qualitative attributes of the field but may be unable to directly measure an outcome of interest to the field owner such as the harvest of the agricultural field (or, harvest deficit relative to some previously determined expectation for the harvest). Method 1400 may provide a framework of functions by which sensor data from a set of heterogeneous sensors can be compared for its efficacy in predicting the outcome of interest that is not directly measurable by the set of heterogeneous sensors themselves, and further by which an overall champion sensor (or grouping of sensors, referred to as a "subject sensor") can be elected.

Figure 15:
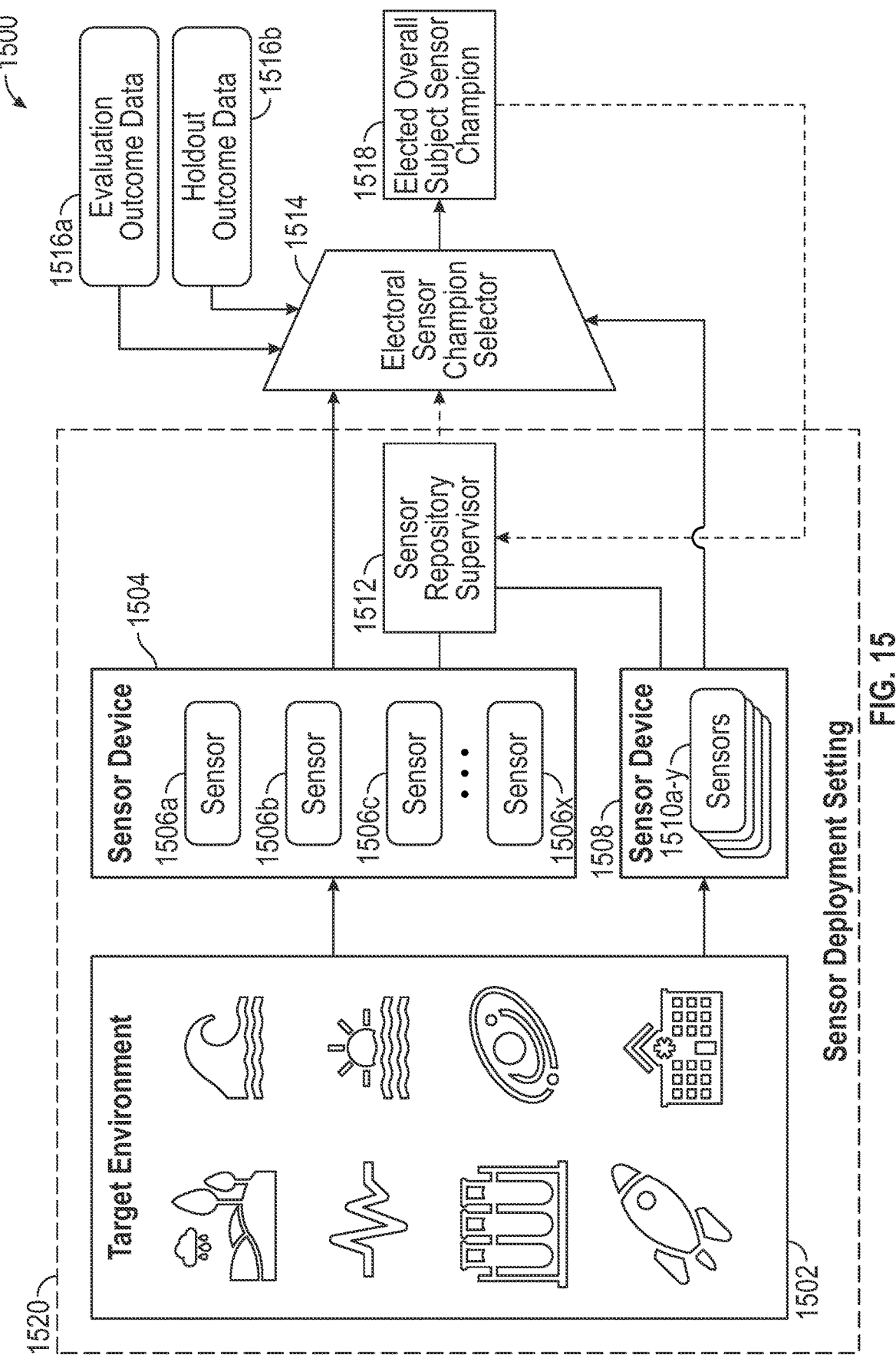
FIG. 15 illustrates an example schematic of an enhanced sensor assessments environment for predicting secondary endpoints, according to some embodiments of the present technology.

Turning briefly to FIG. 15, which illustrates an example of sensor champion selection system 1500, a sensor deployment setting 1520 can include a sensor device 1504 containing x different kinds, genera, or types of sensors: 1506a, 1506b, 1506c, [ . . . ], 1506x. Accordingly, the sensor data produced by sensors 1506a-x of sensor device 1504 may correspond to data from a set of heterogeneous sensors. Those skilled in the art can appreciate that a set of heterogeneous sensors may include sensors 1510a-y of sensor device 1508, in addition to sensors 1506a-x of sensor device 1504. Alternatively, a set of heterogeneous sensors may include sensors 1510a-y of sensor device 1508, instead of the sensors 1506a-x of sensor device 1504 (e.g., in embodiments where only a single sensor device and its sensors is used for collecting measurements of target environment 1502). In general, the identified set of heterogeneous sensors corresponds to the set of sensors responsible for originating the available sensor data or measurements of target environment 1502.

Although FIG. 15 illustrates two sensor devices, 1504 and 1508, any (e.g., more than two) number of sensor devices each containing any (e.g., x or y) number of sensors can be used to generate sensor data or measurements of target environment 1502. Upon generating sensor data corresponding to respective measurements from each of its x or y number of component sensors, a sensor device may provide component sensor data to sensor repository supervisor 1508 for collection and storage, and may additionally provide component sensor data to electoral sensor champion selector 1514 for determining elected overall subject sensor champion 1518, which corresponds to a specific sensor (or, specified group of sensors) determined by electoral sensor champion selector 1514 to have the greatest efficacy in predicting an indirect or secondary outcome relating to target environment 1502.

Identification of a set of heterogeneous sensors by process 1402 of method 1400 may involve generating component configuration data (not illustrated) specifying sensor types, genera, names, or other suitable identifiers for each of the sensors 1506a-x and 1510a-y of sensor devices 1504 and

1508. Component configuration data may function to identify and list the set of unique sensors used to produce sensor data. In particular, component configuration data may be provided to (or alternatively, generated by) sensor repository supervisor 1512 and/or electoral sensor champion selector 1514, and the sensors identified or specified by the component configuration data may serve as an index by which models configured based on model training compositions can be identified or indexed.

Based on the above example, process 1402 of FIG. 14 functions to identify the sensors used by each sensor device in its measurements of target environment 1502. In some embodiments, sensors used by each sensor device may be specified by component configuration data provided by each sensor device 1504 and 1508 to sensor repository supervisor 1512. In other embodiments, component configuration data may be generated by sensor repository supervisor 1512, based on its performance of sensor labeling or data format identification functions on received sensor data communications from the sensor devices. Sensor identification in these manners, whether based on identified labels and formatting or specified by component configuration data, may enable components of sensor champion selection system 1500 (e.g., sensor repository supervisor 1502 or electoral sensor champion selector 1514) to perform further aggregation or partitioning of sensor data received from the sensor devices on a per-sensor level. In other words, following the sensor identification function of process 1402, data from each of sensors 1506*a-x* and 1510*a-y* can be independently aggregated or grouped according to various specifications based on identified sensor type, genera, name, or any other suitable identifier.

Model training compositions used to generate outcome predictions may be indexed by unique identifiers (e.g., an ID resulting from the identification by process 1402) corresponding to the sensor(s) whose data is used to configure the model. Using an identifier for the sensor whose data is used to configure model training compositions as an index for said models may enable electoral champion selector 1514 to identify sensors that produce data capable of generating the most accurate outcome predictions by identifying best-performing model training compositions. As an example, a first set of model training compositions can be indexed by an identifier for sensor 1506*a*, and a second set of model training compositions can be indexed by an identifier for sensor 1506*b* or 1510*a* (e.g., a different sensor, either within the same sensor device 1504 or within a different sensor device 1508). According to the above example, a computed accuracy metric, error metric, efficacy metric, or any other suitable metric for measuring performance of a model may be computed, and compared to a computed metric for another model. In some embodiments, comparison of metrics measuring model performances may involve comparison to empirical or objective outcome data corresponding to actual outcomes corresponding to a geographic region or timeframe of sensor data input to the models.

Returning to FIG. 14, following the identification of a set of heterogeneous sensors by process 1402, process 1404 functions to configure a plurality of model training compositions for each sensor, where each model training composition comprises a combination of components 1404*a*, 1404*b*, 1404*c*, and optionally 1404*d*. Simply put, a model training composition refers to a specification of configuration settings used for a model. Components of a model training composition can be recorded or represented in any suitable manner, such as listed via embeddings within the model itself (e.g., metadata fields of the model data) or as an independent data structure (e.g., a data frame with rows indexed by components of the model training composition and a column containing values specifying components of the model training composition). After components of a model training composition are specified, a corresponding model may be configured and trained based on the components of the model training composition. Each model may therefore have an associated model training composition that specifies components (e.g., specific selections for components 1404*a*, 1404*b*, 1404*c*, and optionally 1404*d*) used to configure and train the model.

By process 1404, electoral sensor champion selector 1514 may generate a plurality of models each with its own distinct model training composition, for each subject sensor. As skilled artisans can appreciate, electoral sensor champion selector 1514 may generate a plurality of models for selected subsets of sensors from the set of heterogeneous sensors identified by process 1402, in addition to doing so for each individual component sensor of the sensor devices. In such embodiments, electoral sensor champion selector 1514 may evaluate the performance of models generated and configured based on data from selected subsets or groupings of sensors from the set identified by process 1402, in addition to models generated and configured based on data from individual sensors. In the context of the embodiments described herein, the term "subject sensor" may equivalently refer to an individual sensor from the set of heterogeneous sensors identified by process 1402, or a selected subset of multiple sensors from the set. Usually, a subject sensor comprising multiple sensors corresponds to a grouping of sensors from a common sensor device (e.g., grouping sensors 1506*a-x* from sensor device 1504, or sensors 1510*a-y* from sensor device 1508), but can equivalently correspond to any and all other subsets of interest from the set of heterogeneous sensors identified by process 1402.

In some embodiments, electoral sensor champion selector 1514 may generate the same plurality of models for each subject sensor (same in number, and in their associated model training compositions), and further customize a configuration of the models based on sensor-specific data to the subject sensor for said models, such as by adapting the corpus of training data samples used to train said modes to include sensor data specific to the subject sensor associated with a particular model. In such embodiments, electoral sensor champion selector 1514 may generate or configure a plurality of models for a first sensor (i.e., models with a custom configuration based on sensor data for the first sensor) and may further generate or configure the same plurality of models for a second sensor (i.e., models based on the same model training compositions, but configured based on sensor data for the second sensor).

In other embodiments, electoral sensor champion selector 1514 may generate or configure a first plurality of models for the first sensor, and may generate or configure a different, second plurality of models specific to the second sensor. In such embodiments, the model training compositions for generating or configuring models for the first sensor may be inapplicable to generating or configuring models for the second sensor. Additionally, or alternatively, it may be assumed that the same set and number of models are generated and configured for each subject sensor of the set of heterogeneous sensors identified by process 1402. In particular, the plurality of models for any given sensor generated and configured by electoral sensor champion selector 1514 may correspond to every valid combination of selections for each of the components 1404*a*, 1404*b*, 1404*c*, 1404*d*, and optionally 1404*e*.

As an example, if there are four component selections for component 1404*a* (corresponding to sensor data from four identified subject sensors), three component selections for component 1404*b* (corresponding to three model input specifications for each of the four identified sensors), two component selections for component 1404*c* (corresponding to two sensor data aggregations for each of the three model input specifications), two component selections for component 1404*e* (corresponding to two feature extraction models for each of the two sensor data aggregations), and two component selections for component 1404*d* (corresponding to two machine learning models for each of the two feature extraction models), and if all of the selectable combinations of components are valid, the total number of models and model training compositions that electoral sensor champion selector 1514 may generate for each subject sensor is equal to the product of the number of component selections for each of the components 1404*a*, 1404*b*, 1404*c*, 1404*d*, and 1404*e* (the product of four, three, two, two, and two, which is ninety-six). According to such an example, process 1404 may function to configure electoral sensor champion selector 1514 to generate ninety-six models for each subject sensor of the set of heterogeneous sensors identified by process 1402. Extending the above example, if there are n number of subject sensors (i.e., the number of single sensors and selected subsets of the set of sensors is n, corresponding to the valid number of selections for component 1404*a*), process 1404 may function to configure 48*n model training compositions, associated with the same number of predictive models for an outcome of interest.

Each model training composition configured by process 1404 may include a component 1404*a* corresponding to sensor data of a subject sensor of the set of heterogeneous sensors. As detailed above, process 1402 functions to identify individual sensors of the set of heterogeneous sensors, enabling corresponding sensor data generated by the individual sensors to be selectively sorted or processed on the basis of the name, type, genus, or other identifier for the sensor. Component 1404*a* of process 1404 may refer to the subset of cumulative sensor data corresponding to data produced by a subject sensor, where the cumulative sensor data is data from the entirety of the set of heterogeneous sensors identified by process 1402.

As noted previously, a "subject sensor" can consist of a single given sensor of the set of heterogeneous sensors identified by process 1402 or can alternatively consist of a subset of multiple sensors selected from the set of heterogeneous sensors (e.g., all of the component sensors of a sensor device). In some embodiments, models generated and configured by electoral sensor champion selector 1514 for a subject sensor comprising a single component sensor may require the entirety of the sensor data corresponding to the single component sensor for component 1404*a*. In some embodiments, for a subject sensor comprising a single component sensor, only specified sensor data from the component sensor (e.g., maximum values, minimum values, average values) may be required for component 1404*a*. In some embodiments, models generated and configured for a subject sensor comprising multiple sensors (e.g., sensors grouped by sensor device) may require the entirety of the sensor data corresponding to each of the multiple sensors for component 1404*a*. Component 1404*a* of process 1404 may generally represent a base set of all available or stored data corresponding to measurements of target environment 1502 by a subject sensor required for training a model, specified by the model training composition, for predicting an outcome that is not directly measurable by the subject sensor.

In some embodiments, component 1404*a* further represents a basis for a corpus of training data samples used to train machine learning models of component 1404*d*.

Each model training composition configured by process 1404 may further include component 1404*b* corresponding to a model input specification identifying at least a subset of distinct measurements of the sensor data (e.g., a subset of distinct measurements of component 1404*a*). Model input specifications of component 1404*b* may function to identify a sampling setting for subject sensor data of component 1404*a*. In some embodiments, where subject sensor data of component 1404*a* corresponds to data measurements from a single sensor, model input specification of component 1404*b* may identify a spatial subset of the data measurements from the single sensor (e.g., a subset of data measurements corresponding to measurements by the sensor at specified locations of target environment 1502). In other embodiments, where subject sensor data of component 1404*a* corresponds to data measurements from multiple sensors, model input specification of component 1404*b* may identify a sensor subset of the data measurements from the multiple sensors (e.g., a subset of component 1404*a* corresponding to measurements by the sensor subset). In some such embodiments, component 1404*b* may specify a subset of names, types, genera, or other identifiers of sensors from the set of multiple sensors to be used by the model. Component 1404*b* of process 1404 may generally represent one or more filtering criteria applied to component 1404*a* that are based on spatial specifications and/or sensor subset specifications.

Each model training composition configured by process 1404 may further include component 1404*c* corresponding to a sensor data aggregation that generates one or more distinct aggregations of the subset of distinct measurements of the sensor data (e.g., distinct aggregations of the sensor data subsets specified by component 1404*b*). Sensor data aggregations of component 1404*c* may function to generate groupings of the data specified by component 1404*b*, based on temporal specifications, or subject sensor-specific specifications (e.g., different spatial specifications than those identified by component 1404*b*, qualitative specifications, statistical specifications). When temporal sensor data aggregations are applied to sensor data subsets corresponding to the specifications of component 1404*b*, the sensor data subsets may be converted to (or, aggregated according to) a target temporal domain of a plurality of temporal domains. Examples of temporal specifications by component 1404*c* may include sampling intervals (e.g., daily, weekly, monthly interval data) or aggregate time-scales (e.g., 2-week, 4-week, 6-week span data) for specified sets of subject sensor data produced according to component 1404*b*. Examples of sensor-specific specifications by component 1404*c* may include sampling areas (e.g., 100, 200, 400 square meter data), depth or altitude levels (e.g., 0-10 inches, 0-20 inches, 0-30 inches below ground level data), qualities (e.g., data indicating pathogen presence), or statistical metrics (e.g., data average, minimum, maximum, variance, total). Component 1404*c* of process 1404 may generally represent one or more aggregation criteria applied to component 1404*b* that are based on temporal specifications or subject sensor-specific specifications.

Each model training composition configured by process 1404 may further include component 1404*d* corresponding to at least two machine learning models that are trained using at least a corpus of training data samples, where the corpus of training data samples is based on a combination of sensor data aggregated according to component 1404*c* and evaluation outcome data 1516*a* (shown in FIG. 15 as an input to electoral sensor champion selector 1514). In some embodiments, at least a first machine learning model of the at least two machine learning models of component 1404*d* may optionally be substituted by component 1404*e*. Component 1404*e* may correspond to a feature extraction model that produces a set of features extracted from the one or more distinct aggregations of the subset of distinct measurements of the sensor data (e.g., sensor data aggregated according to component 1404*c*). Skilled artisans can appreciate that the feature extraction model of component 1404*e* may comprise a dimensionality reduction model that produces a data set with a reduced dimensionality (or, reduced processing complexity) relative to input sensor data aggregated according to component 1404*c*.

When a first machine learning model of the at least two machine learning models of component 1404*d* is substituted by a feature extraction model of component 1404*e*, a second machine learning model of component 1404*d* may receive as input the set of extracted features produced by component 1404*e*, and may produce an outcome prediction that is not directly measurable by any of the subject sensors based on one or more transformations by the second machine learning model of its inputs. In other embodiments, component 1404*e* may be omitted, and a first machine learning model of component 1404*d* may receive subject sensor data aggregated according to component 1404*c* as its input and may function to produce outputs according to transformation characteristics of the first machine learning model that reduce a dimension or processing complexity of the aggregated subject sensor data. In such other embodiments, outputs of the first machine learning model may be provided to the second machine learning model as described above in connection with the set of extracted features produced according to component 1404*e*. In some embodiments, component 1404*e* may be equivalent to a machine learning procedure involving one, two, or more than two machine learning model instances per model training composition.

Feature extraction models of component 1404*e* may include models that perform analytic procedures including the following non-limiting list of example procedures: principal component analysis (PCA) procedures, gradient boosting machines (GBM) procedures, singular value decomposition (SVD) procedures, independent component analysis (ICA) procedures, linear discriminant analysis (LDA) procedures, or autoencoder neural network procedures. Machine learning models of component 1404*d* may include models that perform analytic and predictive procedures including the following non-limiting list of example procedures including: generalized linear modeling procedures such as linear regression, artificial neural network modeling procedures, gradient boosting modeling procedures, random forest procedures, factorization machine procedures, support vector machine (SVM) procedures, or Bayesian network procedures. Components 1404*d* and 1404*e* of any may generally represent two steps of a machine learning model-based transformation of sensor data aggregated according to component 1404*c*, namely: a first step whereby the sensor data aggregated according to component 1404*c* is transformed by either a first machine learning model of component 1404*d* or a feature extraction model of component 1404*e* that produces dimensionally reduced subject sensor data corresponding to features of the entirety of the aggregated and specified subject sensor data, and a second step whereby a second machine learning model of component 1404*d* generates an outcome prediction based on the dimensionally reduced data produced by the first step. Dimensionally reduced subject sensor data produced by the first step may effectively reduce dimensionality or otherwise reduce processing complexity associated with the entirety of the aggregated and specified subject sensor data by the second machine learning model of component 1404*d* that generates the outcome prediction. Machine learning models of component 1404*d* may be supervised learning models that have been trained using a corpus of training data that may include labeled input sets of extracted features of input sensor data, labeled evaluation outcome data 1516*a*, or other labeled outputs corresponding to a set of labeled inputs (e.g. labeled input subject sensor data). Machine learning models of component 1404*d* may function to produce outcome predictions of an outcome not directly measurable by any of the subject sensors by performing one or more machine learning model-based transformations on input subject sensor data that is either aggregated and specified according to component 1404*c*, or that has been transformed to a set of extracted features or any other suitable dimensionally reduced subset of subject sensor data according to component 1404*e*.

Following configuration of the plurality of model training compositions that comprises training of the at least two machine learning models of component 1404*d*, method 1400 proceeds to process 1406 which may function to compute an efficacy metric value based on predictive outputs of the at least two machine learning models of a subject model training composition for each of the plurality of model training compositions. Of the at least two machine learning models of component 1404*d* of any given model training composition, at least one of the machine learning models may be a supervised learning model trained using a corpus of training data and configured to generate a set of features extracted from subject sensor data. Another machine learning model of any given model training composition may be a supervised learning model trained using a corpus of training data that includes evaluation outcome data 1516*a* and configured to generate an outcome prediction.

Process 1406 may function to compute an efficacy metric value for each model corresponding to a model training composition configured by process 1404, which configures model training compositions (whose number is the product of the valid component selections for each of components 1404*a*, 1404*b*, 1404*c*, 1404*d*, and optionally 1404*e*) for each subject sensor. To generate outcome predictions, process 1406 may provide evaluation sensor data 1710 aggregated and specified according to components 1404*b* and 1404*c* to the subject sensor champion models as input (as detailed below, in connection with FIGS. 16-19B), and the subject sensor champion models may generate respective outcome predictions (based on the evaluation sensor data 1710) as outputs. For any given model corresponding to a configured model training composition, process 1406 may function to provide its at least two machine learning models of component 1404*d* input data corresponding to evaluation sensor data 1710 for the subject sensor aggregated and specified according to components 1404*b* and 1404*c*. Because one of the machine learning models of component 1404*d* has been trained using supervised learning techniques using a corpus of training data samples based on evaluation outcome data 1516*a*, component 1404*d* may function to generate an outcome prediction upon receiving and processing evaluation sensor data for the subject sensor.

Process 1406 may function to generate an efficacy metric value based on a comparison of the generated outcome prediction to evaluation outcome data 1516*a*. In some embodiments, the efficacy metric may be based on an error metric selected from the following non-limiting list of examples: residuals, mean absolute error (MAE), mean squared error (MSE), root mean squared error (RMSE), or percentage error. The efficacy metric may generally indicate a degree of variance between an outcome prediction generated by component 1404d of a model, and empirical outcome data such as evaluation outcome data 1516a. Process 1406 may function to generate the efficacy metric for each model associated with a model training composition configured by process 1404 and may therefore generate the efficacy metric for models corresponding to every valid combination of components 1404a, 1404b, 1404c, 1404d, and optionally 1404e.

Following the computation of efficacy metric values for each of the model training compositions by process 1406, method 1400 proceeds to process 1408 which may function to identify a champion model training composition of the plurality of model training compositions for each subject sensor of the set of heterogeneous sensors. Process 1408 may function to identify a model training composition for each subject sensor responsible for generating the most accurate outcome prediction by its machine learning models of component 1404d (i.e., the model outcome prediction with the highest efficacy metric value computed by process 1406 associated with each subject sensor). As an example, process 1408 may perform a first champion identification for a first subject sensor by identifying a model training composition associated with a highest efficacy metric value from among all of the model training compositions configured for the first subject sensor by process 1404, and may further perform a second champion identification for a second subject sensor by identifying a model training composition associated with a highest efficacy metric value from among all of the model training compositions configured for the second subject sensor by process 1404, and so on for all of the subject sensors in the set of heterogeneous sensors identified by process 1402. A result of process 1408 may be a set of identified champion model training configurations corresponding to respective subject sensors of the set of heterogeneous sensors. Optionally, process 1408 may identify and rank runner-up model training compositions that generate less accurate outcome predictions than the champion model training compositions. In this way, in some embodiments, process 1400 may ensemble into a larger and likely more capable system a plurality of model training configurations together with one or more champion model training configurations.

Following the identification of a champion model training composition for each subject sensor by process 1408, method 1400 proceeds to process 1410 which may function to elect, from said plurality of identified champion model training compositions, an overall champion model training composition corresponding to a champion sensor of the set of heterogeneous sensors. Processes 1406 and 1408 may correspond to determining (by 1406) and ranking (by 1408) performances of models and their respective model training compositions grouped by the subject sensor the models correspond to (effectively comparing model performances that are based on data from a single subject sensor), thereby identifying a plurality of subject sensor champion models. Process 1410, by contrast, may correspond to determining and ranking performances of said subject sensor champion models for each different subject sensor (effectively comparing model performances for different subject sensors).

Process 1410 may generate outcome predictions using a plurality of models (sometimes called "subject sensor champion models") respectively corresponding to the champion model training compositions for each subject sensor. To generate said outcome predictions, process 1410 may provide holdout sensor data 1613 to the subject sensor champion models as input (as detailed below, in connection with FIGS. 16 and 21), and the subject sensor champion models may generate respective outcome predictions (based on the holdout sensor data 1613) as outputs. Process 1410 may then evaluate respective performances of the subject sensor champion models based on their respective outcome predictions. As an example, process 1410 may compute efficacy metric values for each of the subject sensor champion models based on holdout outcome data 1516b. Similar to descriptions above in connection with process 1406, the efficacy metric values computed by process 1410 may generally indicate a degree of variance between the outcome predictions by the subject sensor champion models and the holdout outcome 1516b and may be based on an error metric selected from the following non-limiting list of example error metrics: residuals, MAE, MSE, RMSE, or percentage error.

Upon computing efficacy metric values for each of the subject sensor champion models, process 1410 may elect or identify an overall champion model corresponding to the subject sensor champion model with the highest efficacy metric value or with the lowest error metric value. Process 1410 may function to use holdout sensor data 1613 to evaluate predictive performances of subject sensor champion models identified by process 1408. Based on the predictive performances of the subject sensor champion models (corresponding to model training compositions with sensor data from different subject sensors), process 1410 may elect an overall champion model. A model training composition and subject sensor associated with the overall champion model elected by process 1410 may correspond to an optimal model training composition and an optimal subject sensor for predicting an outcome.

Method 1400 may therefore function to identify a set of heterogeneous sensors by process 1402, configure a plurality of model training compositions for each subject sensor in the set by process 1404, determine respective subject sensor champion models for each subject sensor in the set by processes 1406 and 1408, and elect an overall champion model from the subject sensor champion models by process 1410. Processes of method 1400 may function to determine an optimal model training composition and an optimal subject sensor for predicting an outcome that is not directly measurable by any of the subject sensors in a deployed set of heterogeneous sensors. Comparing performances of subject sensor champion models by process 1410 may allow for a comparison of the predictive efficacy of heterogeneous sensors that are not ordinarily comparable (due to producing different types of measurements, belonging to different genera, etc.). Moreover, the elected overall champion model that corresponds to a specific model training composition and a specific subject sensor may be used to configure sensor data collection activities for future or temporally remote observations in a particular sensor deployment setting 1520, or for observations in a different sensor deployment setting altogether. In some embodiments, method 1400 may be performed by electoral sensor champion selector 1514 of FIG. 15.

FIG. 15 illustrates a schematic block diagram for sensor champion selection system 1500, used to determine an overall subject sensor champion 1518 for configuring sensor data collection used for outcome predictions. Sensor champion selection system 1500 illustrates a target environment 1502, which may be measured by sensor devices 1504 and 1508. Sensor devices 1504 and 1508 may have respective component sensors 1506a-x and 1510a-y. Although only two sensor devices 1504 and 1508 are illustrated by FIG. 15 to avoid unnecessary obfuscation of the illustrated features, any number of sensor devices with respective component sensors can be deployed to measure target environment 1502. Sensor devices 1504 and 1508 may be communicatively coupled to sensor repository supervisor 1512 and electoral sensor champion selector 1514. Sensor devices 1504 and 1508 may convey sensor data corresponding to measurements by component sensors 1506$a$-$x$ and 1510$a$-$y$ to sensor repository supervisor 1512 and electoral sensor champion selector 1514 in real-time, or at some later time. Sensor repository supervisor 1512, which may receive evaluation outcome data 1516$a$ and holdout outcome data 1516$b$ corresponding to empirical outcome results associated with evaluation and holdout subsets of the sensor data, may in turn configure sensor devices 1504 and 1508 based on elected overall subject sensor champion 1518.

As the exemplary icons within target environment 1502 indicate, the target environment may be any one of a range of environments with quantities or qualities measurable by sensor devices, such as (but not limited to) terrestrial settings (e.g., agricultural, geological, ground transportation, and medical environments), aquatic settings (e.g., aquacultural, oceanic, and other underwater environments), aerial settings (e.g., high-altitude, air transportation, and extreme weather environments), and celestial settings (e.g., outer-space, proximal space travel, planetary environments). Sensor devices such as 1504 and 1508 that are deployed to measure any particular target environment 1502 may be equipped with suitable sensors 1506$a$-$x$ and 1510$a$-$y$ for quantities or qualities of interest to the particular target environment.

In embodiments with target environment 1502 corresponding to an terrestrial agricultural setting, sensor devices may be selected from the exemplary and non-limiting group of: a rainfall sensor, a humidity sensor, a temperature sensor, a solar radiation sensor, a vapor pressure deficit sensor or a combination of a temperature sensor and a humidity sensor for deriving vapor pressure, a growing degree days sensor, a windspeed sensor, a penetrometer, laboratory soil analyses, laboratory fertility analyses, aerial spectral analyses, laboratory fertility analyses, and ground spectral analyses. In embodiments with target environment 1502 corresponding to an aquatic setting, sensor devices may be selected from the exemplary and non-limiting group of: a pressure sensor, a depth sensor, a water current sensor, a temperature sensor, a conductivity sensor, a pH sensor, a dissolved oxygen sensor, a turbidity sensor, a nitrate sensor, a phosphate sensor, and a chlorophyll sensor. In embodiments with target environment 1502 corresponding to an aerial setting, sensor devices may be selected from the exemplary and non-limiting group of: a barometer, an air current sensor, a temperature sensor, a humidity sensor, a gas sensor, and a magnetometer. In embodiments with target environment 1502 corresponding to a celestial setting, sensor devices may be selected from the exemplary and non-limiting group of: a spectrometer, a polarized light sensor, and a magnetometer.

Sensor devices 1504 and 1508 may record and store sensor data, corresponding to measurements of target environment 1502 produced by their respective constituent sensors 1506$a$-$x$ and 1510$a$-$y$, either independently (e.g., using on-device storage and timing for data collection) or externally via sensor repository supervisor 1512. In some embodiments, the functions and processes performed by sensor repository supervisor 1512 may be performed by supervisory or control circuitry within the sensor devices 1504 and 1508 themselves. Sensor repository supervisor 1512 may represent an external controller and data store for sensor devices 1504 and 1508.

In some embodiments, sensor repository supervisor 1512 may have input channels or circuitry capable of receiving sensor data from sensor devices 1504 and 1508 according to a pre-established communication protocol (e.g., formatted data packets, data streams, responses to data queries). Moreover, sensor repository supervisor 1512 may be provided component configuration data by sensor devices 1504 and 1508 specifying the types or genera of their respective component sensors 1506$a$-$x$ and 1510$a$-$y$. Component configuration data specifying component sensors 1506$a$-$x$ and 1510$a$-$y$ of sensor devices 1504 and 1508 generated in accordance with process 1402 may be used by sensor repository supervisor 1512 to sort, label, categorize, and store real-time sensor data received from sensor devices 1504 and 1508 into subsets or aggregations identifiable by sensor type, genus, or name.

As an example, sensor repository supervisor 1512 may receive component configuration data from sensor device 1504. Component configuration data may include unique labels and measurement formats for each of the n sensors 1506$a$-$x$ used by sensor device 1504 to generate measurements of target environment 1502. When sensor device 1504 begins measurement operations of target environment 1502, sensor data from each of the n sensors 1506$a$-$x$ may be streamed or otherwise conveyed to sensor repository supervisor 1512 via a communication channel. Sensor repository supervisor 1512 may label or otherwise identify sensor measurements from an input stream of sensor data according to the type, genus, or name of the sensor within sensors 1506$a$-$x$ that produced the sensor measurements. Sensor repository supervisor 1512 may label and store sensor measurements using component configuration data received prior to measurement operations of target environment 1502 by sensor device 1504. As one example, sensor repository supervisor may obtain label identification or format detection information from component configuration data and apply label identification or format detection techniques to received sensor data when storing, allowing sensor data to be stored in a sortable manner, and to be retrieved based on queries specifying the sensor (within sensors 1506$a$-$x$) that produced the data.

Electoral sensor champion selector 1514 may evaluate the performance of models generated and configured according to respective model training compositions in predicting an outcome or endpoint that is not directly measurable by any one sensor, or by any combination of sensors in the set of heterogeneous sensors. Performance metrics may quantitatively indicate the predictive accuracy of a model training composition in predicting such an outcome that is not directly measurable by any of the sensors in sensor deployment setting 1520 (and may therefore be referred to as an "indirect," "remote," or "secondary" outcome). As one example, computing performance metrics may involve computing quantitative relations (e.g., error or variance terms) between an outcome prediction generated by a model, and empirical outcome data corresponding to the sensor data set used to generate the outcome prediction.

Electoral sensor champion selector 1514 may perform a comparison between performances of different models by performing a comparison between computed performance metrics. Using a sensor identifier to index model training compositions may enable electoral sensor champion selector 1514 to perform a comparison between performances of different sensors using results from the comparison between computed performance metrics for respective models. As an example, a first set of model training compositions can be indexed by an identifier for sensor 1506*a* (a first sensor), and a second set of model training compositions can be indexed by an identifier for sensor 1506*b* or 1510*a* (e.g., a different second sensor, either within the same sensor device 1504 or within a different sensor device 1508).

According to the above example, electoral sensor champion selector 1514 may be configured to compute a first performance metric for a first model configured based on a member of the first set of model training compositions and may be further configured to compute a second configured based on a member of the second set of model training compositions. When a comparison of the first performance metric to the second performance metric indicates superior performance of the first model relative to the second model, electoral sensor champion selector 1514 may determine that the first model is the higher-performing model between the first model and the second model. Further to this determination, electoral sensor champion selector 1514 may determine that the first sensor is the more-predictive sensor for the outcome between the first sensor and the second sensor. Although sensors themselves are not generally comparable as being more or less predictive, using sensor identifiers to index models configured according to model training compositions may allow electoral sensor champion selector 1514 to determine the relative predictive power of any given sensor, based on performance comparisons of models generated for the given sensor to models generated for other sensors.

In addition to receiving and storing sensor data produced by sensor devices 1504 and 1508, sensor repository supervisor 1512 may optionally provide control signals to sensor devices 1504 and 1508. As an example, sensor repository supervisor 1512 may receive as input from electoral sensor champion selector 1514, an input specification of elected overall sensor champion 1518 corresponding to at least one of the sensors 1506*a-x* and 1510*a-y*. Based on received specifications of elected overall sensor champion 1518, sensor repository supervisor 1512 may configure sensor devices 1504 and 1508 such that sensor data production and collection by sensor devices 1504 and 1508 prioritizes sensor data produced by the sensor(s) specified as elected overall sensor champion 1518. Elected overall sensor champion 1518 is determined by electoral sensor champion selector 1514 based on an evaluation of model training composition performances in the task of predicting an outcome that is not directly measured or measurable by any of the sensor devices 1504 and 1508 or their constituent sensors (sometimes referred to as an "indirect outcome" or "secondary outcome" for this reason). By configuring sensor devices 1504 and 1508 to prioritize sensor data production and collection by elected overall sensor champion 1518, sensor repository supervisor 1512 may be able to ensure the production and collection of sensor data with the greatest efficacy in predicting an indirect or secondary outcome of interest is maintained in situations where sensor data production and collection capabilities may be limited or constrained (e.g., by storage, power, bandwidth, or other related constraints to sensor data production and collection).

As an example, in some embodiments, sensor repository supervisor 1512 may configure sensor devices 1504 and 1508 to produce and collect sensor data corresponding to elected overall sensor champion 1518 at a first sample frequency, rate, or density, and to produce and collect sensor data corresponding to all other sensors at a second sample frequency, rate, or density that is lower than the first. In this way, sensor repository supervisor 1512 may ensure that the spatial or temporal resolution of sensor data produced by sensor devices 1504 and 1508 corresponding to elected overall sensor champion 1518 (associated with greater efficacy in predicting an indirect or secondary outcome) is higher than the spatial or temporal resolution of sensor data corresponding to other sensors (associated with lesser efficacy in predicting the indirect or secondary outcome). Sensor devices 1504 and 1508, when thus configured by 1512, can be considered to be optimally configured for predicting a specific (indirect or secondary) outcome, according to the overall sensor champion election described by the processes of method 1400 for determining elected overall sensor champion 1518.

Electoral sensor champion selector 1514 may determine elected overall subject sensor champion 1518 based on sensor data produced by sensors 1506*a-x* and 1510*a-y* (provided directly by the respective sensor devices 1504 and 1508, or via sensor repository supervisor 1512) and training data for the outcome (such as evaluation outcome data 1516*a* and holdout outcome data 1516*b*). Electoral sensor champion selector 1514 may serve as a feedback mechanism for sensor devices 1504 and 1508 that reconfigures the sensor devices such that sensor data recordation and storage for the most effective subject sensor (elected overall subject sensor champion 1518) is maintained at its highest possible resolution (spatial and/or temporal). When configured to maintain the highest possible resolution of sensor data from elected overall subject sensor champion 1518, sensor champion selection system 1500 may be considered optimized for generating and collecting sensor data with the greatest predictive efficacy for an outcome of interest, and therefore optimized for predicting a secondary or indirect outcome of interest that is not directly measurable by the sensor devices in sensor deployment setting 1520 or their component sensors.

Figure 16:
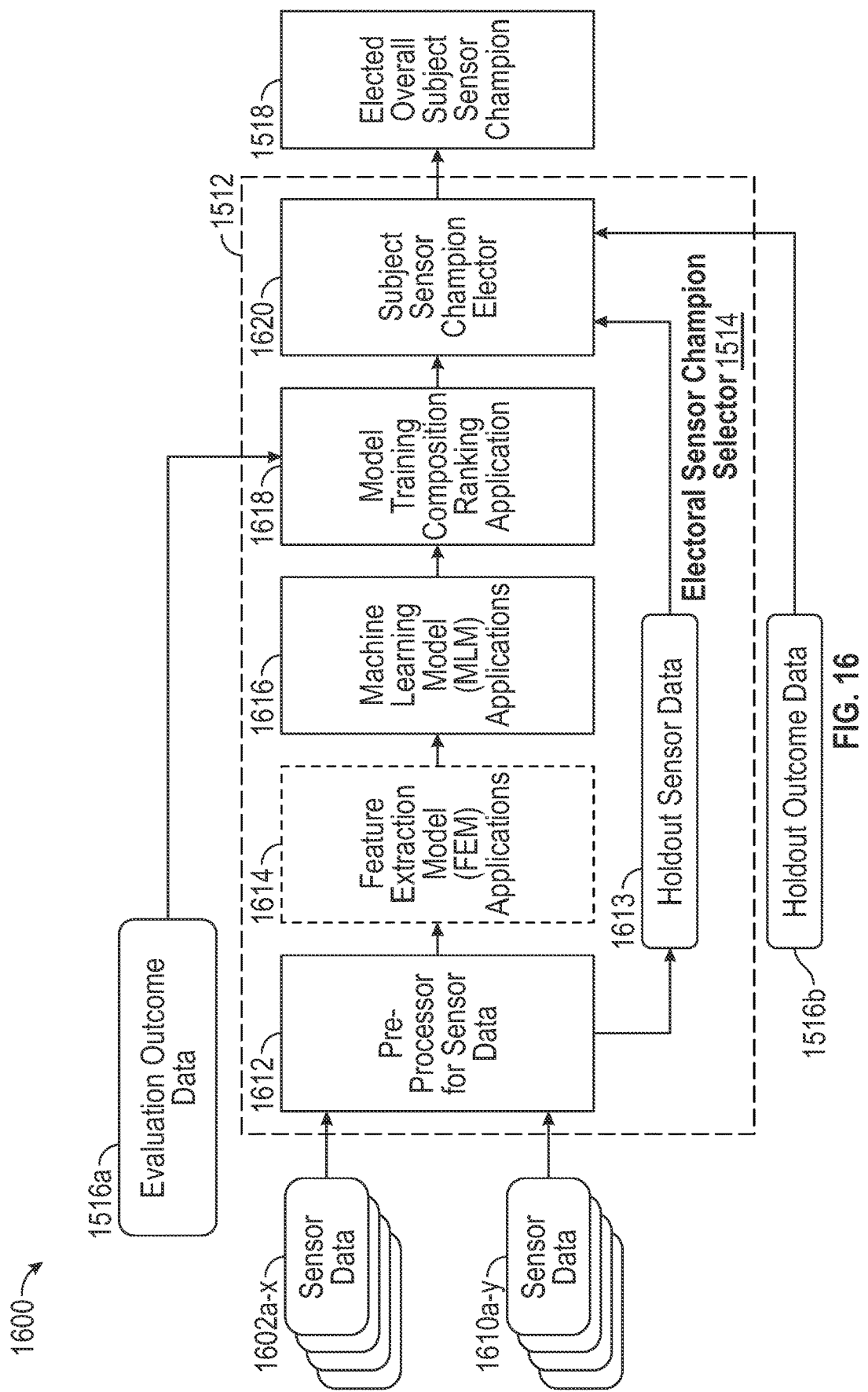
FIG. 16 illustrates an example schematic of an enhanced sensor assessments mixed block flow schematic for predicting secondary endpoints, according to some embodiments of the present technology.

FIG. 16 illustrates a detailed schematic block diagram of electoral sensor champion selector 1514, specifically illustrating a data path corresponding to components that perform the processes of method 1400 to produce elected overall subject sensor champion 1518 based on sensor data from sensor devices 1504 and 1508. Sensor data 1602*a-x* and sensor data 1610*a-y* may represent sensor data respectively output by sensor device 1504 and sensor device 1508. Sensor data 1602*a-x* may correspond to data from component sensors 1506*a-x* respectively; sensor data 1610*a-y* may correspond to data from component sensors 1510*a-y* respectively. To avoid unnecessary obfuscation of the presented embodiments, it may be assumed that sensor data 1602*a-x* and 1610*a-y* represent the entirety of sensor data from the respective component sensors 1506*a-x* and 1510*a-y* generated over a particular measurement interval and corresponding to a particular spatial region of target environment 1502.

Sensor data pre-processor 1612 may receive sensor data 1602*a-x* and 1610*a-y* from sensor devices 1504 and 1508 respectively and may perform the sensor identification functions of process 1402 of method 1400. In some embodiments, sensor data pre-processor 1612 may receive sensor data 1602*a-x* and 1610*a-y* and generate component configuration data specifying sensor types, genera, names, or other suitable identifiers for each of the sensors 1506*a-x* and 151*a-y* of sensor devices 1504 and 1508. In other embodiments, component configuration data may be generated by other components of sensor champion selection system 1500 such as sensor repository supervisor 1512 or the sensor devices 1504 and 1508 themselves.

Sensor data pre-processor 1612 may additionally perform at least a part of the model training composition configuration functions of process 1404 of method 1400, for each subject sensor of the set of identified sensors (as described below, in connection with FIG. 16). In particular, sensor data pre-processor 1612 may be responsible for configuring components 1404*a*, 1404*b*, and 1404*c* of process 1404, for each subject sensor of the set of identified sensors. In particular, sensor data pre-processor 1612 may receive as input sensor data 1602*a-x* and 1610*a-y* corresponding to component 1404*a* of the model training compositions for the corresponding sensors that produced the sensor data.

Sensor data pre-processor 1612 may first process input sensor data 1602*a-x* and 1610*a-y* corresponding to sensor data from a first sensor device and a second sensor device, by applying a model input specification to the input sensor data of a given subject sensor. As described above in connection with component 1404*b* of process 1404, a model input specification may function to apply one or more filtering criteria to the subject sensor data of component 1404*a*. Exemplary and non-limiting examples of the filtering criteria of model input specifications applied to subject sensor data by sensor data pre-processor 1612 may include a sampling setting for subject sensor data of component 1404*a*, a sensor subset specification for subject sensor data of component 1404*a* when the subject sensor data includes multiple component sensors. Sensor data pre-processor 1612 may process subject sensor data of component 1404*a*, according to a model input specification of component 1404*b*, to produce one or more filtered or reduced data sets referred to as 'specified subject sensor' data sets. Each of the specified subject sensor data sets produced by sensor data pre-processor 1612 may be associated with different respective model training compositions (e.g., a first specified subject sensor data set may be associated with a first set of model training compositions, and a second specified subject sensor data set may be associated with a second, different set of model training compositions).

Sensor data pre-processor 1612 may further process specified subject sensor data sets by applying sensor data aggregations to the specified subject sensor data sets. As described above in connection with component 1404*c* of process 1404, a sensor data aggregation may function to apply one or more aggregation criteria to the specified subject senor data sets produced according to component 1404*b*. Exemplary and non-limiting examples of the aggregation criteria of sensor data aggregations applied to specified subject sensor data sets by sensor data pre-processor 1612 may include temporal specifications that convert the specified subject sensor data sets to a target temporal domain of a plurality of temporal domains, or subject sensor-specific specifications that convert the specified subject sensor data sets to different spatial specifications than those identified by component 1404*b*, qualitative specifications, or statistical specifications (e.g., maximums, minimums, and averages of the specified subject sensor data).

Sensor data pre-processor 1612 may process specified subject sensor data produced based on component 1404*b*, according to according to a sensor data aggregation of component 1404*c*, to produce one or more filtered or reduced data sets referred to as 'aggregated and specified' data sets. Each of the aggregated and specified subject sensor data sets produced by sensor data pre-processor 1612 may be associated with different respective model training compositions (e.g., a first aggregated and specified subject sensor data set may be associated with a first set of model training compositions, and a second aggregated specified subject sensor data set may be associated with a second, different set of model training compositions).

In addition to the functions of process 1404 described above, sensor data pre-processor 1612 may additionally perform data partitioning operations on input sensor data 1602*a-x* and 1610*a-y* to produce a first partition corresponding to an evaluation data set (sometimes referred to as training data set), and a second partition corresponding to a holdout data set (sometimes referred to as validation data set). By partitioning the input sensor data set in this way, sensor data pre-processor 1612 may prepare at least a part of the corpus of training data used to configure machine learning models for each of the model training compositions of process 1404; in particular, the corpus of training data may be based on the evaluation data set partition of the input sensor data.

The holdout data set partition of the input sensor data may be used by electoral sensor champion selector 1514 as an out-of-sample data set for electing model training compositions in accordance with overall champion model training composition election functions of process 1410, namely by providing the holdout data set partition as input sensor data to models configured according to champion model training compositions for each subject sensor as described in greater detail below, in connection with sensor group champion elector 1620. Holdout sensor data 1613 and holdout outcome data 1516*b* are accordingly shown in FIG. 16 as outputs of sensor data pre-processor 1612 and provided to sensor group champion elector 1620.

Sensor data pre-processor 1612 may optionally output evaluation sensor data corresponding to an aggregated and specified subject sensor data set to feature extraction model (FEM) applications 1614. In some embodiments, FEM applications 1614 may be omitted, and evaluation sensor data corresponding to an aggregated and specified subject sensor data set may be provided to machine learning model (MLM) applications 1616. As described above in connection with component 1404*e* of process 1404, a FEM application of a model training composition may function to apply one or more feature extraction methods to the aggregated and specified subject senor data sets produced according to component 1404*c*.

Exemplary and non-limiting examples of the feature extraction methods applied to aggregated and specified subject sensor data sets by FEM applications 1614 may include principal component analysis (PCA) procedures, gradient boosting machines (GBM) procedures, singular value decomposition (SVD) procedures, independent component analysis (ICA) procedures, linear discriminant analysis (LDA) procedures, or autoencoder neural network procedures. FEM applications 1614 may function to reduce dimensionality of the aggregated and specified subject sensor data produced based on component 1404*c*, according to according to a particular feature extraction method, to produce one or more feature-extracted data sets referred to as 'extracted feature' sets of the aggregated and specified subject sensor data sets. Each of the sets of extracted features produced by FEM applications 1614 may be associated with different respective model training compositions (e.g., a first set of extracted features may be associated with a first set of model training compositions, and a second set of extracted features may be associated with a second, different set of model training compositions).

In embodiments where FEM applications 1614 are used to produce sets of extracted features corresponding to aggregated and specified subject sensor data sets, the sets of extracted features produced according to component 1404*e* may be provided to machine learning model (MLM) applications 1616 as input. In embodiments where FEM applications 1614 are optionally omitted, the aggregated and specified subject sensor data sets produced by sensor data pre-processor 1612 according to component 1404c may be provided to MLM applications 1616 as input.

MLM applications 1616 may transform input data based on one, two, or more than two MLMs selected from the exemplary and non-limiting examples of: generalized linear modeling procedures such as linear regression, artificial neural network modeling procedures, gradient boosting modeling procedures, random forest procedures, factorization machine procedures, support vector machine (SVM) procedures, or Bayesian network procedures. A first MLM of MLM applications 1616, optionally omitted in embodiments where FEM applications 1614 are used to produce a set of extracted features, may transform aggregated and specified subject sensor data sets into sets of extracted features. A second MLM of MLM applications 1616 may receive as input a set of extracted features generated either by FEM applications 1615 or a first MLM of MLM applications 1616 and produce an outcome prediction that is not directly measurable by any of the subject sensors. Each of the pair-wise combinations of extracted features produced by FEM applications 1614 or a first MLM of MLM applications 1616, and outcome predictions produced by a second MLM of MLM applications 1616 may be associated with different respective model training compositions (e.g., a first set of extracted features and a first MLM for outcome prediction may be associated with a first model training composition, the first set of extracted features and a second MLM for outcome prediction may be associated with a second model training composition, a second set of extracted features and the second MLM for outcome prediction may be associated with a third model training composition, and so on).

MLM applications 1616 may further generate outcome predictions by the model training compositions corresponding to the pair-wise combinations of feature extraction models and outcome prediction models, based on the aggregated and specified subject sensor data corresponding to evaluation data 1710 produced by the partitioning functions of sensor data pre-processor. Accordingly, outcome predictions generated by the models configured according to model training compositions may represent outcome predictions based on evaluation data and may be comparable to objective or empirical evaluation outcome data 1516a (e.g., evaluation outcome data 1516a may serve as a metric used to measure efficacy of the outcome predictions based on evaluation data). MLM applications 1616 may therefore generate outcome predictions that are comparable to empirical evaluation outcome data 1516a based on subject sensor data that does not directly measure the outcome. MLM applications 1616 may function to apply every valid combination of FEM application or MLM application for producing sets of extracted features from aggregated and specified subject sensor data and MLM application for producing an outcome prediction, to every aggregated and specified subject sensor data set, for each of the subject sensors in a sensor champion selection system 1500.

Model training composition ranking application 1618 may receive outcome predictions produced by MLM applications 1616. In addition to receiving the outcome predictions, model composition ranking application 1618 may receive indices for the outcome predictions that identify the first MLM of MLM applications 1616 or the FEM of FEM applications 1614 and the second MLM of MLM applications 1616 associated with each outcome prediction (e.g., components 1404d and 1404e). Further, model composition ranking application 1618 may receive indices for the outcome predictions that identify the subject sensor (e.g., component 1404a), the input specification applied to the subject sensor (e.g., component 1404b), and the aggregation applied to the specified subject sensor data set (e.g., component 1404c). Model composition ranking application 1618 may perform a comparison of its inputs, namely all of the outcome predictions produced by MLM applications 1616. Specifically, model composition ranking application 1618 may compare outcome predictions produced by models trained using sensor data from a given subject sensor. This comparison may correspond to comparing outcome predictions by models trained according to every valid combination pair (or set) of FEM application and MLM application of FEM applications 1614 and MLM applications 1616, on every aggregated and specified sensor set produced by sensor data pre-processor 1612 for sensor data from the given subject sensor.

Comparisons of the outcome predictions may involve a comparison to objective or empirical evaluation outcome data 1516a provided to model training composition ranking application 1618. In particular, model training composition ranking application 1618 may generate efficacy metric values based on comparisons of the generated outcome prediction from each model to evaluation outcome data 1516a. In some embodiments, the efficacy metric may be based on an error metric selected from the following non-limiting list of examples: residuals, mean absolute error (MAE), mean squared error (MSE), root mean squared error (RMSE), or percentage error, and may generally indicate a degree of variance between an outcome prediction generated by a model, and empirical outcome data such as evaluation outcome data 1516a as described in connection with process 1406 of method 1400.

Computed or generated efficacy metrics for each of the models corresponding to a given subject sensor may be compared, thereby comparing the performances of the models in generating outcome predictions based on data from the given subject sensor. On the basis of said comparison, model composition ranking application 1618 may identify a champion model training composition for each given subject sensor, sometimes referred to as a 'primary' champion model training composition due being based on a comparison of outcome predictions by models trained on the same subject sensor data (corresponding to component 1404a, a primary factor of each model training composition), as described in connection with process 1408 of method 1400.

Primary champion model training compositions identified or otherwise determined on the basis of comparing model outcome predictions for each subject sensor may be received at subject sensor champion elector 1620. Subject sensor champion elector 1620 may configure a plurality of models according to the primary champion model training compositions for each subject sensor and use the configured models to generate outcome predictions based on holdout sensor data 1613 produced by partitioning functions of sensor data pre-processor 1612. Subject sensor champion elector 1620 may compare outcome predictions based on holdout sensor data 1613 to objective or empirical holdout outcome data 1516b, both of which may be provided to subject sensor champion elector 1620. Subject sensor champion elector 1620 may generate efficacy metric values based on comparisons of holdout outcome data 1516b to the generated outcome prediction from each model corresponding to a primary champion model training composition.

In some embodiments, the efficacy metric may be based on an error metric selected from the following non-limiting list of examples: residuals, mean absolute error (MAE), mean squared error (MSE), root mean squared error (RMSE), or percentage error, and may generally indicate a degree of variance between an outcome prediction generated by a model configured according to a primary champion model training configuration, and empirical outcome data such as holdout outcome data 1516b. Efficacy metrics for each of the models corresponding to a primary champion model training composition may be compared, thereby comparing the performances of the models (determined to be the highest performing, or most efficacious models for their respective subject sensors) in generating outcome predictions based on sensor data from their respective subject sensors. On the basis of said comparison, subject sensor champion elector 1620 may elect or otherwise determine an overall champion model training composition, sometimes referred to as a 'general' or 'overall' champion model training composition due being based on a comparison of outcome predictions by models corresponding to the highest performing primary champion model training compositions for each subject sensor, as described in connection with process 1410 of method 1400. An elected overall subject sensor champion 1518 generated by subject sensor champion elector 1620 may correspond to component 1404a of the general or overall champion model training composition elected by subject sensor champion elector 1620. In some embodiments, elected overall subject sensor champion 1518 may be used to reconfigure sensor devices 1504 and 1508 in sensor deployment setting 1520 to optimize sensor data collection from elected overall subject sensor champion 1518.

Figure 17:
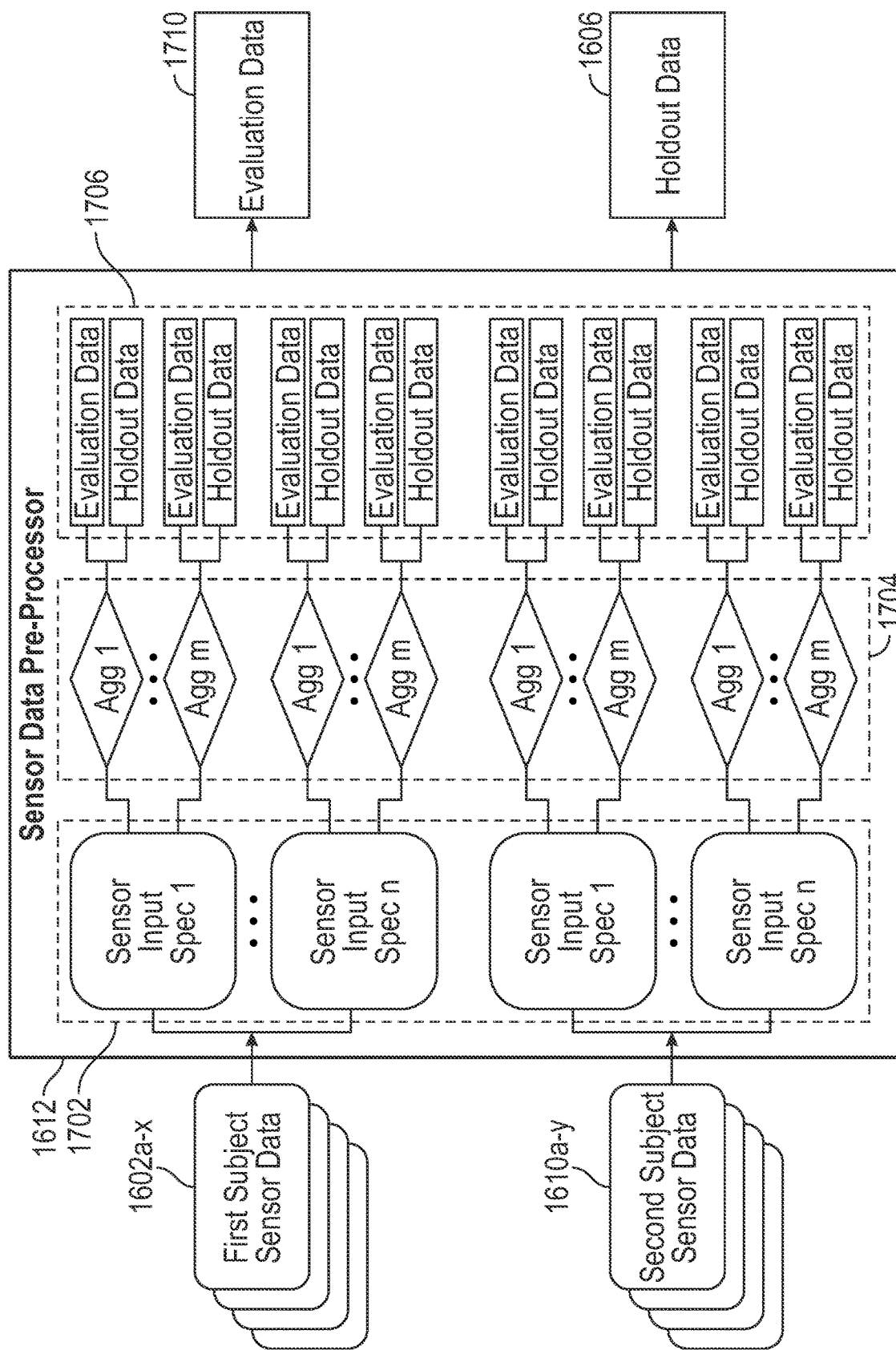
FIG. 17 illustrates example enhanced sensor assessments environment, according to some embodiments of the present technology.

FIG. 17 illustrates a detailed schematic block diagram of sensor data pre-processor 1612 of FIG. 16, specifically illustrating a data path corresponding to components or functions that perform at least a part of the model training composition configuration described by process 1404 of method 1400, thereby generating aggregated and specified subject sensor data sets for model performance evaluation (e.g., subject sensor evaluation data 1710) and for out-of-sample model performance testing (e.g., subject sensor holdout data 1606). Inputs to sensor data pre-processor 1612 may include sensor data 1602a-x corresponding to cumulative sensor data respectively generated by sensors 1506a-x of sensor device 1504, and sensor data 1610a-y corresponding to cumulative sensor data respectively generated by sensors 1510a-y of sensor device 1508.

Although FIG. 17 illustrates inputs to sensor data pre-processor 1612 including cumulative sensor data from component sensors of two sensor devices, any number of sensor device or component sensor data may be input to sensor data pre-processor 1612 without departing from the scope of the presented embodiments. Inputs (or groupings of inputs) to sensor data pre-processor 1612 may correspond to sensor data of a subject sensor (component 1404a of process 1404). To avoid unnecessary obfuscation of the presented embodiments, it may be assumed that subject sensors correspond to groupings based on sensor device (e.g., data from a first subject sensor corresponds to sensor data 1602a-x, and data from a second subject sensor corresponds to sensor data 1610a-y).

A data path for sensor data inputs to sensor data pre-processor 1612 may begin at model input specification stage 1702, where at least one model input specification identifying at least a subset of distinct measurements of the sensor data is applied to a subject sensor. Model input specification stage 1702 may generally represent applications or circuit components programmably configured to apply one or more filtering criteria that are based on spatial specifications and/or sensor subset specifications to subject sensor data input to sensor data pre-processor 1612. In embodiments assumed to have subject sensors grouped by sensor device, and subject sensor data to data measurements from multiple sensors, model input specification stage 1702 may identify or specify a sensor subset of the data measurements from the subject sensors (e.g., a subset of either sensor data 1602a-x or 1610a-y corresponding to measurements by the subject sensors).

In some such embodiments, each model input specification (component 1404b, represented by blocks labeled "Sensor Input Spec 1," through "Sensor Input Spec n" for each subject sensor) of model input specification stage 1702 may specify a subset of names, types, genera, or other identifiers of sensors from the set of multiple sensors to be used by the model. As an example, a given model input specification may specify first and second component sensors to be included in a model training composition, and another given model input specification may specify second and third component sensors to be included in another model training composition. In some embodiments, where subject sensor data of component 1404a corresponds to data measurements from a single sensor, each model input specification of model input specification stage 1702 may identify a spatial subset of the data measurements from the single sensor (e.g., a subset of data measurements corresponding to measurements by the sensor at specified locations of target environment 1502). FIG. 17 illustrates n model input specifications for each of the subject sensors grouped by sensor device in model input specification stage 1702, and each of the n model input specifications may output a respective subset of subject sensor data referred to as a "specified subject sensor data set."

The data path for specified subject sensor data sets may proceed to sensor data aggregation stage 1704, where at least one sensor data aggregation that generates one or more distinct aggregations of the specified subject sensor data sets may be applied to the specified subject sensor data sets. Sensor data aggregation stage 1704 may generally represent one or more aggregation criteria applied to specified subject sensor data sets that are based on temporal specifications or subject sensor-specific specifications. Each sensor data aggregation (component 1404c, represented by blocks labeled "Agg 1," through "Agg m" for each specified subject sensor data set output by model input specification stage 1702) of sensor data aggregation stage 1704 may function to generate groupings of the data specified by component 1404b, based on temporal specifications, or subject sensor-specific specifications (e.g., different spatial specifications than those identified by component 1404b, qualitative specifications, statistical specifications).

When temporal sensor data aggregations are applied to specified subject sensor data sets produced as outputs of model input specification stage 1702, the specified subject sensor data subsets may be converted to (or, aggregated according to) a target temporal domain of a plurality of temporal domains. Examples of temporal specifications of sensor data aggregations may include sampling intervals (e.g., daily, weekly, monthly interval data) or aggregate time-scales (e.g., 2-week, 4-week, 6-week span data) for model input specification of component 1404b. Examples of sensor-specific specifications of sensor data aggregations may include sampling areas (e.g., 100, 200, 400 square meter data), depth or altitude levels (e.g., 0-10 inches, 0-20 inches, 0-30 inches below ground level data), qualities (e.g., data indicating pathogen presence), or statistical metrics (e.g., data average, minimum, maximum, variance, total). FIG. 17 illustrates m sensor data aggregations in sensor data aggregation stage 1704 for each of the specified subject sensor data sets produced by model input specification 1702; each of the m sensor data aggregations output a respective subset of subject sensor data referred to as an "aggregated and specified subject sensor data set."

The data path for aggregated and specified subject sensor data sets produced by sensor data aggregation stage 1704 may proceed to model data partition stage 1706, that may partition or otherwise divide the aggregated and specified subject sensor data sets produced by sensor data aggregation stage 1704. Aggregated and specified subject sensor data sets may be partitioned by model data partition stage 1706 into a set of evaluation data 1710 that is used as a part of a corpus of training data for training machine learning models at MLM applications 1616, and a set of holdout data 1606 that is used for out-of-sample testing of models configured according to model training compositions at subject sensor champion elector 1620. In general, model data partition stage 1706 may partition aggregated and specified subject sensor data sets across a temporal or spatial boundary. As an example, a set of evaluation data 1710 may comprise aggregated and specified subject sensor data sets that correspond to measurements of target environment 1502 in a particular geographical region or a particular timeframe, and a set of holdout data 1606 may comprise aggregated and specified subject sensor data sets that correspond to measurements of target environment 1502 in a different geographical region outside the particular geographical region or a different timeframe outside the particular timeframe.

Evaluation data 1710 and holdout data 1606 produced at model data partition stage 1706 may respectively correspond to objective or empirical outcome data, corresponding to outcomes in and of target environment 1502 in the geographical region or timeframe associated with the partitioned data sets. Partitioned data sets may be provided to various components and applications of electoral sensor champion selector 1514. In particular, sets of evaluation data 1710 corresponding to aggregated and specified subject sensor data may form a basis for a corpus of training data used to train at least two MLMs of MLM applications 1616, in accordance with functions of process 1404 and component 1404d of method 1400. Further, sets of holdout data 1606 corresponding to aggregated and specified subject sensor data (e.g., holdout sensor data 1613) may form a basis for model input data at subject sensor champion elector 1610 when electing an overall champion model training composition based on computed efficacy metrics, in accordance with functions of process 1410 of method 1400.

Sets of evaluation data 1710 corresponding to outcome data (e.g., evaluation outcome data 1516a) may form a basis for a corpus of training data used to train at least two MLMs of MLM applications 1616, in accordance with functions of process 1404 and component 1404d; specifically, when one of MLMs of MLM applications 1616 is a supervised learning model, evaluation outcome data 1516a may correspond to a labeled output in the corpus of training data. Additionally, evaluation outcome data 1516a may be used for computing efficacy metrics for models configured according to model training compositions, in accordance with functions of process 1406 of method 1400. Sets of holdout data 1606 corresponding to outcome data (e.g., holdout outcome data 1516b) may be provided to subject sensor champion elector 1620 when electing an overall champion model training composition based on computed efficacy metrics, specifically for the computation and comparison of efficacy metrics for primary champion model training compositions based on their predictions using holdout sensor data 1613, in accordance with functions of process 1410 of method 1400.

Figure 18A:
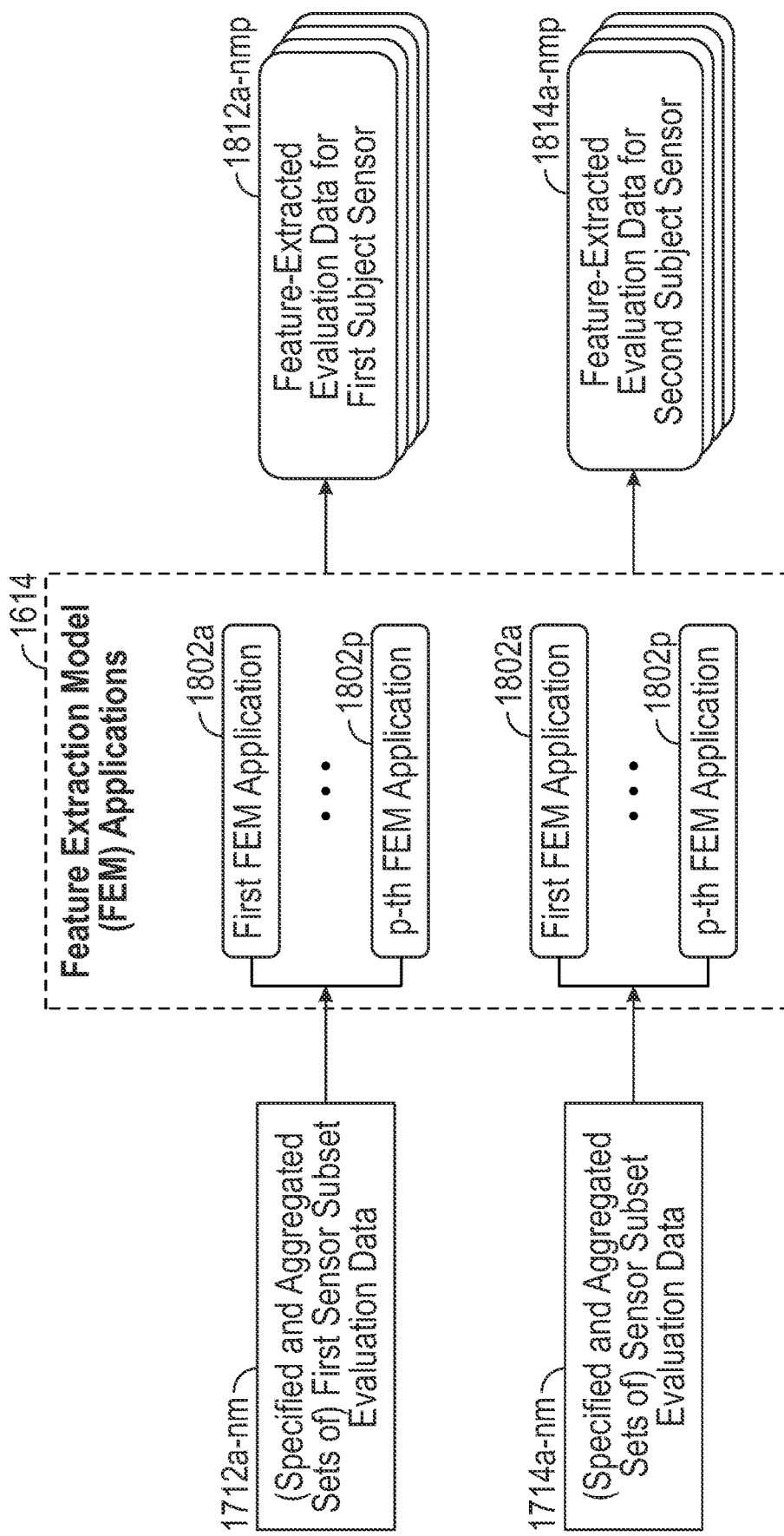
FIG. 18A illustrates an example schematic block diagram of feature extraction models of an enhanced sensor assessments environment, according to some embodiments of the present technology.

FIG. 18A illustrates a detailed schematic block diagram of FEM applications 1614 of FIG. 16, specifically illustrating a data path corresponding to application functions or circuit components that perform at least a part of the model training composition configuration described by process 1404 of method 1400, in accordance with embodiments where component 1404e is optionally included in model training compositions. FEM applications 1614 may generate sets of extracted features based on aggregated and specified subject sensor data sets of evaluation data 1710 output by sensor data pre-processor 1612 (sets labeled "feature-extracted evaluation data" for corresponding first and second subject sensors in the illustration). In addition to the characteristics described above in connection with component 1404e of process 1404 in FIG. 14, and FEM applications 1614 in FIG. 16, FEM applications 1802a-p may be applications or circuit components that are programmably configured to perform analytic and feature-extraction procedures on their input data sets selected from the following non-limiting list of example procedures: principal component analysis (PCA) procedures, gradient boosting machines (GBM) procedures, singular value decomposition (SVD) procedures, independent component analysis (ICA) procedures, linear discriminant analysis (LDA) procedures, and autoencoder neural network procedures, as available in SAS software.

Inputs to FEM applications 1614 may include specified and aggregated first subject sensor evaluation data 1710a-nm corresponding to evaluation data 1710 for the first subject sensor specified according to each of the n input model specifications (of component 1404b) and aggregated according to each of the m sensor data aggregations (of component 1404c) applied to subject sensor data (of component 1404a) at sensor data pre-processor 1612. Although FIG. 17 illustrates inputs to FEM applications 1614 including specified and aggregated sensor data from two different subject sensors, specified and aggregated data from any number of subject sensors, sensor devices, or component sensors may be input to FEM applications 1614. Inputs (or groupings of inputs) to FEM applications 1614 may correspond to specified and aggregated sensor data of all subject sensors considered by electoral sensor champion selector 1514. As above in connection with FIG. 17, it may be assumed that subject sensors correspond to groupings based on sensor device (e.g., data from a first subject sensor corresponds to first subject sensor evaluation data 1712a-nm, and data from a second subject sensor corresponds to second subject sensor evaluation data 1714a-nm).

A data path for subject sensor evaluation data inputs to FEM applications 1614 may comprise processing of each of the n*m specified and aggregated subject sensor data sets for each respective subject sensor, by each of the p FEM applications 1802a-p, to produce p sets of extracted features for each of the n*m specified and aggregated subject sensor data sets for each respective subject sensor. In particular, the n*m specified and aggregated data sets of first subject sensor evaluation data 1712a-nm may be processed by first FEM application 1802a to produce respective n*m sets of extracted features. Similarly, the n*m specified and aggregated data sets of first subject sensor evaluation data 1712a-nm may additionally be processed by remaining FEM applications (such as 1802p) to produce additional respective n*m sets of extracted features corresponding to each of the remaining p−1 FEM applications. All of the sets of extracted features produced based on the n*m specified and aggregated data sets of first subject sensor evaluation data 1712*a-nm* may be represented by feature-extracted evaluation data for first subject sensor 1812*a-nmp*, where n*m*p represents the number of sets of extracted features produced by the p FEM applications 1802*a-p* based on the n*m specified and aggregated data sets of the first subject sensor cumulatively. Similarly, all of the sets of extracted features produced based on the n*m specified and aggregated data sets of second subject sensor evaluation data 1714*a-nm* may be represented by feature-extracted evaluation data for first subject sensor 1814*a-nmp*, where n*m*p represents the number of sets of extracted features from the n*m specified and aggregated data sets of the second subject sensor produced by the p FEM applications 1802*a-p*.

Figure 18B:
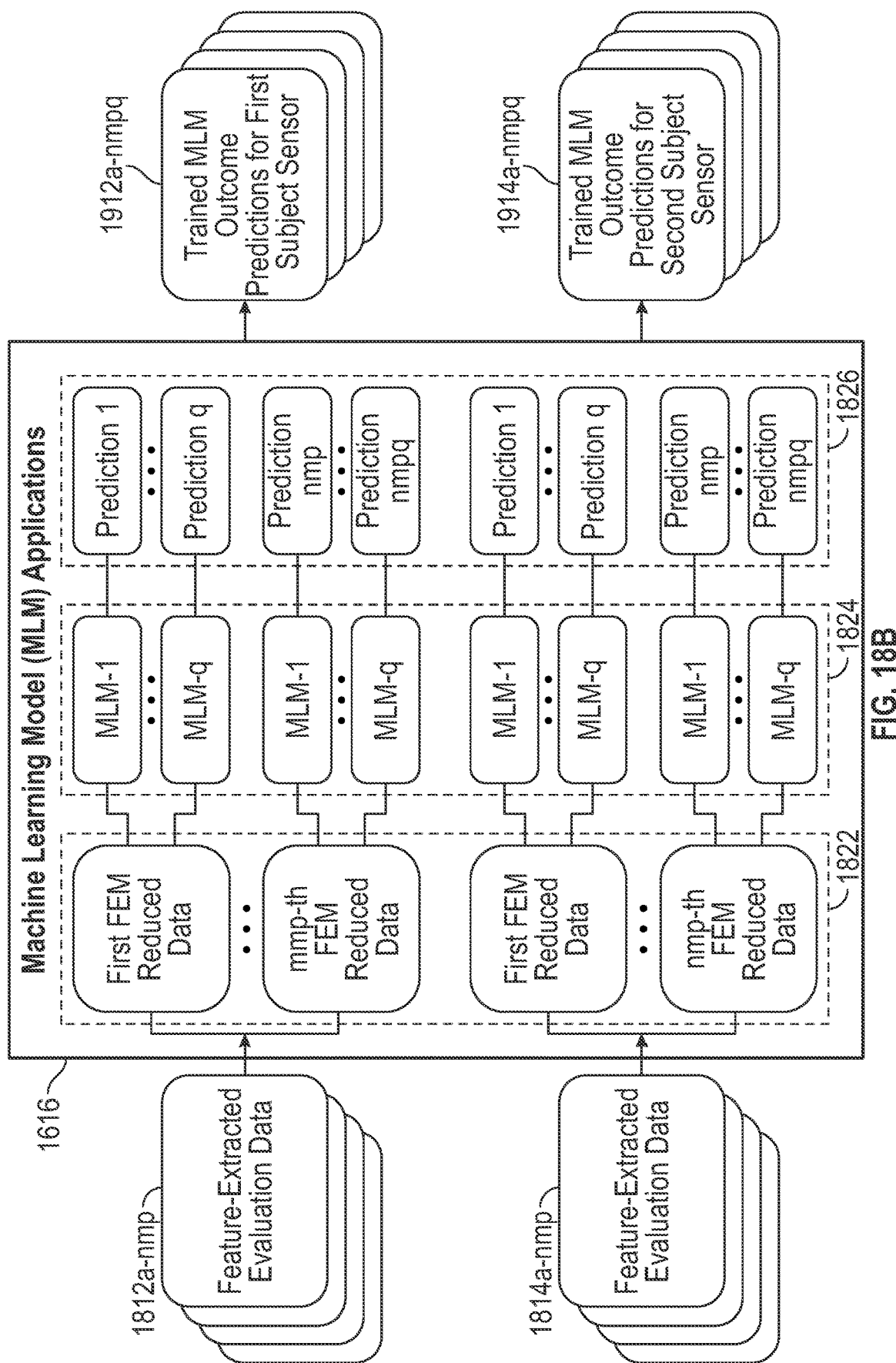
FIG. 18B illustrates an example schematic block diagram of machine learning models of an enhanced sensor assessments environment, according to some embodiments of the present technology.

FIG. 18B illustrates a detailed schematic block diagram of MLM applications 1616 of FIG. 16, specifically illustrating a data path corresponding to application functions or circuit components that perform at least a part of the model training composition configuration described by process 1404 of method 1400, in accordance with embodiments where component 1404*e* is optionally included in model training compositions. MLM applications 1616 may generate outcome predictions corresponding to, and on the basis of each respective set of extracted features output 1812*a-nmp* and 1814*a-nmp* output by FEM applications 1614. In addition to the characteristics described above in connection with component 1404*d* of process 1404 in FIG. 14, and MLM applications 1616 in FIG. 16, MLM applications MLM-1 through MLM-q illustrated in FIG. 18B may be applications or circuit components that are programmably configured to perform analytic and predictive procedures based on their input data sets selected from the following non-limiting list of example procedures: generalized linear modeling procedures such as linear regression, artificial neural network modeling procedures, gradient boosting modeling procedures, random forest procedures, factorization machine procedures, support vector machine (SVM) procedures, or Bayesian network procedures.

Model input layer 1822 of MLM applications 1616 may graphically represent feature-extracted evaluation data for the first subject sensor 1812*a-nmp* and for the second sensor 1814*a-nmp*. Model input layer 1822 may illustrate, for each subject sensor, the corresponding feature-extracted evaluation data corresponding to p FEM applications 1802*a-p* (of component 1404*e*) applied at FEM applications 1614 for each of the n input model specifications (of component 1404*b*) and aggregated according to each of the m sensor data aggregations (of component 1404*c*) applied to subject sensor data (of component 1404*a*) at sensor data preprocessor 1612. Although FIG. 18B illustrates inputs to MLM applications 1616 including feature-extracted evaluation sensor data from two different subject sensors, feature-extracted evaluation data from any number of subject sensors, sensor devices, or component sensors may be input to MLM applications 1616. Representations of inputs (or groupings of inputs) to MLM applications 1616 may correspond to sets of extracted features for each of the specified and aggregated sensor data of all subject sensors considered by electoral sensor champion selector 1514. As above in connection with FIG. 17, it may be assumed that subject sensors correspond to groupings based on sensor device (e.g., data from a first subject sensor corresponds to feature-extracted evaluation data 1812*a-nmp* illustrated in the upper half of model input layer 1902, and data from a second subject sensor corresponds to feature-extracted evaluation data 1812*a-nmp* illustrated in the lower half of model input layer 1902).

A data path for feature-extracted evaluation data inputs for first and second subject sensors illustrated in model input layer 1822 may proceed to model training layer 1824, which illustrates how each of the n*m*p sets of extracted features in model input layer 1822 are provided as input to q number of MLMs (namely, MLM-1 through MLM-q) to produce q number of predictions for each of the n*m*p sets of extracted features for each respective subject sensor. In particular, n*m sets of evaluation data 1710 corresponding to aggregated and specified subject sensor data for each subject sensor (e.g., data 1712-*a-nm* or 1714*a-nm*), or the n*m*p sets of extracted features for each respective subject sensor (e.g., data 1812*a-nmp* or 1814*a-nmp*), may be input to the corresponding q MLMs in model input layer 1902 for each subject sensor as a corpus of training data used to train the q MLMs. As a non-limiting example, the q machine learning models for each subject sensor in model input layer 1822 (corresponding to component 1404*d* of process 1404) may be supervised learning models that have been trained using a corpus of training data that may include labeled input sets of extracted features of input sensor data (e.g., data 1812*a-nmp* or 1814*a-nmp*, generally data produced according to component 1404*e*), labeled sets of specified and aggregated sensor data (e.g., data 1712-*a-nm* or 1714*a-nm*, generally data produced according to component 1404*c*), labeled evaluation outcome data 1516*a*, or other labeled outputs corresponding to a set of labeled inputs (e.g. labeled input subject sensor data for a subject sensor, such as component 1404*a*). Machine learning models in model training layer 1824 may function to produce outcome predictions of an outcome not directly measurable by any of the subject sensors by performing one or more MLM-based transformations on input subject sensor data, or based on transformations on feature-extracted evaluation data of model input layer 1822 in the example of FIG. 18B.

In particular, the n*m*p sets of extracted features corresponding to the first subject sensor (feature-extracted evaluation data 1812*a-nmp*) may be processed by first a MLM application (MLM-1) in model training layer 1824 to produce n*m*p outcome predictions in model prediction layer 1826. Similarly, the n*m*p sets of extracted features corresponding to the first subject sensor (feature-extracted evaluation data 1812*a-nmp*) may additionally be proceed by remaining MLM applications (such as MLM-q) in model training layer 1824 to produce respective n*m*p sets of extracted features corresponding to each of the remaining q−1 MLM applications in model prediction layer 1826. All of the outcome predictions produced based on the n*m*p sets of extracted features of the first subject sensor (1812*a-nmp*) may be represented by trained MLM outcome predictions for the first subject sensor 1912*a-nmpq* (also illustrated in model prediction layer 1826) produced by the q MLM applications of model training layer 1904 for the first subject sensor (MLM-1 through MLM-q), where n*m*p*q represents the number of outcome predictions based on the n*m*p sets of extracted features for the first subject sensor produced by the q MLM applications in the model training layer. Similarly, all of the outcome predictions produced based on the n*m*p*q sets of extracted features of the second subject sensor (1814*a-nmp*) may be represented by trained MLM outcome predictions for the second subject sensor 1914*a-nmpq* (also illustrated in model prediction layer 1826) produced by the q MLM applications of model training layer 1824 for the second subject sensor (MLM-1 through MLM-q), where n*m*p*q represents the number of outcome predictions based on the n*m*p sets of extracted features for the second subject sensor produced by the q MLM applications in the model training layer.

Figure 19:
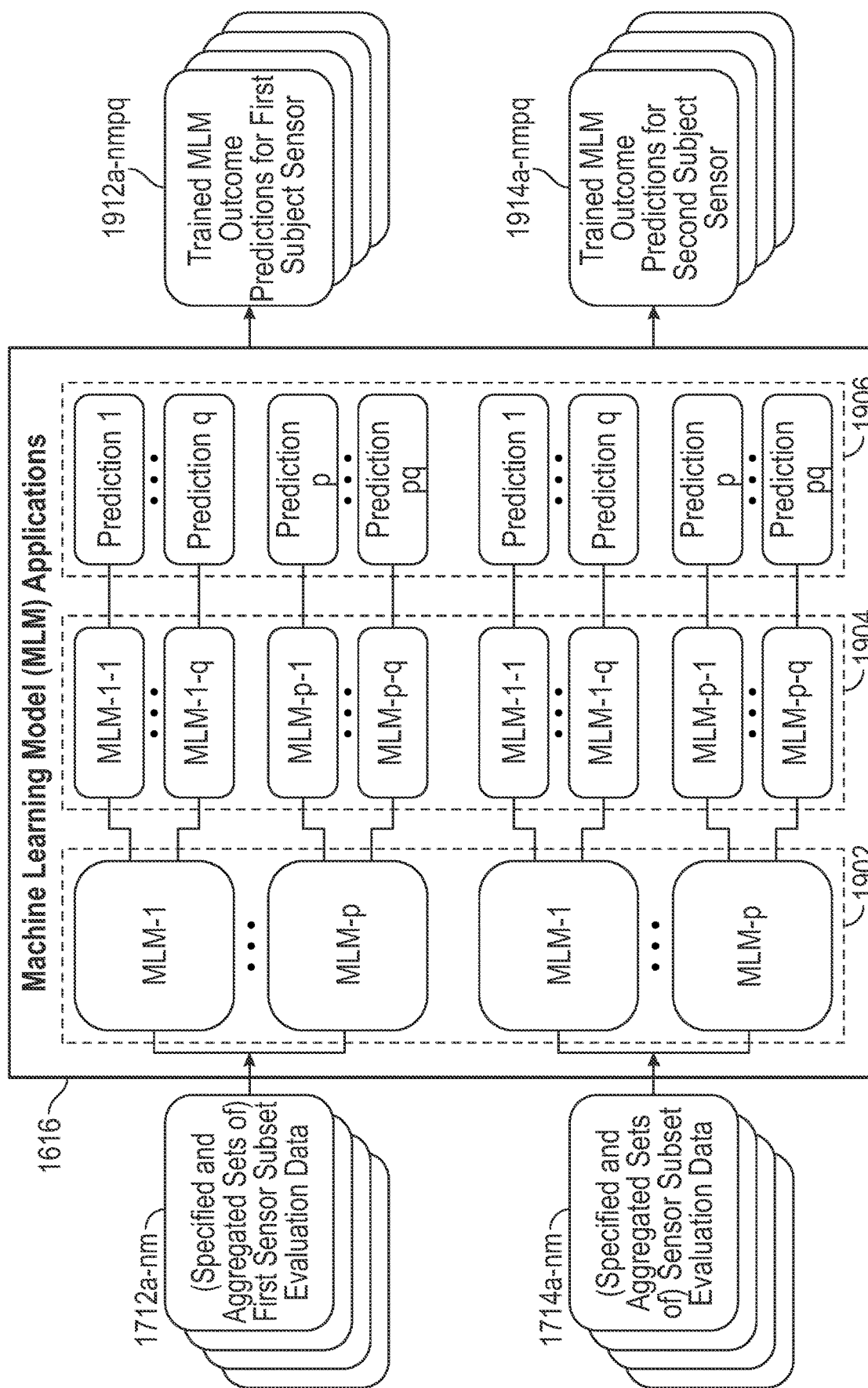
FIG. 19 illustrates an example schematic block diagram of machine learning model applications of an enhanced sensor assessments environment, according to some embodiments of the present technology.

FIG. 19 illustrates a detailed schematic block diagram of MLM applications 1616 of FIG. 16, specifically illustrating a data path corresponding to application functions or circuit components that perform at least a part of the model training composition configuration described by process 1404 of method 1400, in accordance with embodiments where component 1404e is optionally omitted from model training compositions (or equivalently, embodiments where FEM applications 1614 are omitted from sensor group champion elector 1620). In embodiments where FEM applications are not included as a component of model training compositions, MLM applications 1616 may comprise at least two trained MLMs for every specified and aggregated sets of subject sensor evaluation data. A first set of MLMs of MLM applications 1616, shown in first model training layer 1902, may transform aggregated and specified subject sensor data sets into sets of extracted features. A second MLM of MLM applications 1616, shown in second model training layer 1904, may receive as input a set of extracted features generated by a first MLM in first model training layer 1902, and produce an outcome prediction shown in model prediction layer 1906 corresponding to an outcome that is not directly measurable by any of the subject sensors.

In addition to the characteristics described above in connection with component 1404d of process 1404 in FIG. 14, and MLM applications 1616 in FIG. 16, MLM applications MLM-1 through MLM-p illustrated in first model training layer 1902 of FIG. 19 may be applications or circuit components that are programmably configured to perform analytic and feature-extraction procedures on their input data sets selected from the following non-limiting list of example procedures: PCA procedures, GBM procedures, SVD procedures, ICA procedures, LDA procedures, and autoencoder neural network procedures. MLM applications MLM-1-1 through MLM-p-q illustrated in second model training layer 1904 of FIG. 19 may be applications or circuit components that are programmably configured to perform analytic and prediction generating procedures based on their input data sets selected from the following non-limiting list of example modeling procedures: generalized linear modeling procedures such as linear regression, artificial neural network modeling procedures, gradient boosting modeling procedures, random forest procedures, factorization machine procedures, support vector machine (SVM) procedures, or Bayesian network procedures.

First model training layer 1902 of MLM applications 1616 may graphically illustrate the p MLMs for performing analytic and feature-extraction procedures above, specifically illustrating applications MLM-1 through MLM-p receiving inputs corresponding to specified and aggregated sets of first subject sensor evaluation data 1712a-nm in the upper half of first model training layer 1902, and illustrating applications MLM-1 through MLM-p receiving inputs corresponding to specified and aggregated sets of second subject sensor evaluation data 1714a-nm in the lower half of first model training layer 1902. First model training layer 1902 may illustrate, for each subject sensor, each of the n*m input sets of specified and aggregated subject sensor evaluation data for the first subject sensor and for the second subject sensor being provided as input to the p MLM applications MLM-1 through MLM-p (of component 1404d), to produce sets of extracted features that are comparable to feature-extracted evaluation data for first subject sensor 1812a-nmp and for second subject sensor 1812a-nmp produced by FEM applications 1614 of FIG. 18A (though said FEM applications are omitted, in the context of FIG. 19).

In particular, n*m sets of evaluation data 1710 corresponding to aggregated and specified subject sensor data for each subject sensor (e.g., data 1712-a-nm or 1714a-nm), may be input to the corresponding p MLMs in first model training layer 1902 for each subject sensor as a corpus of training data used to train the p MLMs. As a non-limiting example, the p machine learning models for each subject sensor in first model training layer 1902 (corresponding to component 1404d of process 1404) may be supervised learning models that have been trained using a corpus of training data that may include labeled output sets of extracted features of input sensor data (e.g., data 1812a-nmp or 1814a-nmp, generally data produced according to component 1404e), labeled input sets of specified and aggregated sensor data (e.g., data 1712-a-nm or 1714a-nm, generally data produced according to component 1404c), or other labeled outputs corresponding to a set of labeled inputs (e.g. labeled input subject sensor data for a subject sensor, such as component 1404a).

Representations of inputs (or groupings of inputs) to MLM applications 1616 may correspond to sets of extracted features for each of the specified and aggregated sensor data of all subject sensors considered by electoral sensor champion selector 1514. As above in connection with FIG. 17, it may be assumed that subject sensors correspond to groupings based on sensor device (e.g., data from a first subject sensor corresponds to evaluation data 1712a-nm illustrated being input to the p MLMs for feature extraction in the upper half of first model training layer 1902, and data from a second subject sensor corresponds to evaluation data 1714a-nm illustrated being input to the p MLMs for feature extraction in the lower half of first model training layer 1902).

A data path for feature-extracted evaluation data sets produced by each of the p MLMs for feature extraction in first model training layer 1902 for each of the n*m specified and aggregated sets of subject sensor evaluation data may proceed to second model training layer 1904. Second model training layer 1904 may illustrate q MLMs for producing output predictions based on each of the n*m*p sets of extracted features produced by in model input layer 1902. The n*m sets of extracted features by each of the p MLMs (MLM-1 through MLM-p) in the first model training layer may be provided as input to q number of MLMs in to produce q number of predictions for each of the n*m*p sets of extracted features for each respective subject sensor.

In particular, the n*m*p sets of extracted features for each respective subject sensor (e.g., outputs of the first model training layer 1902, comparable to data 1812a-nmp or 1814a-nmp of FIGS. 18A and 18B), may be input to the corresponding q MLMs in second model input layer 1904 for each subject sensor as a corpus of training data used to train the q MLMs. As a non-limiting example, the q machine learning models for each subject sensor in second model training layer 1904 (corresponding to component 1404d of process 1404) may be supervised learning models that have been trained using a corpus of training data that may include labeled input sets of extracted features of input sensor data (e.g., data 1812a-nmp or 1814a-nmp, generally data produced according to component 1404e), labeled input sets of specified and aggregated sensor data (e.g., data 1712-a-nm or 1714a-nm, generally data produced according to component 1404c), labeled evaluation outcome data 1516a, or other labeled outputs corresponding to a set of labeled inputs (e.g. labeled input subject sensor data for a subject sensor, such as component 1404a).

Machine learning models in second model training layer 1904 may function to produce outcome predictions of an outcome not directly measurable by any of the subject sensors by performing one or more MLM-based transformations on input subject sensor data, or based on transformations of feature-extracted evaluation data produced by first model training layer 1902. The n*m*p sets of extracted features corresponding to the first subject sensor (output by MLM-1 through MLM-p of first model training layer 1902) may be processed by a set of q MLM applications (MLM-1-1 through MLM-p-q) in model training layer 1904 to produce n*m*p*q outcome predictions in model prediction layer 1906. Similarly, the n*m*p sets of extracted features corresponding to the second subject sensor (output by MLM-1 through MLM-p of first model training layer 1902) may additionally be proceed by the set of q MLM applications (MLM-1-1 through MLM-p-q) in model training layer 1904 to produce respective n*m*p*q outcome predictions in model prediction layer 1906. Trained MLM outcome predictions for first subject sensor 1912a-nmpq and for second subject sensor 1914a-nmpq may correspond to the outcome predictions produced in model prediction layer 1906.

Figure 20:
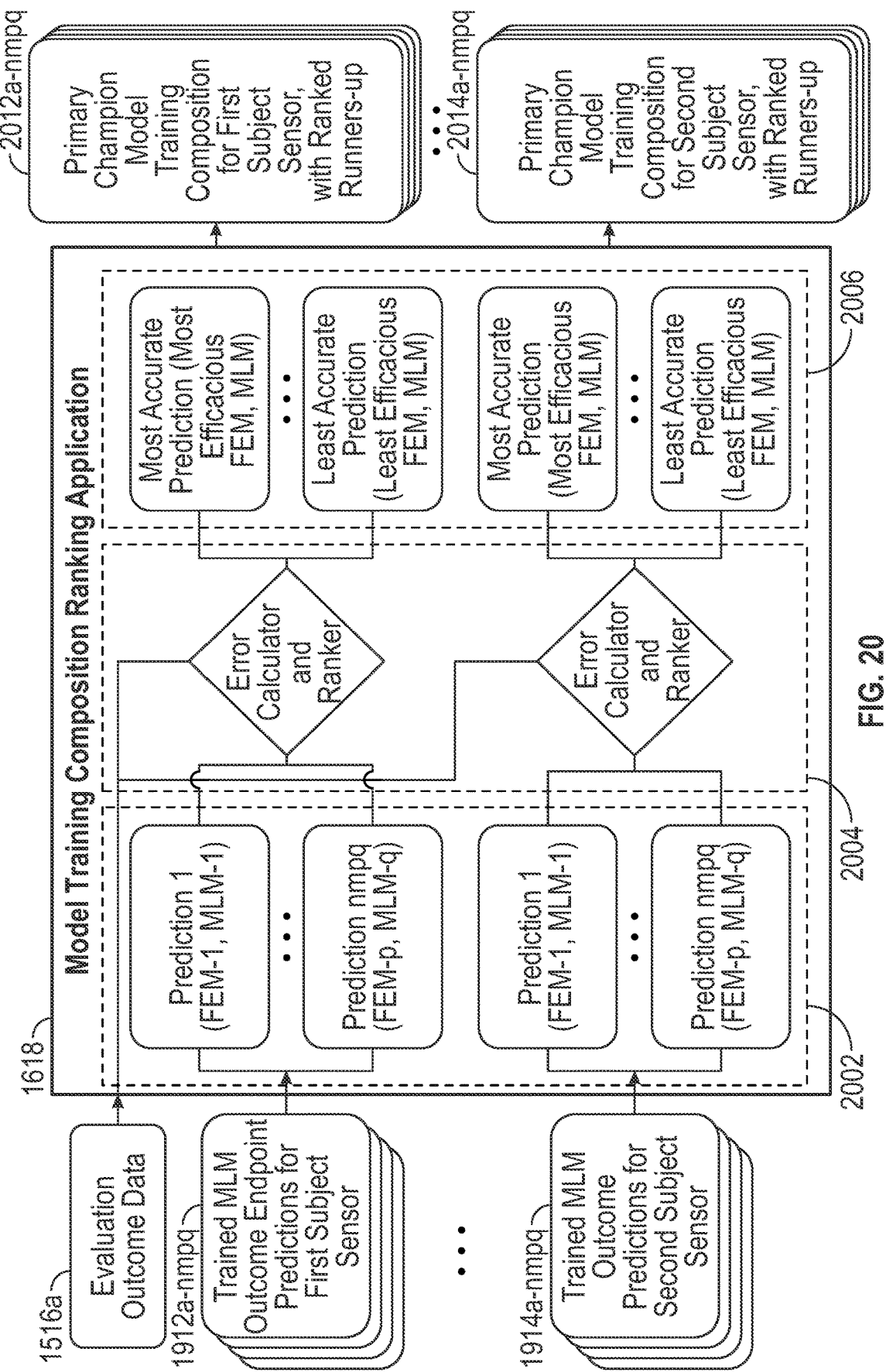
FIG. 20 illustrates model training composition ranking application of an enhanced sensor assessments environment, according to some embodiments of the present technology.

FIG. 20 illustrates model training composition ranking application 1618, that receives trained MLM outcome predictions for the first subject sensor and the second subject sensor (1912a-nmpq and 1914a-nmpq) as inputs both in embodiments where FEM applications 1614 and component 1404e are optionally omitted from model training compositions (e.g., FIG. 19), and also embodiments where FEM applications 1614 and component 14043 are included in model training compositions (e.g., FIGS. 18A and 18B). To avoid unnecessary obfuscation of the presented embodiments, it may be assumed that FIG. 20 corresponds to embodiments in which FEM applications 1615 and component 1404e are included in model training compositions. Inputs 1912a-nmpq and 1914a-nmpq to model training composition ranking application 1618 may be graphically represented by the n*m*p*q predictions illustrated in ranking input layer 2002 for the first subject sensor (upper half) and for the second subject sensor (lower half).

particular sensor data aggregation of the m sensor data aggregations used for generating the prediction, a particular FEM of the p FEMs used for generating the prediction, and a particular MLM of the q MLMs used for generating the prediction. To avoid unnecessary obfuscation of the presented embodiments, predictions shown in Table 1 may be indexed solely by the FEM and MLM applications used to generate them.

Predictions illustrated in ranking input layer 2002 may proceed to ranking computation layer 2004, shown as containing an error calculator and ranker for each subject sensor. Ranking computation layer 2004 may also receive input corresponding to evaluation outcome data 1516a. Ranking computation layer 2004 may perform the functions described above in connection with process 1406 of method 1400. Error calculator and ranker of ranking computation layer 2004 may compare outcome predictions from ranking input layer 2002 corresponding to predictions produced by various model training compositions using sensor data from a given subject sensor. This comparison may correspond to comparing outcome predictions by models trained according to every valid combination pair (or set) of FEM application and MLM application of FEM applications 1614 and MLM applications 1616, given inputs corresponding to every aggregated and specified sensor set produced by sensor data pre-processor 1612 for sensor data from the given subject sensor. Comparisons of the outcome predictions may involve a comparison to objective or empirical evaluation outcome data 1516a. In particular, error calculator and ranker of ranking computation layer 2004 may generate efficacy metric values (referred to below as simply efficacy "scores") based on comparisons between, or computations involving, evaluation outcome data 1516a and the generated outcome prediction from each model configured according to its respective model training composition.

TABLE 2

|  | MLM-1 | MLM-2 | MLM-3 | MLM-4 | ... | MLM-q |
|---|---|---|---|---|---|---|
| FEM-1 | $Score_{1,1}$ | $Score_{1,2}$ | $Score_{1,3}$ | $Score_{1,4}$ | ... | $Score_{1,q}$ |
| FEM-2 | $Score_{2,1}$ | $Score_{2,2}$ | $Score_{2,3}$ | $Score_{2,4}$ | ... | $Score_{2,q}$ |
| ... | ... | ... | ... | ... | ... | ... |
| FEM-p | $Score_{p,1}$ | $Score_{p,2}$ | $Score_{p,3}$ | $Score_{p,4}$ | ... | *$Score_{p,q}$ |

TABLE 1

|  | MLM-1 | MLM-2 | MLM-3 | MLM-4 | ... | MLM-q |
|---|---|---|---|---|---|---|
| FEM-1 | $Prediction_{1,1}$ | $Prediction_{1,2}$ | $Prediction_{1,3}$ | $Prediction_{1,4}$ | ... | $Prediction_{1,q}$ |
| FEM-2 | $Prediction_{2,1}$ | $Prediction_{2,2}$ | $Prediction_{2,3}$ | $Prediction_{2,4}$ | ... | $Prediction_{2,q}$ |
| ... | ... | ... | ... | ... | ... | ... |
| FEM-p | $Prediction_{p,1}$ | $Prediction_{p,2}$ | $Prediction_{p,3}$ | $Prediction_{m,4}$ | ... | $Prediction_{p,q}$ |

Table 1, above, shows trained MLM outcome predictions for a given subject sensor as a data frame with rows indexed by the p Feature Extraction Models (FEMs) used on data to train the model, and columns indexed by the q Machine Learning Models (MLMs) used on the model to generate the prediction. $Prediction_{i,j}$ may refer to a prediction by the i-th trained MLM on features extracted by the j-th FEM. A copy of Table 1 may be generated for each of the n*m sets of specified and aggregated evaluation sensor data, for each of the subject sensors. Each of the predictions associated with each of the subject sensors may correspond to a respective combination of indices, that identify model training composition components used to generate the prediction, namely: a particular model input specification of the n model input specifications used for generating the prediction, a Table 2, above, may represent a matrix of scores corresponding to efficacy metric values produced by error calculator and ranker of ranking computation layer 2004 for each of the trained MLM outcome predictions of ranking input layer 2002, according to process 1406 of method 1400. Table 2 may be illustrated as a data frame with the same indices for rows and columns as Table 1. As with Table 1, a copy of Table 2 may be generated for each of the n*m sets of specified and aggregated evaluation sensor data, for each of the subject sensors. Table 2 may represent a record of efficacy metric values computed according to process 1406 of method 1400, or simply efficacy "scores" associated with each trained MLM outcome prediction for a particular subject sensor. In some embodiments, the efficacy metric or score may be based on an error metric selected from the following non-limiting list of examples: residuals, mean absolute error (MAE), mean squared error (MSE), root mean squared error (RMSE), KS Youden, C statistic, Gini Index, or percentage error, and may generally indicate a degree of variance between an outcome prediction generated by a model, and empirical outcome data such as evaluation outcome data 1516*a* as described in connection with process 1406 of method 1400.

Accordingly, each of the efficacy scores associated with each subject sensor may correspond to a respective combination of indices, that identify model training composition components used to generate the prediction, namely: a particular model input specification of the n model input specifications used for generating the prediction, a particular sensor data aggregation of the m sensor data aggregations used for generating the prediction, a particular FEM of the p FEMs used for generating the prediction, and a particular MLM of the q MLMs used for generating the prediction. To avoid unnecessary obfuscation of the presented embodiments, scores for predictions shown in Table 2 may be indexed solely by the FEM and MLM applications used to generate the corresponding prediction.

Error calculator and ranker of ranking computation layer 2004 may compare outcome predictions from ranking input layer 2002 by calculating efficacy metric values or scores as describe above in connection with Table 2, and proceed to identify a model training composition corresponding to a score indicating a lowest degree of variance between the outcome prediction of the model training composition, and evaluation outcome data 1516*a*. These functions of error calculator and ranker of ranking computation layer 2005 may correspond to process 1408 of method 1400. An asterisk ("*") symbol in Table 2 may indicate, as an example, a "best" efficacy metric value or score of all the scores computed for predictions of ranking input layer 2002 corresponds to the p-th FEM of FEM applications 1614 and the q-th MLM of MLM applications 1616. As indicated above, Table 2 may correspond to a particular subject sensor (corresponding to component 1404*a* of method 1400), a particular n-th model input specification of the n model input specifications used for generating the prediction (corresponding to component 1404*b*), and a particular m-th sensor data aggregation of the m sensor data aggregations used for generating the prediction (corresponding to component 1404*c*).

Therefore, the p-th FEM of FEM applications 1614 and the q-th MLM of MLM applications 1616, for the particular subject sensor, n-th model input specification, and m-th sensor data aggregation may correspond to a model training composition that generated an outcome prediction with a lowest degree of variance relative to evaluation outcome data 1516*a* (also referred to as a "most accurate" prediction). Said most accurate model training composition may be illustrated in ranking output layer 2006, for each subject sensor. Ranking output layer 2006 may also list ranked runners-up to the most accurate model training composition, by presenting an ordered list of the remainder of the model training compositions arranged according to their efficacy metric value, in descending order. The most accurate model training composition of all the model training compositions used to generate outcome predictions based on data from a particular subject sensor may be referred to as a "primary champion model training composition" for the particular subject sensor due being based on a comparison of outcome predictions by models trained on the same subject sensor data (corresponding to component 1404*a*, a primary factor of each model training composition).

Outputs of model training composition ranking application 1618 may include the most accurate model training composition for each subject sensor. FIG. 20 illustrates a primary champion model training composition for the first subject sensor 2012*a*, and a primary champion model training composition for the second subject sensor 2014*a*. Ranked runners-up model training compositions 2012*b*-*nmpq* and 2014*b*-*nmpq* may represent model training compositions that generated outcome predictions with efficacy metric values or scores indicating a greater degree of variance relative to evaluation outcome data 1516*a* than the primary champion model training composition for the respective subject sensor.

Figure 21:
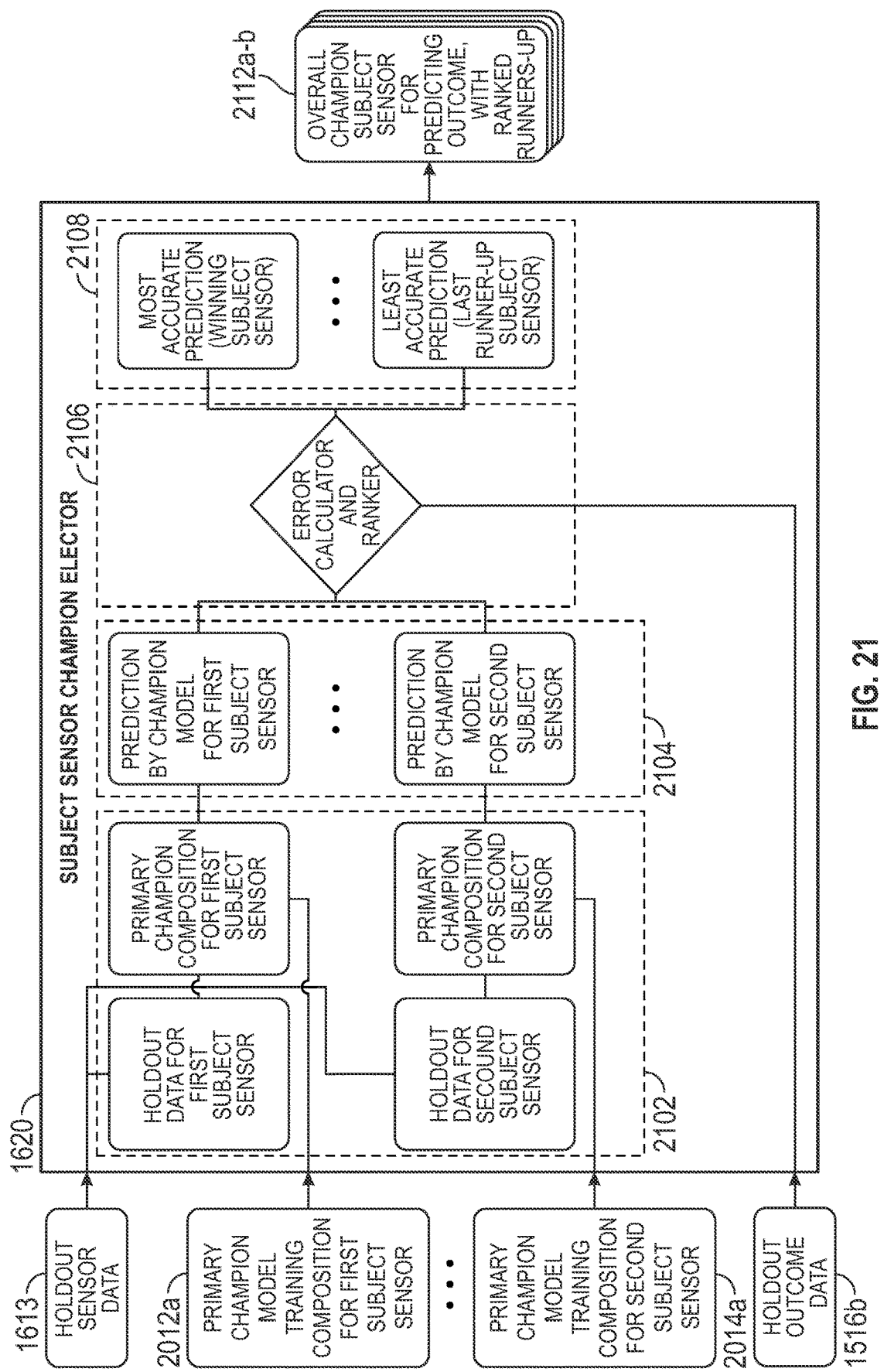
FIG. 21 illustrates an example sensor champion elector of an enhanced sensor assessments environment, according to some embodiments of the present technology.

FIG. 21 illustrates subject sensor champion elector 1620, that receives primary champion model training compositions for each of the subject sensors as inputs, specifically primary champion model training composition 2012*a* for the first subject sensor and primary champion model training composition 2014*a* for the second subject sensor. Subject sensor champion elector 1620 may represent applications or circuit components that are programmably configured to perform the functions of process 1410 of method 1400. Model recomposition layer 2102 is shown including representations of the primary champion model training composition 2012*a* for the first subject sensor and primary champion model training composition 2014*a* for the second subject sensor, and representations of holdout sensor data 1613 for each of the first and second subject sensors.

Subject sensor champion elector 1620 may configure, by model recomposition layer 2102, a plurality of models according to the primary champion model training compositions for each subject sensor, and may use generate outcome predictions based on holdout sensor data 1613 using the configured plurality of models. In evaluating the primary champion model training compositions for each subject sensor, holdout data may be used for out-of-sample validation of the predictive efficacy associated with the primary champion model training compositions. Specifically, holdout sensor data 1613 may be provided as input sensor data to models configured according to the primary champion model training compositions in model recomposition layer 2102. Holdout sensor data 1613 associated with a first subject sensor may be provided to primary champion model training composition 2012*a* for the first subject sensor, and holdout sensor data 1613 associated with a second subject sensor may be provided to primary champion model training composition 2014*a* for the second subject sensor. Holdout sensor data 1613 for a particular subject sensor may therefore be processed according to a particular n-th model input specification (corresponding to component 1404*b*), a particular m-th sensor data aggregation (corresponding to component 1404*c*), a particular p-th FEM application (corresponding to component 1404*e*), and a particular q-th MLM application (corresponding to 1404*d*) of its respective primary champion model training composition.

TABLE 3

| Sensor Subset 1 | Sensor Subset 2 | Sensor Subset 3 | Sensor Subset 4 | Sensor ... Subset n |
|---|---|---|---|---|
| Prediction$_1$ | Prediction$_2$ | Prediction$_3$ | Prediction$_4$ | Prediction$_n$ |

Table 3, above, shows predictions (illustrated in holdout prediction layer 2104) generated by primary champion model training compositions in model recomposition layer 2102, that may be provided to error calculator and ranker of ranking computation layer 2106. Table 3 may be illustrated as a list indexed by sensor subset, and may show n number of sensor subject predictions for the sake of example, though the non-limiting example embodiment of FIG. 21 only shows first and second sensor subjects.

Subject sensor champion elector 1620 may compare outcome predictions by primary champion model training compositions based on holdout sensor data 1613, to objective or empirical holdout outcome data 1516*b*. Error calculator and ranker of ranking computation layer 2106 may compare outcome predictions from holdout prediction layer 2104 corresponding to predictions produced by primary champion model training compositions for each subject sensor. Comparisons of the outcome predictions may involve a comparison to objective or empirical holdout outcome data 1516*b*. In particular, error calculator and ranker of ranking computation layer 2004 may generate efficacy metric values (referred to below as simply efficacy "scores") based on comparisons between, or computations involving, holdout outcome data 1516*b* and the generated outcome prediction from each model configured according to a primary champion model training configuration.

TABLE 4

| Sensor Subset 1 | Sensor Subset 2 | Sensor Subset 3 | Sensor Subset 4 | ... | Sensor Subset n |
|---|---|---|---|---|---|
| $Score_1$ | *$Score_2$ | $Score_3$ | $Score_4$ | | $Score_n$ |

Table 4, above, may list of scores indexed by subject sensor, corresponding to efficacy metric values produced by error calculator and ranker of ranking computation layer 2004 for each of the trained MLM outcome predictions of ranking input layer 2002, according to process 1406 of method 1400. Table 4 may be illustrated as a list with the same indices for its (column) entries as Table 3, namely each subject sensor, and may show n number of sensor subject predictions for the sake of example, though the non-limiting example embodiment of FIG. 21 only shows first and second sensor subjects.

Table 4 may represent as a record of efficacy metric values computed in accordance with functions of process 1410 of method 1400, or simply efficacy "scores" associated with each outcome prediction produced by each primary champion model training composition for the subject sensors. In some embodiments, the efficacy metric or score may be based on an error metric selected from the following non-limiting list of examples: residuals, mean absolute error (MAE), mean squared error (MSE), root mean squared error (RMSE), or percentage error, and may generally indicate a degree of variance between an outcome prediction generated by a model configured according to a primary champion model training configuration, and empirical outcome data such as holdout outcome data 1516*b* as described in connection with process 1410 of method 1400.

Efficacy metrics or scores for each of the models corresponding to a primary champion model training composition may be compared, thereby comparing the performances of the models (determined to be the highest performing, or most efficacious models for their respective subject sensors) in generating outcome predictions based on sensor data from their respective subject sensors. Accordingly, the efficacy scores associated with each subject sensor may represent an accuracy level of the respective primary champion model training composition used to generate an outcome prediction, and may further represent the predictive efficacy of the subject sensors themselves via a performance score that can be aptly or validly compared (whereas comparison of heterogeneous sensors is usually not apt or valid).

Error calculator and ranker of ranking computation layer 2106 may compare outcome predictions from ranking input layer 2002 by calculating efficacy metric values or scores as describe above in connection with Table 4, and proceed to identify a primary champion model training composition corresponding to a score indicating a lowest degree of variance between the outcome prediction of the primary champion model training composition, and holdout outcome data 1516*a*. An asterisk ("*") symbol in Table 4 may indicate, as an example, a "best" efficacy metric value or score of all the scores computed for predictions of holdout prediction layer 2104 corresponds to the primary champion model training composition of the second subject sensor.

Therefore, the primary champion model training composition of the second subject sensor may correspond to a primary champion model training composition that generated an outcome prediction with a lowest degree of variance relative to holdout outcome data 1516*b* (also referred to as a "most accurate" prediction). Said most accurate prediction by a primary champion model training composition may be illustrated in the uppermost portion of ranking output layer 2108. Ranking output layer 2108 may also list ranked runners-up to the most accurate primary champion model training composition, by presenting an ordered list of the remainder of the primary champion model training compositions arranged according to their efficacy metric value, in descending order. Based on the rankings produced in ranking output layer 2108, subject sensor champion elector 1620 may determine an overall champion model training composition 2112*a*, sometimes referred to as a 'general' or 'overall'champion model training composition due being based on a comparison of outcome predictions by models corresponding to the highest performing primary champion model training compositions for each subject sensor, as described in connection with process 1410 of method 1400. Primary champion model training composition 2112*b* may represent a first runner-up primary champion model training composition to overall champion model training composition 2112*a* determined by subject sensor champion elector 1620.

As alluded to above, an accuracy level of the any primary champion model training composition used to generate an outcome prediction may represent the predictive efficacy of the underlying subject sensor and its data (component 1404*a* of method 1400) by virtue of a performance score that can be aptly or validly compared to performance of another primary champion model training composition in generating an outcome prediction using another, different underlying sensor. Accordingly, an overall champion model training composition 2112*a* determined or otherwise identified by subject sensor champion elector 1620 may be referred to as an "election" of the subject sensor used in the configuration (e.g., as component 1404*a*) of overall champion model training composition 2112*a*. The subject sensor used in the configuration of overall champion model training composition 2112*a* may be referred to as elected overall subject sensor champion 1518, in the context of FIG. 16. In some embodiments, elected overall subject sensor champion 1518 may be used to reconfigure sensor devices 1504 and 1508 in sensor deployment setting 1520 to optimize sensor data collection from elected overall subject sensor champion 1518.

Figure 22:
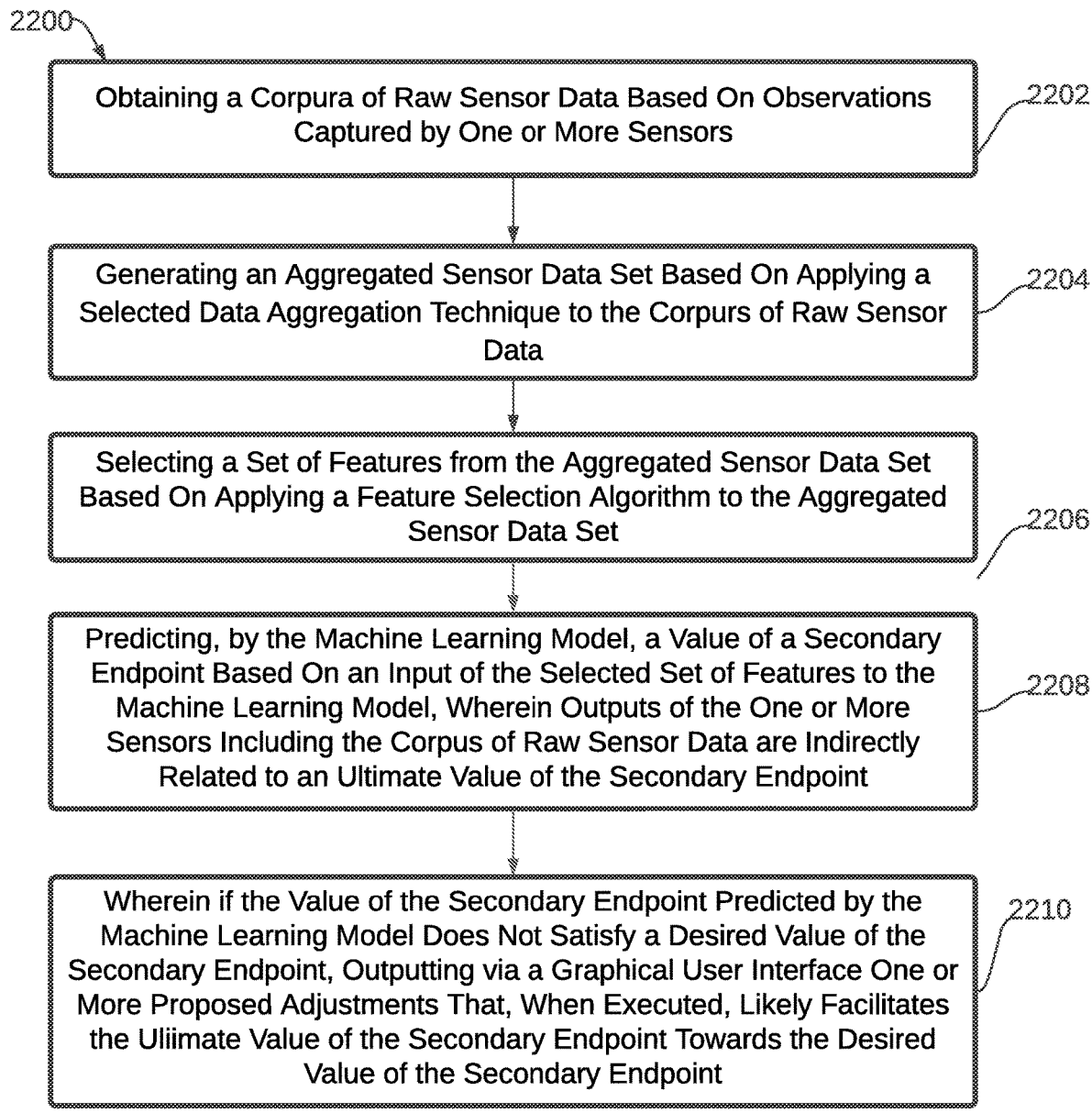
FIG. 22 illustrates a flow chart showing an example process of implementing an enhanced sensor assessments

FIG. 22 illustrates one embodiment of method 2200 for predicting a value of a target endpoint using outputs of a champion sensor. It shall be appreciated that other examples contemplated within the scope of the present disclosure may involve more operations, fewer operations, different operations, or a different order of operations than as shown in FIG. 22.

In some embodiments, method 2200 may include process 2202 that functions to obtain a corpus of raw sensor data in response to or based on observations captured by one or more sensors (e.g., a champion sensor or champion sensor set). Raw sensor data, as referred to herein, preferably includes sensor data as previously discussed and in an unprocessed state or substantially unprocessed state. As a non-limiting example, raw sensor data may include sensor that has not yet been modified (e.g., cleaned) or aggregated in some manner that changes a quality or quantity of the sensor data. Process 2202 may obtain the corpus of raw sensor in any suitable manner including, but not limited to, directly from the sensor generating the raw sensor data (e.g., via streaming transmissions or intermittent transmissions over a network), from a memory storing the raw sensor data, by reading outputs of the sensor (e.g., reading a sensor display), and/or the like.

Process 2204 of method 2200, in some embodiments, may function to generate an aggregated sensor data set based on applying a selected data aggregation technique to the corpus of raw sensor data. The selected data aggregation technique may be selected from a plurality of data aggregation techniques that aggregate or partition the raw sensor data based on a given temporal measure (e.g., monthly, daily, hourly, and the like). Additionally, or alternatively, the selected data aggregation technique when assessed against the remaining or unselected data aggregation techniques transforms the raw sensor data into a new state that is optimized to be predictive input to a trained machine learning model for predicting a value of a secondary endpoint.

Process 2206 of the method 2200, in one or more embodiments, may function to select a set of features from the aggregated sensor data set based on applying a feature selection algorithm to the aggregated sensor data set. The selected set of features preferably includes features determined to best support a prediction of a value of a secondary endpoint with a statistically meaningful accuracy. The selected set of features may include a subset of the aggregated sensor data set and/or one or more feature values derived from the aggregated sensor data set. As described previously, the feature selection algorithm may include a second machine learning model selected from a plurality of heterogeneous machine learning models (e.g., principal component model, Gboost model, and the like) based on having the highest feature selection accuracy for a holdout validation data set among the plurality of heterogeneous machine learning models.

Process 2208 of the method 2200, in some embodiments, may function to use a machine learning model to predict an output value of a secondary endpoint based on an input of the selected set of features to the machine learning model. In such embodiments, the machine learning model may include a machine learning model selected from a plurality of heterogenous machine learning models and specifically, trained for predicting values for the secondary endpoint. Additionally, in some embodiments, a combination of the sensor and the machine learning model was selected from a plurality of diverse combinations of one or more sensors of a set of heterogeneous sensors and a given machine learning model of a set of heterogeneous machine learning models. In such embodiments, a selection of the combination of the one or more sensors and the machine learning model was based on the combination of the one or more sensors and the machine learning model having a highest predictive accuracy for a holdout validation data set among the plurality of diverse combinations of the one or more given sensors of the set of heterogeneous sensors and the given machine learning model of the set of heterogeneous machine learning models.

It shall be recognized that the corpus of raw sensor data, which is the output of the sensor, may be indirectly related to an ultimate value of the secondary endpoint since the outputs of the sensor and the ultimate value of the secondary endpoint may be indirectly connected via one or more intermediary factors. That is, there may be no direct cause and effect link between the outputs of the sensor and the ultimate value of the secondary endpoint since several intervening factors may influence the ultimate value of the secondary endpoint.

Additionally, or alternatively, an indirect connection or relationship between the outputs of the one or more sensors (e.g., corpus of raw sensor data) and an ultimate value of the secondary endpoint based on a remoteness between the measured outputs of the sensor and the ultimate value of the secondary endpoint. In such embodiments, a corpus of raw sensor data may relate to a factor that is variably remote from the ultimate value of the secondary endpoint if the corpus of raw sensor data does not directly impact the ultimate value of the secondary endpoint. In particular, in one or more embodiments the secondary endpoint may be a variable that is unrelated to the inputs to the one or more sensors and/or the outputs of the one or more sensors.

Additionally, or alternatively, the secondary endpoint comprises a target variable that is not directly measurable due to remoteness in time between factors that affect a value of the secondary endpoint and the ultimate value of the secondary endpoint.

Process 2210 of method 2200, in some embodiments, may function to generate via a graphical user interface one or more proposed adjustments that, when executed, likely facilitates the ultimate value of the secondary endpoint toward the desired value of the secondary endpoint. In such embodiment, the one or more proposed adjustments include adjusting one or more attributes of a subject (e.g., a subject environment, a biological subject, and the like) associated with the secondary endpoint based on the predicted value of the secondary endpoint. In one or more associated embodiments, adjusting the one or more attributes of the subject may include applying a physical manipulation that alters a state of the subject that encourages the secondary endpoint towards a desired value, which may be different than the predicted value of the secondary endpoint. Stated differently, adjusting the one or more attributes of the subject associated with the secondary endpoint may cause a likely shift from the predicted value of the secondary endpoint to a desired value of the secondary endpoint.

Additionally, or alternatively, process 2210 of method 2200 may include calculating a difference between a desired value of the secondary endpoint and the predicted value of the secondary endpoint. In one or more embodiment, the process 2210 may use the calculated between the desired and predicted values to identify one or more prescriptive adjustments to the one or more attributes of the subject such that adjusting the one or more attributes of the subject includes applying the one or more prescriptive adjustments to the subject environment. In a nonlimiting example, the calculated difference may be used as a lookup value or search value for identifying one or more likely prescriptive adjustments.

It shall be noted that, in one or more embodiments, the results of the machine learning-informed feedback sequence (e.g., machine learning analysis or the like) may be presented or displayed on one or more graphical user interfaces. In such embodiments, the one or more graphical user interfaces may include intuitive visualizations, dashboards, and/or reports that illustrate key metrics, trend analysis over time, and/or critical issues detected by any one of the one or more machine learning models.

It shall also be further noted that the system and methods of the embodiment and variations described herein can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, memory sticks (e.g., SD cards, USB flash drives), cloud-based services (e.g., cloud storage), magnetic storage devices, Solid-State Drives (SSDs), or any suitable device. The computer-executable component is preferably a general or application-specific processor, but any suitable dedicated hardware or hardware/firmware combination device can alternatively or additionally execute the instructions.

The systems and methods of the preferred embodiments may additionally, or alternatively, be implemented on an integrated data analytics software application and/or software architecture such as that are offered by SAS Institute Inc. of Cary, N.C., USA. Merely for illustration, the systems and methods of the preferred embodiments may be implemented using or integrated with one or more SAS software tools such as SAS® Viya™ which is developed and provided by SAS Institute Inc. of Cary, N.C., USA.

Although omitted for conciseness, the preferred embodiments include every combination and permutation of the implementations of the systems and methods described herein.

As a person skilled in the art will recognize from the previous detailed description and from the figures and claims, modifications and changes can be made to the embodiments of the disclosure without departing from the scope of the various described embodiments.

What is claimed is:

1. A computer-program product comprising a non-transitory machine-readable storage medium storing computer instructions that, when executed by one or more processors, perform operations comprising:
   identifying a set of heterogeneous sensors, wherein each sensor of the set of heterogeneous sensors generated sensor data based on a respective observation of a target environment;
   configuring a plurality of model training compositions for each sensor of the set of heterogeneous sensors, wherein each model training composition of the plurality of model training compositions for each sensor includes a unique combination of:
   (a) the sensor data of a subject sensor of the set of heterogeneous sensors,
   (b) a model input specification of one or more distinct model input specifications, the model input specification identifying at least a subset of distinct measurements of the sensor data,
   (c) a sensor data aggregation of one or more distinct sensor data aggregations, the sensor data aggregation, when applied to the model input specification, generates one or more distinct aggregations of the subset of distinct measurements of the sensor data, and
   (d) at least two machine learning models selected from a set of heterogeneous machine learning models, wherein a given machine learning model of the at least two machine learning models is trained using a corpus of training data samples;
   computing, for each of the plurality of model training compositions associated with each sensor of the set of heterogeneous sensors, a first efficacy metric value based on predictive outputs of the at least two machine learning models of a subject model training composition of the plurality of model training compositions;
   identifying, for each sensor of the set of heterogeneous sensors, a champion model training composition of the plurality of model training compositions of the subject sensor, the champion model training composition having a highest efficacy metric value among the first efficacy metric values computed for the plurality of model training compositions of the subject sensor; and
   electing, from a plurality of champion model training compositions corresponding to the champion model training compositions identified for each sensor of the set of heterogeneous sensors, an overall champion model training composition corresponding to a champion sensor of the set of heterogeneous sensors based on an assessment of second efficacy metric values of the plurality of champion model training compositions.

2. The computer-program product according to claim 1, wherein the sensor data aggregation comprises a temporal aggregation that, when applied to the sensor data, aggregates the sensor data according to a target temporal domain of a plurality of temporal domains.

3. The computer-program product according to claim 1, wherein the at least two machine learning models comprise a feature extraction model that transforms the one or more distinct aggregations of the distinct measurements of the sensor data to a set of features.

4. The computer-program product according to claim 1, wherein the at least two machine learning models comprise dimensionality reduction models including a principal component analysis model, a gradient boost model, and an autoencoder model.

5. The computer-program product according to claim 1, wherein the given machine learning model of the at least two machine learning models, once trained, perform a regression task for predicting based on the sensor data of the subject sensor, a likelihood of a target outcome that is a secondary endpoint that is not directly measurable by the sensor data of the subject sensor.

6. The computer-program product according to claim 1, wherein the set of heterogeneous machine learning models include a generalized linear model, a random forest model, and an artificial neural network.

7. The computer-program product according to claim 1, wherein:
   computing the first efficacy metric value for each of the plurality of model training compositions for each sensor of the set of heterogeneous sensors includes calculating, using one or more error functions, an error metric value based on a difference between the predictive outputs of the at least two machine learning models of the subject model training composition and actual values of a validation set of data samples, and the first efficacy metric value comprises the error metric value.

8. The computer-program product according to claim 1, further comprising:
using the elected overall champion model training composition and the corresponding champion sensor to configure a computer-implemented predictive system that implements the at least two machine learning models of the elected overall champion model training composition to predict values of a target outcome spatially or temporally remote from a timing or location of the sensor data used in computing the first efficacy metric values or the second efficacy metric values.

9. The computer-program product according to claim 1, further comprising:
using the elected overall champion model training composition to select at least the champion sensor of a sensor suite comprising a subset of the set of heterogenous sensors to produces sensor data for a computer-implemented predictive system configured to predict agricultural-based on outcomes.

10. The computer-program product according to claim 1, wherein the set of heterogeneous sensors include one or more terrestrial-based sensors, one or more aerial-based sensors, and one or more celestial-based sensors.

11. The computer-program product according to claim 1, wherein the target environment comprises an area including agriculture arable land.

12. The computer-program product according to claim 1, wherein the at least two machine learning models comprise:
a feature extraction model selected from a set of heterogeneous feature extraction models, wherein the feature extraction model extracts a set of features from the one or more distinct aggregations of the subset of distinct measurements of the sensor data.

13. A computer-implemented method comprising:
identifying a set of heterogeneous sensors, wherein each sensor of the set of heterogeneous sensors generated sensor data based on a respective observation of a target environment;
configuring a plurality of model training compositions for each sensor of the set of heterogeneous sensors, wherein each model training composition of the plurality of model training compositions for each sensor includes a unique combination of:
(a) the sensor data of a subject sensor of the set of heterogeneous sensors,
(b) a model input specification of one or more distinct model input specifications, the model input specification identifying at least a subset of distinct measurements of the sensor data,
(c) a sensor data aggregation of one or more distinct sensor data aggregations, the sensor data aggregation, when applied to the model input specification, generates one or more distinct aggregations of the subset of distinct measurements of the sensor data, and
(d) at least two machine learning models selected from a set of heterogeneous machine learning models, wherein a given machine learning model of the at least two machine learning models is trained using a corpus of training data samples;
computing, by one or more processors, for each of the plurality of model training compositions associated with each sensor of the set of heterogeneous sensors, a first efficacy metric value based on predictive outputs of the at least two machine learning models of a subject model training composition of the plurality of model training compositions;
identifying, for each sensor of the set of heterogeneous sensors, a champion model training composition of the plurality of model training compositions of the subject sensor, the champion model training composition having a highest efficacy metric value among the first efficacy metric values computed for the plurality of model training compositions of the subject sensor; and
electing, from a plurality of champion model training compositions corresponding to the champion model training compositions identified for each sensor of the set of heterogeneous sensors, an overall champion model training composition corresponding to a champion sensor of the set of heterogeneous sensors based on an assessment of second efficacy metric values of the plurality of champion model training compositions.

14. The computer-implemented method according to claim 13, wherein the sensor data aggregation comprises a temporal aggregation that, when applied to the sensor data, aggregates the sensor data according to a target temporal domain of a plurality of temporal domains.

15. The computer-implemented method according to claim 13, wherein the at least two machine learning models comprise a feature extraction model that transforms the one or more distinct aggregations of the distinct measurements of the sensor data to a set of features.

16. The computer-implemented method according to claim 13, wherein the at least two machine learning models comprise dimensionality reduction models including a principal component analysis model, a gradient boost model, and an autoencoder model.

17. The computer-implemented method according to claim 13, wherein the given machine learning model of the at least two machine learning models, once trained, perform a regression task for predicting based on the sensor data of the subject sensor, a likelihood of a target outcome that is a secondary endpoint that is not directly measurable by the sensor data of the subject sensor.

18. The computer-implemented method according to claim 13, wherein the set of heterogeneous machine learning models include a generalized linear model, a random forest model, and an artificial neural network.

19. The computer-implemented method according to claim 13, wherein:
computing, by the one or more processors, the first efficacy metric value for each of the plurality of model training compositions for each sensor of the set of heterogeneous sensors includes calculating, using one or more error functions, an error metric value based on a difference between the predictive outputs of the at least two machine learning models of the subject model training composition and actual values of a validation set of data samples, and
the first efficacy metric value comprises the error metric value.

20. The computer-implemented method according to claim 13, further comprising:
using the elected overall champion model training composition and the corresponding champion sensor to configure a computer-implemented predictive system that implements the at least two machine learning models of the elected overall champion model training composition to predict values of a target outcome spatially or temporally remote from a timing or location of the sensor data used in computing the first efficacy metric values or the second efficacy metric values.

21. The computer-implemented method according to claim 13, further comprising:
using the elected overall champion model training composition to select at least the champion sensor of a sensor suite comprising a subset of the set of heterogenous sensors to produces sensor data for a computer-implemented predictive system configured to predict agricultural-based on outcomes.

22. A computer-implemented system comprising:
one or more processors;
a memory; and
a computer-readable medium operably coupled to the one or more processors, the computer-readable medium having computer-readable instructions stored thereon that, when executed by the one or more processors, cause a computing device to perform operations comprising:
identifying a set of heterogeneous sensors, wherein each sensor of the set of heterogeneous sensors generated sensor data based on a respective observation of a target environment;
configuring a plurality of model training compositions for each sensor of the set of heterogeneous sensors, wherein each model training composition of the plurality of model training compositions for each sensor includes a unique combination of:
(a) the sensor data of a subject sensor of the set of heterogeneous sensors,
(b) a model input specification of one or more distinct model input specifications, the model input specification identifying at least a subset of distinct measurements of the sensor data,
(c) a sensor data aggregation of one or more distinct sensor data aggregations, the sensor data aggregation, when applied to the model input specification, generates one or more distinct aggregations of the subset of distinct measurements of the sensor data, and
(d) at least two machine learning models selected from a set of heterogeneous machine learning models, wherein a given machine learning model of the at least two machine learning models is trained using a corpus of training data samples;
computing, by one or more processors, for each of the plurality of model training compositions associated with each sensor of the set of heterogeneous sensors, a first efficacy metric value based on predictive outputs of the at least two machine learning models of a subject model training composition of the plurality of model training compositions;
identifying, for each sensor of the set of heterogeneous sensors, a champion model training composition of the plurality of model training compositions of the subject sensor, the champion model training composition having a highest efficacy metric value among the first efficacy metric values computed for the plurality of model training compositions of the subject sensor; and
electing, from a plurality of champion model training compositions corresponding to the champion model training compositions identified for each sensor of the set of heterogeneous sensors, an overall champion model training composition corresponding to a champion sensor of the set of heterogeneous sensors based on an assessment of second efficacy metric values of the plurality of champion model training compositions.

23. The computer-implemented system according to claim 22, wherein the sensor data aggregation comprises a temporal aggregation that, when applied to the sensor data, aggregates the sensor data according to a target temporal domain of a plurality of temporal domains.

24. The computer-implemented system according to claim 22, wherein the at least two machine learning models comprise a feature extraction model that transforms the one or more distinct aggregations of the distinct measurements of the sensor data to a set of features.

25. The computer-implemented system according to claim 22, wherein the at least two machine learning models comprise dimensionality reduction models including a principal component analysis model, a gradient boost model, and an autoencoder model.

26. The computer-implemented system according to claim 22, wherein the given machine learning model of the at least two machine learning models, once trained, perform a regression task for predicting based on the sensor data of the subject sensor, a likelihood of a target outcome that is a secondary endpoint that is not directly measurable by the sensor data of the subject sensor.

27. The computer-implemented system according to claim 22, wherein the set of heterogeneous machine learning models include a generalized linear model, a random forest model, and an artificial neural network.

28. The computer-implemented system according to claim 22, wherein:
computing, by the one or more processors, the first efficacy metric value for each of the plurality of model training compositions for each sensor of the set of heterogeneous sensors includes calculating, using one or more error functions, an error metric value based on a difference between the predictive outputs of the at least two machine learning models of the subject model training composition and actual values of a validation set of data samples, and
the first efficacy metric value comprises the error metric value.

29. The computer-implemented system according to claim 22, further comprising:
using the elected overall champion model training composition and the corresponding champion sensor to configure a computer-implemented predictive system that implements the at least two machine learning models of the elected overall champion model training composition to predict values of a target outcome spatially or temporally remote from a timing or location of the sensor data used in computing the first efficacy metric values or the second efficacy metric values.

30. The computer-implemented system according to claim 22, further comprising:
using the elected overall champion model training composition to select at least the champion sensor of a sensor suite comprising a subset of the set of heterogenous sensors to produces sensor data for a computer-implemented predictive system configured to predict agricultural-based on outcomes.

* * * * *